(12) United States Patent
O'Donnell et al.

(10) Patent No.: US 12,529,327 B2
(45) Date of Patent: Jan. 20, 2026

(54) THERMAL ENERGY STORAGE SYSTEMS FOR USE IN MATERIAL PROCESSING

(71) Applicant: Rondo Energy, Inc., Alameda, CA (US)

(72) Inventors: John Setel O'Donnell, Oakland, CA (US); Yusef Desjardins Ferhani, Menlo Park, CA (US); Peter Emery Von Behrens, Oakland, CA (US); Chiaki Treynor, Berkeley, CA (US); Matthieu Jonemann, Redwood City, CA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 18/967,374

(22) Filed: Dec. 3, 2024

(65) Prior Publication Data

US 2025/0092800 A1    Mar. 20, 2025

Related U.S. Application Data

(60) Division of application No. 18/395,266, filed on Dec. 22, 2023, now Pat. No. 12,291,982, which is a
(Continued)

(51) Int. Cl.
*F01K 3/02* (2006.01)
*B63H 11/00* (2006.01)
(Continued)

(52) U.S. Cl.
CPC ............... *F01K 3/02* (2013.01); *B63H 11/00* (2013.01); *F01K 3/08* (2013.01); *F01K 3/186* (2013.01);
(Continued)

(58) Field of Classification Search
CPC ... F01K 3/02; F01K 3/08; F01K 3/186; F01K 13/02; F01K 15/00; H02M 1/007;
(Continued)

(56) References Cited

U.S. PATENT DOCUMENTS

| 1,089,951 A | * | 3/1914 | Otto ........................ C21B 13/12 |
| | | | 373/110 |
| 1,700,542 A | | 1/1929 | O'Donnell |

(Continued)

FOREIGN PATENT DOCUMENTS

| AU | 2012292959 B2 | 2/2016 |
| AU | 2016100264 A4 | 4/2016 |

(Continued)

OTHER PUBLICATIONS

"Ethylene Production via Cracking of Ethane-Propane", Chemical Engineering, Nov. 1, 2015, Total pp. 4.
(Continued)

*Primary Examiner* — Shafiq Mian
(74) *Attorney, Agent, or Firm* — Procopio, Cory, Hargreaves & Savitch LLP; Matt Rainey

(57) ABSTRACT

An energy storage system (TES) converts variable renewable electricity (VRE) to continuous heat at over 900° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. In one application, thermal energy storage systems are used to improve efficiency and reduce carbon emissions associated with processing materials or other industrial applications.

19 Claims, 34 Drawing Sheets

Related U.S. Application Data continuation-in-part of application No. 18/171,602, filed on Feb. 20, 2023, now Pat. No. 11,873,743, and a continuation-in-part of application No. 18/106,403, filed on Feb. 6, 2023, now Pat. No. 11,873,741, which is a continuation of application No. 17/668,342, filed on Feb. 9, 2022, now Pat. No. 11,572,811, said application No. 18/171,602 is a division of application No. 17/650,522, filed on Feb. 9, 2022, now Pat. No. 11,585,243, which is a continuation of application No. 17/537,407, filed on Nov. 29, 2021, now Pat. No. 11,603,776, and a continuation of application No. PCT/US2021/061041, filed on Nov. 29, 2021, said application No. 17/668,342 is a continuation of application No. 17/537,407, filed on Nov. 29, 2021, now Pat. No. 11,603,776.

(60) Provisional application No. 63/434,919, filed on Dec. 22, 2022, provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.

| | | |
|---|---|---|
| *F01K 3/08* | (2006.01) | |
| *F01K 3/18* | (2006.01) | |
| *F01K 13/02* | (2006.01) | |
| *F01K 15/00* | (2006.01) | |
| *F03G 6/00* | (2006.01) | |
| *F22B 29/06* | (2006.01) | |
| *F22B 35/10* | (2006.01) | |
| *F28D 20/00* | (2006.01) | |
| *H01M 8/04007* | (2016.01) | |
| *H01M 8/04014* | (2016.01) | |
| *H01M 8/04029* | (2016.01) | |
| *H02J 1/10* | (2006.01) | |
| *H02J 3/00* | (2006.01) | |
| *H02J 3/04* | (2006.01) | |
| *H02M 1/00* | (2006.01) | |
| *B63H 1/12* | (2006.01) | |
| *B63H 11/12* | (2006.01) | |
| *B63H 11/14* | (2006.01) | |
| *B63H 11/16* | (2006.01) | |
| *F01K 11/02* | (2006.01) | |
| *F01K 19/04* | (2006.01) | |
| *F03D 9/18* | (2016.01) | |

(52) U.S. Cl.
CPC .............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 1/12* (2013.01); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search
CPC ......... H01M 8/04014; H01M 8/04029; H01M 8/04037; H01M 8/04052; H01M 8/04074; H02J 1/102; H02J 3/00; H02J 3/04; F03G 6/071; B63H 11/00; F22B 29/06; F22B 35/10; F28D 20/00
See application file for complete search history.

(56) References Cited

U.S. PATENT DOCUMENTS

| | | |
|---|---|---|
| 1,700,642 A | 1/1929 | Meindersma |
| 2,833,532 A | 5/1958 | Ries |
| 3,381,113 A | 4/1968 | Jacques et al. |
| 3,549,136 A | 12/1970 | Baab et al. |
| 3,788,066 A | 1/1974 | Nebgen |
| 3,908,381 A | 9/1975 | Barber et al. |
| 3,995,434 A | 12/1976 | Kato et al. |
| 4,011,430 A | 3/1977 | Witkin et al. |
| 4,110,987 A | 9/1978 | Cahn et al. |
| 4,124,061 A | 11/1978 | Mitchell et al. |
| 4,127,161 A | 11/1978 | Clyne et al. |
| 4,146,057 A | 3/1979 | Friedman et al. |
| 4,172,442 A | 10/1979 | Boblitz |
| 4,200,783 A | 4/1980 | Ehret |
| 4,222,365 A | 9/1980 | Thomson |
| 4,234,782 A | 11/1980 | Barabas et al. |
| 4,237,692 A | 12/1980 | Ahrens et al. |
| 4,312,324 A | 1/1982 | Ross et al. |
| 4,329,592 A | 5/1982 | Wagner et al. |
| 4,397,962 A | 8/1983 | Schockmel |
| 4,438,630 A | 3/1984 | Rowe |
| 4,524,756 A | 6/1985 | Laverman |
| 4,651,810 A | 3/1987 | Triessnig |
| 4,809,523 A | 3/1989 | Vandenberg |
| 4,874,034 A | 10/1989 | Hirata et al. |
| 5,154,224 A | 10/1992 | Yasui et al. |
| 5,286,472 A | 2/1994 | Fulford |
| 5,384,489 A | 1/1995 | Bellac |
| 5,416,416 A | 5/1995 | Bisher |
| 5,419,388 A | 5/1995 | Hickel et al. |
| 5,553,604 A | 9/1996 | Frei |
| 5,634,313 A | 6/1997 | Mögling |
| 5,924,477 A | 7/1999 | Doru |
| 6,274,855 B1 | 8/2001 | Tatematsu et al. |
| 6,302,188 B1 | 10/2001 | Ruhl et al. |
| 6,322,356 B1 | 11/2001 | Gupta et al. |
| 6,631,754 B1 | 10/2003 | Bremont et al. |
| 7,213,409 B1 | 5/2007 | Nuckols |
| 7,693,402 B2 | 4/2010 | Hudson et al. |
| 7,800,024 B2 | 9/2010 | Duguay et al. |
| 8,226,917 B2 | 7/2012 | Fan et al. |
| 8,544,275 B2 | 10/2013 | Shinnar |
| 8,701,773 B2 | 4/2014 | O'Donnell et al. |
| 8,960,182 B2 | 2/2015 | Magaldi et al. |
| 9,370,044 B2 | 6/2016 | McDonald |
| 9,512,826 B2 | 12/2016 | Rodionov et al. |
| 9,556,708 B2 | 1/2017 | Schneider et al. |
| 9,642,188 B2 | 5/2017 | Bach et al. |
| 9,816,490 B2 | 11/2017 | Conlon |
| 9,816,491 B2 | 11/2017 | Perry |
| 9,948,140 B2 | 4/2018 | Pietsch et al. |
| 9,989,271 B1 | 6/2018 | Becker |
| 10,113,535 B2 | 10/2018 | Conlon |
| 10,221,726 B2 | 3/2019 | Balczunas et al. |
| 10,334,881 B1 | 7/2019 | Conley et al. |
| 10,345,050 B2 | 7/2019 | Pietsch et al. |
| 10,527,026 B2 | 1/2020 | Muir et al. |
| 10,767,935 B2 | 9/2020 | Bergan et al. |
| 10,775,111 B2 | 9/2020 | Kerth |
| 10,876,521 B2 | 12/2020 | Anderson et al. |
| 11,038,431 B2 | 6/2021 | Ness et al. |
| 11,352,951 B2 | 6/2022 | Apte et al. |
| 11,459,944 B2 | 10/2022 | Robinson |
| 11,480,160 B1 | 10/2022 | Mokheimer et al. |
| 11,603,776 B2 | 3/2023 | O'Donnell et al. |
| 11,809,153 B1 | 11/2023 | Kearns et al. |

(56) References Cited

U.S. PATENT DOCUMENTS

| | | |
|---|---|---|
| 11,994,347 B2 | 5/2024 | Ponec et al. |
| 2003/0101728 A1 | 6/2003 | Wakana et al. |
| 2003/0113255 A1 | 6/2003 | Harlan |
| 2004/0062063 A1 | 4/2004 | Siri |
| 2004/0099261 A1 | 5/2004 | Litwin |
| 2004/0148922 A1* | 8/2004 | Pinkerton ............... F02C 7/08 60/670 |
| 2004/0182081 A1 | 9/2004 | Sim et al. |
| 2004/0211215 A1 | 10/2004 | Maier-Laxhuber et al. |
| 2005/0095500 A1 | 5/2005 | Corless et al. |
| 2005/0126172 A1 | 6/2005 | Hudson et al. |
| 2006/0107664 A1* | 5/2006 | Hudson ............... F28D 20/0056 60/659 |
| 2006/0174622 A1 | 8/2006 | Skowronski |
| 2006/0179840 A1 | 8/2006 | Murphy et al. |
| 2006/0211777 A1 | 9/2006 | Severinsky |
| 2006/0231466 A1 | 10/2006 | Nuber |
| 2006/0266039 A1 | 11/2006 | Skowronski et al. |
| 2006/0277910 A1 | 12/2006 | Hoetger |
| 2007/0209365 A1 | 9/2007 | Hamer et al. |
| 2007/0220889 A1 | 9/2007 | Nayef et al. |
| 2008/0000231 A1 | 1/2008 | Litwin et al. |
| 2008/0066736 A1 | 3/2008 | Zhu |
| 2008/0127647 A1 | 6/2008 | Leitner |
| 2008/0134681 A1 | 6/2008 | Nayef et al. |
| 2008/0279761 A1 | 11/2008 | Kimura et al. |
| 2008/0318143 A1 | 12/2008 | Nakayama et al. |
| 2009/0038668 A1 | 2/2009 | Plaisted |
| 2009/0090109 A1 | 4/2009 | Mills et al. |
| 2009/0117633 A1 | 5/2009 | Bradley et al. |
| 2009/0208402 A1 | 8/2009 | Rossi |
| 2009/0320828 A1 | 12/2009 | Koketsu et al. |
| 2010/0005966 A1 | 1/2010 | Wibberley |
| 2010/0101462 A1 | 4/2010 | Hayashi et al. |
| 2010/0132391 A1 | 6/2010 | Barot |
| 2010/0178156 A1 | 7/2010 | Rivas Cortes et al. |
| 2010/0195357 A1 | 8/2010 | Fornage et al. |
| 2010/0229523 A1 | 9/2010 | Holt et al. |
| 2010/0251711 A1 | 10/2010 | Howes et al. |
| 2010/0295306 A1 | 11/2010 | Ridnik et al. |
| 2011/0083443 A1 | 4/2011 | Jockenhoevel et al. |
| 2011/0226440 A1 | 9/2011 | Bissell et al. |
| 2011/0247335 A1 | 10/2011 | Schmid et al. |
| 2011/0277469 A1 | 11/2011 | Brenmiller et al. |
| 2011/0286902 A1 | 11/2011 | Fan et al. |
| 2011/0289924 A1 | 12/2011 | Pietsch |
| 2012/0067047 A1 | 3/2012 | Peterson et al. |
| 2012/0102950 A1 | 5/2012 | Turchi |
| 2012/0131898 A1 | 5/2012 | Mokheimer et al. |
| 2012/0151926 A1 | 6/2012 | Labbe |
| 2012/0167559 A1 | 7/2012 | Havel |
| 2012/0167567 A1 | 7/2012 | Kleine |
| 2012/0227926 A1 | 9/2012 | Field et al. |
| 2012/0241677 A1 | 9/2012 | Perkins et al. |
| 2012/0255309 A1 | 10/2012 | Venetos et al. |
| 2012/0286524 A1 | 11/2012 | Bronicki |
| 2013/0025817 A1 | 1/2013 | Callaghan |
| 2013/0047976 A1 | 2/2013 | Kaftori |
| 2013/0081394 A1 | 4/2013 | Perry |
| 2013/0081395 A1 | 4/2013 | Frey et al. |
| 2013/0118169 A1 | 5/2013 | Milam et al. |
| 2013/0175006 A1 | 7/2013 | Robinson et al. |
| 2014/0004469 A1 | 1/2014 | Recourt et al. |
| 2014/0053554 A1 | 2/2014 | Tartibi et al. |
| 2014/0074314 A1 | 3/2014 | Niknafs et al. |
| 2014/0102073 A1 | 4/2014 | Pang et al. |
| 2014/0116069 A1 | 5/2014 | Peterson et al. |
| 2014/0190469 A1 | 7/2014 | O'Donnell et al. |
| 2014/0216717 A1 | 8/2014 | O'Donnell et al. |
| 2014/0223906 A1 | 8/2014 | Gee et al. |
| 2014/0224469 A1 | 8/2014 | Mirmobin et al. |
| 2014/0366536 A1 | 12/2014 | Muren |
| 2015/0007577 A1 | 1/2015 | Li et al. |
| 2015/0027122 A1 | 1/2015 | Brunhuber et al. |
| 2015/0033740 A1 | 2/2015 | Anderson et al. |
| 2015/0053266 A1 | 2/2015 | Chen et al. |
| 2015/0134120 A1 | 5/2015 | Sun et al. |
| 2015/0143806 A1 | 5/2015 | Friesth |
| 2015/0143811 A1 | 5/2015 | Pang et al. |
| 2015/0167489 A1 | 6/2015 | Heiligenstein et al. |
| 2015/0176920 A1 | 6/2015 | Vendeirinho |
| 2015/0224850 A1 | 8/2015 | Bank et al. |
| 2015/0267566 A1 | 9/2015 | Vamvas |
| 2015/0276234 A1 | 10/2015 | Muro et al. |
| 2015/0295508 A1 | 10/2015 | Conry |
| 2015/0354545 A1 | 12/2015 | Conlon |
| 2015/0369125 A1 | 12/2015 | Reiter et al. |
| 2016/0130709 A1 | 5/2016 | Hong et al. |
| 2016/0146110 A1 | 5/2016 | Hackstein et al. |
| 2016/0164451 A1 | 6/2016 | Lenert et al. |
| 2016/0208657 A1 | 7/2016 | Brückner et al. |
| 2016/0214910 A1 | 7/2016 | King |
| 2016/0281607 A1 | 9/2016 | Asati et al. |
| 2016/0301093 A1 | 10/2016 | Bosmann et al. |
| 2016/0355932 A1 | 12/2016 | Reytier et al. |
| 2017/0051949 A1 | 2/2017 | Uselton |
| 2017/0058768 A1 | 3/2017 | Bergins et al. |
| 2017/0093163 A1 | 3/2017 | Johnson et al. |
| 2017/0204741 A1 | 7/2017 | Hogen et al. |
| 2017/0241649 A1 | 8/2017 | Cave |
| 2017/0241669 A1 | 8/2017 | von Behrens |
| 2017/0283713 A1 | 10/2017 | Stephens et al. |
| 2017/0362090 A1 | 12/2017 | Melsert et al. |
| 2017/0362724 A1 | 12/2017 | Planque et al. |
| 2018/0003445 A1 | 1/2018 | Bergan et al. |
| 2018/0028967 A1 | 2/2018 | Balfe et al. |
| 2018/0038352 A1 | 2/2018 | Conlon |
| 2018/0073777 A1 | 3/2018 | O'Donnell et al. |
| 2018/0083449 A1 | 3/2018 | Green |
| 2018/0106739 A1 | 4/2018 | Esmaili et al. |
| 2018/0163574 A1 | 6/2018 | Bailey et al. |
| 2018/0179955 A1 | 6/2018 | Apte et al. |
| 2018/0207557 A1 | 7/2018 | Nellis |
| 2018/0216010 A1 | 8/2018 | Hong |
| 2018/0231316 A1 | 8/2018 | Watremetz et al. |
| 2018/0238563 A1 | 8/2018 | Stepa et al. |
| 2018/0245485 A1 | 8/2018 | Conlon |
| 2018/0278439 A1 | 9/2018 | Cox |
| 2018/0292097 A1 | 10/2018 | Specter |
| 2018/0347406 A1 | 12/2018 | Friesth |
| 2018/0372337 A1 | 12/2018 | Walker |
| 2018/0372420 A1 | 12/2018 | Ahadi et al. |
| 2019/0003308 A1 | 1/2019 | Laughlin |
| 2019/0043624 A1 | 2/2019 | Fork et al. |
| 2019/0045617 A1 | 2/2019 | Fork et al. |
| 2019/0096535 A1 | 3/2019 | Olshansky et al. |
| 2019/0140477 A1 | 5/2019 | Yang et al. |
| 2019/0162482 A1 | 5/2019 | Kerth |
| 2019/0170436 A1 | 6/2019 | De et al. |
| 2019/0186786 A1 | 6/2019 | Neiser |
| 2019/0226462 A1 | 7/2019 | Conlon |
| 2019/0245224 A1 | 8/2019 | Lacroix et al. |
| 2019/0331098 A1 | 10/2019 | von Behrens et al. |
| 2019/0359894 A1 | 11/2019 | Heidel et al. |
| 2020/0095984 A1 | 3/2020 | Karni et al. |
| 2020/0124356 A1 | 4/2020 | Ma et al. |
| 2020/0172815 A1 | 6/2020 | Stephens et al. |
| 2020/0217518 A1 | 7/2020 | Field et al. |
| 2020/0232345 A1 | 7/2020 | Zwinkels |
| 2020/0332201 A1 | 10/2020 | Koseoglu et al. |
| 2020/0346165 A1 | 11/2020 | Lu et al. |
| 2020/0358112 A1 | 11/2020 | Chatroux et al. |
| 2020/0378599 A1* | 12/2020 | Risseeuw ............... F23D 14/66 |
| 2020/0386447 A1 | 12/2020 | Wang |
| 2021/0053689 A1 | 2/2021 | Lynn et al. |
| 2021/0094834 A1 | 4/2021 | Chen et al. |
| 2021/0143446 A1 | 5/2021 | Ponec et al. |
| 2021/0172685 A1 | 6/2021 | Bergan et al. |
| 2021/0190044 A1 | 6/2021 | Anderson et al. |
| 2021/0207527 A1 | 7/2021 | Robinson |
| 2021/0211066 A1 | 7/2021 | Vavilpalli et al. |
| 2021/0325069 A1 | 10/2021 | Cotton et al. |
| 2021/0328544 A1 | 10/2021 | Johnson et al. |
| 2021/0389056 A1 | 12/2021 | Calvet et al. |

(56) References Cited

U.S. PATENT DOCUMENTS

| | | |
|---|---|---|
| 2022/0049615 A1 | 2/2022 | Truong |
| 2022/0049631 A1 | 2/2022 | Deng |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1* | 4/2022 | Forsberg .......... H05B 7/06 |
| 2022/0146205 A1 | 5/2022 | Eronen et al. |
| 2022/0170386 A1 | 6/2022 | O'Donnell et al. |
| 2022/0228271 A1 | 7/2022 | Ashok et al. |
| 2022/0228772 A1 | 7/2022 | Murata et al. |
| 2022/0268179 A1 | 8/2022 | O'Donnell et al. |
| 2022/0290929 A1 | 9/2022 | Doerbeck |
| 2022/0307386 A1 | 9/2022 | Savic et al. |
| 2022/0403759 A1 | 12/2022 | Stapp, III et al. |
| 2022/0412228 A1 | 12/2022 | Ponec et al. |
| 2023/0052951 A1 | 2/2023 | Migl et al. |
| 2023/0216297 A1 | 7/2023 | Peri et al. |
| 2023/0287808 A1 | 9/2023 | Conlon |
| 2023/0407186 A1 | 12/2023 | Sundaram et al. |
| 2024/0092646 A1 | 3/2024 | Isobe et al. |
| 2024/0418106 A1 | 12/2024 | Bostick et al. |
| 2025/0026986 A1 | 1/2025 | Zellhuber et al. |

FOREIGN PATENT DOCUMENTS

| | | |
|---|---|---|
| AU | 2016204109 B2 | 5/2018 |
| CH | 703751 A1 | 3/2012 |
| CN | 1559893 A | 1/2005 |
| CN | 101799200 A | 8/2010 |
| CN | 101592439 B | 4/2011 |
| CN | 102897812 A | 1/2013 |
| CN | 104242433 A | 12/2014 |
| CN | 104296577 B | 4/2016 |
| CN | 105575659 A | 5/2016 |
| CN | 105605957 A | 5/2016 |
| CN | 105948037 A | 9/2016 |
| CN | 106052451 A | 10/2016 |
| CN | 106247836 A | 12/2016 |
| CN | 107246732 A | 10/2017 |
| CN | 107872196 A | 4/2018 |
| CN | 108167034 A | 6/2018 |
| CN | 108204760 A | 6/2018 |
| CN | 108362151 A | 8/2018 |
| CN | 108362152 A | 8/2018 |
| CN | 108612634 A | 10/2018 |
| CN | 106767074 B | 12/2018 |
| CN | 109883241 A | 6/2019 |
| CN | 110411260 A | 11/2019 |
| CN | 111256364 A | 6/2020 |
| CN | 210802160 U | 6/2020 |
| CN | 211183438 U | 8/2020 |
| CN | 111655989 A | 9/2020 |
| CN | 110725725 B | 12/2020 |
| CN | 112113203 A | 12/2020 |
| CN | 212157096 U | 12/2020 |
| CN | 113835372 A | 12/2021 |
| CN | 114754617 A | 7/2022 |
| CN | 109445511 B | 3/2024 |
| DE | 19808810 C1 | 6/1999 |
| DE | 10029732 A1 | 1/2002 |
| DE | 102008051384 B3 | 2/2010 |
| DE | 102009020531 B3 | 4/2011 |
| DE | 102012024526 B4 | 6/2014 |
| DE | 102013212981 A1 | 1/2015 |
| DE | 102017212684 A1 | 1/2019 |
| DE | 102019210737 A1 | 1/2021 |
| EP | 79247 A1 | 5/1983 |
| EP | 794161 B1 | 2/2003 |
| EP | 1930587 A2 | 6/2008 |
| EP | 2372116 A1 | 10/2011 |
| EP | 2722496 A2 | 4/2014 |
| EP | 3081770 A1 | 10/2016 |
| EP | 3324018 A1 | 5/2018 |
| EP | 3486594 A1 | 5/2019 |
| EP | 2837086 B1 | 11/2019 |
| EP | 3245388 B1 | 11/2019 |
| EP | 3725917 A1 | 10/2020 |
| EP | 2909547 B1 | 9/2021 |
| EP | 3642296 B1 | 1/2022 |
| GB | 2109026 A | 5/1983 |
| GB | 2152652 A | 8/1985 |
| GB | 2477801 A | 8/2011 |
| IL | 284451 | 8/2021 |
| JP | 2006145200 A | 6/2006 |
| KR | 2001-0100320 A | 11/2001 |
| KR | 102308531 B1 | 10/2021 |
| MA | 40029 A | 12/2015 |
| TW | 202100240 A | 1/2021 |
| WO | WO 1980/000170 | 2/1980 |
| WO | WO 2007/108014 A1 | 9/2007 |
| WO | WO 2008/052249 A1 | 5/2008 |
| WO | WO 2008/108870 A1 | 9/2008 |
| WO | WO 2009/152562 A1 | 12/2009 |
| WO | WO 2011/066039 A1 | 6/2011 |
| WO | WO 2011/077248 A2 | 6/2011 |
| WO | WO 2011/109514 A1 | 9/2011 |
| WO | WO 2012/123853 A1 | 9/2012 |
| WO | WO 2012/127178 A1 | 9/2012 |
| WO | WO 2012/150969 A1 | 11/2012 |
| WO | WO 2013/020176 A1 | 2/2013 |
| WO | WO 2014/063191 A1 | 5/2014 |
| WO | WO 2014/151843 A2 | 9/2014 |
| WO | WO 2015/149124 A1 | 10/2015 |
| WO | WO 2015/187423 A2 | 12/2015 |
| WO | 2016/062425 A1 | 4/2016 |
| WO | WO 2016/065191 A1 | 4/2016 |
| WO | WO 2016/150455 A1 | 9/2016 |
| WO | WO 2017/001710 A1 | 1/2017 |
| WO | WO 2017/049320 A1 | 3/2017 |
| WO | WO 2017/147022 A1 | 8/2017 |
| WO | WO 2018/011363 A1 | 1/2018 |
| WO | 2018/024409 A1 | 2/2018 |
| WO | WO 2018/101989 A1 | 6/2018 |
| WO | WO 2018/164647 A1 | 9/2018 |
| WO | WO 2019/020562 A1 | 1/2019 |
| WO | WO 2019/149623 A1 | 8/2019 |
| WO | WO 2019/224538 A1 | 11/2019 |
| WO | WO 2020/068758 A1 | 4/2020 |
| WO | 2020/136456 A1 | 7/2020 |
| WO | WO 2020/254001 A1 | 12/2020 |
| WO | WO 2022/086630 A1 | 4/2022 |
| WO | WO 2022/187903 A1 | 9/2022 |
| WO | 2023/219610 A1 | 11/2023 |
| ZA | 201603514 B | 11/2018 |

OTHER PUBLICATIONS

"Matching Time Of Use Periods With Grid Conditions Maximizes Use Of Renewable Resources", California ISO, Outcropping Way, Folsom, 2015, Total pp. 2.

"Miscibility Gap Alloys", University of Newcastle, accessed at https://miscibilitygapalloy.blogspot.com/p/how-did-it-stater-ted.html on Apr. 2, 2022.

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.

Alexis Mckittrick, "Low Temperature & Coproduced Resources Reservoir Thermal Energy Storage (RTES) Portfolio", Geothermal Technologies Office, U.S. Department of Energy, dated Feb. 2022. Total pp. 4.

Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.

Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.

Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.

(56) References Cited

OTHER PUBLICATIONS

Bao Truong, "Malta Pumped Heat Energy Storage System Green Heat & Power Application", Energy Storage for Manufacturing and Industrial Decarbonization Workshop, Feb. 9, 2022, Total pp. 5.

Ben Bollinger, "Malta Pumped Heat Energy Storage", Malta, Aug. 10, 2021, Total pp. 9.

Cédric Philibert, "Renewable Energy for Industry", Renewable Energy Division, International Energy Agency, Nordic Pavillion, COP23, Fidji-Bonn, Nov. 15, 2017, Total pp. 17.

Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.

Charles Forsberg et al., "Variable Electricity from Base-load Nuclear Power Plants Using Stored Heat", International Congress on Advances in Nuclear Power Plants (ICAPP 2015), May 2015, Total pp. 12.

Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.

Charles Forsberg, "Hybrid systems to address seasonal mismatches between electricity production and demand in nuclear renewable electrical grids", Energy Policy, vol. 62, Nov. 2013, pp. 333-341, Total pp. 9.

Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.

Christopher Fraughton, "Electro-Thermal Energy Storage General Presentation", MAN Energy Solutions, Aug. 2021, Total pp. 23.

CK-12 Foundation, "Saturated Hydrocarbon", Apr. 2, 2022, Total pp. 8.

Clifford K. Ho, "High-Temperature Thermal Storage in Moving and Fixed Particle Beds", Thermal-Mechanical-Chemical Energy Storage (TMCES) Workshop, San Antonio, TX, dated Aug. 10, 2021. Total pp. 13.

Cowper Stove An overview ScienceDirect Topics, Sep. 13, 2021, Total pp. 25.

D. Fernandes et al., "Thermal energy storage: How previous findings determine current research priorities", Energy, vol. 39, Issue 1, Mar. 2012, pp. 246-257, Total pp. 12.

Daniel C Stack et al., "Performance of firebrick resistance-heated energy storage for industrial heat applications and round-trip electricity storage", Applied Energy, vol. 242, May 15, 2019, pp. 782-796, Total pp. 15.

Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.

Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.

Daniel Stack et al., "Joule Hive-Replacing fire with renewable heat", Aug. 28, 2021, Total pp. 15.

David Bierman, "Clean, affordable, and reliable heat & electricity", Antora Energy, Feb. 2022, Total pp. 9.

David L. Chandler "MIT News: Turning desalination waste into a useful resource" MIT News Office, Feb. 13, 2019 (Cited in NFOA dated Sep. 14, 2022 in related U.S. Appl. No. 17/650,522.).

David Roberts, "Solar power's greatest challenge was discovered 10 years ago. It looks like a duck", www.vox.com, Aug. 29, 2018, Total pp. 19.

Dr. Avi Shultz, "Concentrating Solar-thermal Power and Thermal Energy Storage", U.S. Department of Energy, dated Feb. 8, 2022. Total pp. 7.

Dr. Avi Shultz, "Industrial Decarbonization:Renewable Process Heating from Concentrating Solar Thermal", U.S. Department of Energy, dated Feb. 8, 2022. Total pp. 6.

Dr. Eric L. Miller, "The Hydrogen Energy Earthshot and H2@Scale: Importance to Industrial Decarbonization", Energy StorM Panel, Feb. 8, 2022, Total pp. 9.

Dr. Gianluca Ambrosetti et al., "Cement Production", Energy Storage for Manufacturing and Industrial Decarbonization Workshop "Energy StorM", Feb. 8, 2022, Total pp. 10.

Dr. Jeffrey Goldmeer, "Power to Gas: Hydrogen for Power Generation Fuel Flexible Gas Turbines as Enablers for a Low or Reduced Carbon Energy Ecosystem," GE Power, Feb. 2019, 19 pages.

Echogen, "CO2-Based Pumped-Thermal Energy Storage Technical Overview & Status", Echogen Power System, Total pp. 20, Aug. 10-11, 2021.

Elizabeth Endler, "Energy Storage for Manufacturing Petrochemical Industry Perspective", Feb. 8, 2022, "Energy StorM" Workshop, US Department of Energy, Total pp. 14.

Elliott Group, "Materials for Hydrogen Compression", Thermo-Mechanical-Chemical Energy Storage Workshop, Elliott, Aug. 10-11, 2021, Total pp. 25.

Emiliano Bellini, "Long-duration thermal storage system based on silica sand", pv magazine International, Nov. 5, 2021, Total pp. 6.

Emiliano Bellini, "Storing wind, solar power with silica sands", pv magazine International, Sep. 1, 2021, Total pp. 10.

GE Energy Storage Unit RSU-4000, Modular, Scalable Energy Storage Solution for Utility-Scale Applications; www/ge.com/energystorage; 2020, 1 page.

Gregory C Staple, "California's Grid Geeks: Flattening the 'duck curve'", Jan. 25, 2017, www.greenbiz.com, Total Page Count 9.

Grid Energy Storage, U.S. Department of Energy, Dec. 2013, Total pp. 67.

Haisheng Chen et al., "Progress in electrical energy storage system: A critical review", Progress in Natural Science, vol. 19, Issue 3, Mar. 10, 2009, pp. 291-312, Total pp. 22.

Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Received Dec. 14, 2019; Accepted Mar. 4, 2020; 20 pages.

Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.

Hélder Da Silva, "Energy Storage for Manufacturing and Industrial Decarbonization Workshop "Energy StorM"", Feb. 8, 2022, Total pp. 11.

Hitesh Bindra et al., "Sliding flow method for exergetically efficient packed bed thermal storage", Applied Thermal Engineering, vol. 64, Issues 1-2, Mar. 2014, pp. 201-208, Total pp. 8.

Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.

"How thermal power plants can benefit from the energy transition", The Future of Energy 2019, Siemens Gamesa Renewable Energy, 10 pages.

Ilievski D, "New Two-Stage Calcination Technology", Proceedings of the 9th International Alumina Quality Workshop, Alcoa World Alumina, Technology Delivery Group, Western Australia, 2012, Total pp. 7.

Industrial Decarbonization using Electric Thermal Energy Storage (ETES), Jan. 25, 2022, Total pp. 11.

International Search Report mailed on Sep. 14, 2022 for International Application No. PCT/US2021/061041, 41 pages.

International Search Report and Written Opinion mailed on Mar. 1, 2024 for International Application No. PCT/US2023/034488, 14 pages.

International Search Report and Written Opinion mailed on May 17, 2024 for International Application No. PCT/US2023/085826, 14 pages.

(56) References Cited

OTHER PUBLICATIONS

International Search Report and Written Opinion mailed on Aug. 23, 2024 for International Application No. PCT/US2024/024158, 9 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Jeff Moore, "Oxygen Storage Incorporated into the Allam OxyFuel Power Cycle", Southwest Research Institute, Total pp. 8, Aug. 10-11, 2021.
Ji, Huichao, et al., "Electricity Consumption Prediction of Solid Electric Thermal Storage with a Cyber-Physical Approach", Energies 2019, 12, 47441 doi:10.3390/en12244744, www.mdpi.com/journal/energies, published on Dec. 12, 2019, in 18 pages.
Joe Cresko, "Energy Storage for Manufacturing", Energy Storage for Manufacturing & Industrial Decarbonization Workshop, Feb. 8-9, 2022, Total pp. 11.
Joe Paladino, "Transformation of the Electric Grid", Energy StorM Workshop, Feb. 4, 2022, Total pp. 5.
Joe Stekli, "LCRI Update TMCES 2021", Low-Carbon Resources Initiative, Electric Power Research Institute, Aug. 2021, Total pp. 31.
Joshua Schmitt, "Development of An Advanced Hydrogen Energy Storage System Using Aerogel In A Cryogenic Flux Capacitor (Cfc)", Southwest Research Institute, Aug. 10, 2021, Total pp. 8.
Lion Hirth, "The market value of variable renewables: The effect of solar wind power variability on their relative price", Energy Economics, vol. 38, Jul. 2013, pp. 218-236, Total pp. 19.
Lion Hirth, "The Optimal Share of Variable Renewables: How the Variability of Wind and Solar Power affects their Welfare-optimal Deployment", The Energy Journal, vol. 36, No. 1, p. 149-184, (2015). Total pp. 36.
Lori Schaefer-Weaton, "Solar & Battery Energy Solution Agri-Industrial Plastics Co.", Agri-Industrial Plastics Company, Feb. 2022, Total pp. 12.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2014, Total pp. 7.
Marc Medrano et al., "State of the art on high-temperature thermal energy storage for power generation. Part 2—Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.
Mecys Palsauskas, et al.: ""Device ensuring effective usage of photovoltaics for water heating"", Electrical Engineering, 101 (1), 189-202, Apr. 8, 2019 (Apr. 8, 2019), DOI: 10.1007/s00202-019-00766-0.
Michael Pesin, "The Office of Electricity Grid Modernization R&D Portfolio", Aug. 2, 2021, Total pp. 18.
Mike Gravely, "The Role of Energy Storage in Helping California Meet the State's Future Zero Carbon Energy Goals", Energy Research and Development Division, California, 2021, Total pp. 23.
Natalie Smith et al., "Integration of Pumped Heat Energy Storage with a Fossil-Fired Power Plant", U.S. Department of Energy, 2021, Total pp. 6.

PCT; Invitation to Pay Additional Fees issued in International Patent Application No. PCT/US2021/061041; mailed Mar. 24, 2022; 21 Pages.
Pintail Power LLC, "Liquid Air Combined Cycle Hybrid Energy Storage", Pintail Power LLC, Tmces Workshop, Aug. 10-11, 2021, San Antonio, TX, Total pp. 12.
Office Action in U.S. Appl. No. 17/650,519 mailed Apr. 20, 2022, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Reply to Communication Under Rule 71(3) EPC, received in corresponding EP App. No. 21 843 808.3, submitted May 6, 2024, in 9 pages.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.
Russ Weed, "Market Needs & Technology Overview", Thermal-Mechanical-Chemical Energy Storage Workshop—Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Scott Hume, "Mid-Duration Energy Storage (MDES) Benefits and Challenges", 3rd TMCES Workshop, Aug. 10, 2021, Total pp. 11.
Sempra Energy Utility, "SoCalGas", Total pp. 6, Oct. 2021.
Sharadga, Hussein, et al., "A hybrid PV/T and Kalina cycle for power generation", Int J Energy Res. 2018;42:4817-4829, https://doi.org/10.1002/er.4237, dated Sep. 7, 2018.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens AG, "Compressed Air Energy Storage (CAES)", 3rd Thermal-Mechanical-Chemical Energy Storage Workshop, Siemens Energy, Aug. 2021, Total pp. 17.
Siemens Gamesa, "Electric Thermal Energy Storage (ETES)—Industrial Decarbonization", Siemens Gamesa Renewable Energy, 2020, Total pp. 9.
Soteris Kalogirou, "The potential of solar industrial process heat applications", Applied Energy, vol. 76, Issue 4, Dec. 2003, pp. 337-361, Total pp. 25.
Steffes, ThermElect Hydronic, Demand-Free, Off-Peak Heating, May 2020, Total pp. 2.
Stefica Nicol Bikes, "Australian engineers patent thermal block to store renewable energy", www.reuters.com, Oct. 26, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require A High Steam Quality", Steam Systems Best Practices, Document No. 23, 2009, Total pp. 3.

(56) References Cited

OTHER PUBLICATIONS

T. Fiedler et al., "Thermal capacitors made from Miscibility Gap Alloys (MGAs)", WIT Transactions on Ecology and The Environment, vol. 186, 2014, Total pp. 8.
Third Party Objections raised in corresponding EP App. No. 21 843 808.3, dated Apr. 30, 2024, with English Translation, in 8 pages.
Thomas A. Buscheck, "Hybrid-energy technology enabled by heat storage and oxy-combustion for power and industrial-heat applications with near-zero or negative CO2 emissions", Thermal-Mechanical-Chemical Energy Storage Workshop, San Antonio, Texas, Aug. 10, 2021, Total pp. 22.
Timothy C. Allison, "Thermal-Mechanical-Chemical Energy Storage Technology Overview and Research Activities", Southwest Research Institute, Aug. 9, 2021, Total pp. 22.
Todd Brix, "Converting Carbon. Storing Energy", Richland, Washington U.S.A, Feb. 9, 2022, Total pp. 13.
Tony Bowdery et al., "Heat Exchangers For Thermal Energy Storage: Challenges And Mitigation", Meggitt, Aug. 2021, Total pp. 20.
Torbjörn Lindquist, "Powering the evolution of a renewable society, by redefining energy infrastructure", Azelio, Feb. 7, 2022, Total pp. 10.
Travis Mcling et al., "Dynamic Earth Energy Storage: Grid Scale Energy Storage using Planet Earth as a Thermal Battery (RTES)", Feb. 2022, Total pp. 7.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Vishal Sardeshpande, "Performance analysis for glass furnace regenerator", Applied Energy, vol. 88, Issue 12, Dec. 2011, pp. 4451-4458, Total pp. 8.
Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority mailed on Sep. 14, 2022 for PCT/US2021/061041, 26 pages.
Zhao, Haichuan, et al., "Thermal Calculation and Experimental Investigation of Electric Heating and Solid Thermal Storage System", Energies 2020, 13, 5241; doi:10.3390/en13205241, www.mdpi.com/journal/energies, published on Oct. 9, 2020, in 20 pages.
Zhou et al., "Highly Conductive Porous Graphene/Ceramic Composites for Heat Transfer and Thermal Energy Storage," Adv. Funct. Mater., 2013, 23, pp. 2263-2269.
International Search Report and Written Opinion mailed on Dec. 20, 2024 for International Application No. PCT/US2024/024156, 29 pages.
Song, Jian, et al., "Combined supercritical CO2 (SCO2) cycle and organic Rankine cycle (ORC) system for hybrid solar and geothermal power generation: Thermoeconomic assessment of various configurations", (Year: 2021), in 16 pages.
AMETEK Process Instruments, "Reduce Nox Emissions While Improving Fuel Efficiency", EDG Series Gas Analyzers, Year: 2018, in 2 pages.
Fakhroleslam, Mohammad, et al., "Thermal/catalytic cracking of hydrocarbons for the production of olefins; a state-of-the-art review III: Process modeling and simulation", Elsevier, www.elsevier.com/locate/fuel, Fuel 252 (2019) 553-566, in 14 pages.
Sakakibara, Reyu, et al., "Practical emitters for thermophotovoltaics: a review", Journal of Photonics for Energy, vol. 9, Issue 3, 032713 (Feb. 2019), https://doi.org/10.1117/1.JPE.9.032713, in 38 pages.
International Search Report and Written Opinion mailed on Apr. 25, 2025 for International Application No. PCT/US2024/051145, 19 pages.
Waste Heat Recovery: Technology and Opportunities in U.S. Industry, prepared by BCS, Incorporation, Mar. 2008, in 112 pages.
International Search Report and Written Opinion mailed on Aug. 29, 2025 for International Application No. PCT/ US2025/030863, 19 pages.
International Search Report and Written Opinion mailed on Oct. 16, 2025 for International Application No. PCT/US2025/036518, 13 pages.
International Search Report and Written Opinion mailed on Oct. 21, 2025 for International Application No. PCT/US2025/026289, 19 pages.

* cited by examiner

THERMAL ENERGY STORAGE SYSTEMS FOR USE IN MATERIAL PROCESSING

CROSS-REFERENCE TO RELATED APPLICATIONS

This application is a divisional of U.S. patent application Ser. No. 18/395,266, filed Dec. 22, 2023, and claims priority to the following patent applications:

U.S. Provisional Patent Application No. 63/434,919 filed on Dec. 22, 2022.

This application claims priority under 35 USC § 120 as a continuation-in-part of:

U.S. patent application Ser. No. 18/106,403, filed on Feb. 6, 2023, which is a continuation of U.S. patent application Ser. No. 17/668,342, filed on Feb. 9, 2022, now granted as U.S. Pat. No. 11,572,811, which is a Continuation of U.S. patent application Ser. No. 17/537,407, filed Nov. 29, 2021, now granted as U.S. Pat. No. 11,603,776, which claims priority to the following provisional applications:

U.S. Provisional Patent Application No. 63/119,443, filed Nov. 30, 2020

U.S. Provisional Patent Application No. 63/155,261, filed Mar. 1, 2021

U.S. Provisional Patent Application No. 63/165,632, filed Mar. 24, 2021

U.S. Provisional Patent Application No. 63/170,370, filed Apr. 2, 2021

U.S. Provisional Patent Application No. 63/231,155, filed Aug. 9, 2021.

Additionally, this application claims priority under 35 USC § 120 as a continuation-in-part of:

U.S. patent application Ser. No. 18/171,602, filed on Feb. 20, 2023, which is a divisional of Ser. No. 17/650,522, filed Feb. 9, 2022, now granted as U.S. Pat. No. 11,585,243, which is a continuation of above-noted U.S. patent application Ser. No. 17/537,407, and is also a continuation of PCT/US2021/061041, filed Nov. 29, 2021, both of which claim priority to the following provisional applications:

U.S. Provisional Patent Application No. 63/119,443, filed Nov. 30, 2020

U.S. Provisional Patent Application No. 63/155,261, filed Mar. 1, 2021

U.S. Provisional Patent Application No. 63/165,632, filed Mar. 24, 2021

U.S. Provisional Patent Application No. 63/170,370, filed Apr. 2, 2021

U.S. Provisional Patent Application No. 63/231,155, filed Aug. 9, 2021.

The following patent applications and patent are directed to related technologies:

U.S. patent application Ser. No. 17/537,407 (filed Nov. 29, 2021; issued as U.S. Pat. No. 11,603,776 on Mar. 14, 2023), and International Patent Application No.: PCT/US2021/061041 (filed Nov. 29, 2021).

The foregoing applications and patent are incorporated herein by reference in their entirety for all purposes.

BACKGROUND

Technical Field

The present disclosure relates to thermal energy storage and utilization systems. More particularly, the present disclosure relates to an energy storage system that stores electrical energy in the form of thermal energy, which can be used for the supply of hot air, carbon dioxide ($CO_2$), steam, process gas, or other heated fluids, for various applications including the supply of heat for power generation. More specifically, the present disclosure relates to using thermal energy storage systems to improve efficiency and reduce carbon emissions associated with processing materials or other industrial applications.

Related Art

I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy-different heating processes or industrial processes-require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the bricks closest to the heating wire are heated more than the bricks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a desire to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Storage of Intermittent Energy

Fossil fuels have driven the world economy since the industrial revolution; however, mankind has discovered that not only is there a limited supply of these energy resources, but also that the combustion of fossil fuels to extract their energy produces greenhouse gases and other pollutants that threaten planet-wide ecosystems. Specifically, such systems are inherently inefficient in their use of the energy locked up in chemical bonds because they emit innumerable tons of hot combustion gases out smokestacks into our atmosphere, directly causing global warming, indirectly causing global warming through the effects of greenhouse gas emissions on the increased absorption of sunlight by planet Earth, as well as the effects of the pollutants' contribution to the degradation of our planet through, for example, the washing of the Earth's various ecosystems in acid rain.

Energy sources that address this problem, such as solar energy, wind energy, and tidal energy are being developed to meet our need for renewable energy sources that do not generate these harmful greenhouse gases. One drawback that renewable energy sources have is that they are of an intermittent nature. The sun does not always shine; the wind does not always blow; tides are not always flowing. This has prevented these technologies from becoming replacements for fossil fueled energy sources, since industry requires power on demand, 24 hours a day, 365 days a year.

Therefore, what is needed is a way to store the intermittent energy that renewable energy sources provide in a closed loop to meet the constant power demands of industry without expelling heat and pollutants to the atmosphere. This has led to the development of green energy storage solutions, as well as the systems and methods for heat storage and extraction from structured solid blocks in thermal energy storage units as described herein.

One hurdle that lies between the conception and initial development of thermal storage solutions and their actual implementation is the interfacing of such solutions with existing industrial equipment to make use of existing assets and infrastructure. Consequently, what is needed are systems for the modularization of such thermal energy storage units that may be combined in various fashions to provide for customized solutions that meet the individual needs for retrofitting such fossil fuel fired power systems. Furthermore, there is a great need to enable the evaluation of thermal energy storage units as a green energy alternative to existing fuel fired boiler systems without redesigning and rebuilding existing industrial infrastructure. Along these lines, what is desperately needed are systems that allow for easily switching between fossil fuel energy sources and variable renewable electricity sources to evaluate the latter as replacements for existing fossil fuel fired energy sources. This would greatly help achieve the worldwide goals set forth in the Paris Climate Accord, in particular a 45% reduction in greenhouse gas emissions by 2030, with a net zero emission goal target set for 2050. In particular, systems and methods for the coupling of one or more thermal energy storage units to fuel fired boiler systems is needed, along with control systems that coordinate the operation of systems containing multiple thermal energy storage units. This coupling of two completely different energy sources allows for reversibly evaluating this new sustainable technology for the possible retrofitting or replacement of the fossil fuel based systems with a green energy supply, while retaining much of the capital equipment that is already paid for and in service.

III. Industrial Applications of Stored Thermal Energy

The steel industry accounts for as much as 5% of total world greenhouse gas emissions because of its significant use of coal. Traditional steel making process using refined coal generates about two tons of carbon dioxide ($CO_2$) for every ton of steel produced. Low $CO_2$ emitting steelmaking and ironmaking solutions are being developed to reduce the amount of greenhouse gas emissions associated with the steel and iron industries.

One such solution involves Direct-Reduced Iron (DRI), also known as sponge iron. DRI is a key process step in one of two major process pathways to produce steel from iron oxide ore. DRI refers to a solid-state process which reduces iron oxides to metallic iron at temperatures below the melting point of iron. In the global effort to reduce greenhouse gas emissions, DRI is becoming the preferred pathway for producing steel due to the potential for emission reductions that are not matched by the blast furnace pathway. Although a step in the right direction, traditional DRI processes continue to rely on carbon emitting sources to provide sufficient heat to drive the DRI process.

SUMMARY

The example implementations advance the art of thermal energy storage and enable the practical construction and operation of high-temperature thermal energy storage (TES) systems that can charge by VRE, store energy in storage media, and deliver high-temperature heat.

More specifically, the present disclosure relates to thermal energy storage systems that provide heat for industrial applications. The industrial applications include, but are not limited to, continuous heat for material processing such as processes associated with the production of Direct-Reduced Iron (DRI), which can be used to produce iron or steel. Embodiments herein also relate to thermal energy storage systems as applied to high-pressure applications. As examples, the high-pressure applications may include a thermal energy storage unit within a pressure vessel, or a thermal energy storage unit coupled to a gas compressor. The high-pressure applications may be applied to heating for DRI, a blast furnace stove, and gas turbine power generation. Further, the thermal energy storage system may be used for carbon capture and sequestration (CCS), powered by cogeneration from the thermal energy storage system.

For industrial applications used to refine raw materials, a TES unit can provide heat to these refining processes, particularly if these processes are endothermic (cooling). The TES unit can also be configured to preheat materials or process gases to a desired temperature before the materials or process gases enter a reactor zone. The TES unit can be beneficial in scenarios where these heat requirements of the industrial application are currently met using traditional fuel burning heaters that generate carbon gas emissions. By using a TES unit that is powered by renewable energy sources, these heat requirements of the industrial application are met in a manner that further reduces its carbon footprint.

A TES unit can be configured with a thermal storage material or medium that stores energy at high temperatures such as about 900 °C or higher. This high temperature heat source enables the system to provide heat to an industrial application desiring high temperature heat while also providing secondary heat at a lower temperature from the same TES unit to a second application such as a heat recovery steam generator (HRSG). Optionally, some embodiments store thermal energy between about 600 °C and 1000 °C. Optionally, some embodiments store thermal energy between about 1000 °C and 1500 °C. Optionally, some embodiments store thermal energy between about 1300 °C and 1700 °C.

In one embodiment, the thermal energy from the TES unit can be transferred by way of radiation from a storage medium in the TES. A surface of that storage medium will be cooled as it radiates heat away. However, the surface of the storage medium that is losing thermal energy is continually being heated by convection from the thermocline in the TES. This combination of radiative heat transfer away from the storage medium while that surface is also continually heated by convection allows for highly efficient radiant heat transfer to a target while minimizing cooling of that radiant heat transfer surface because of constant reheating from convective heating.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
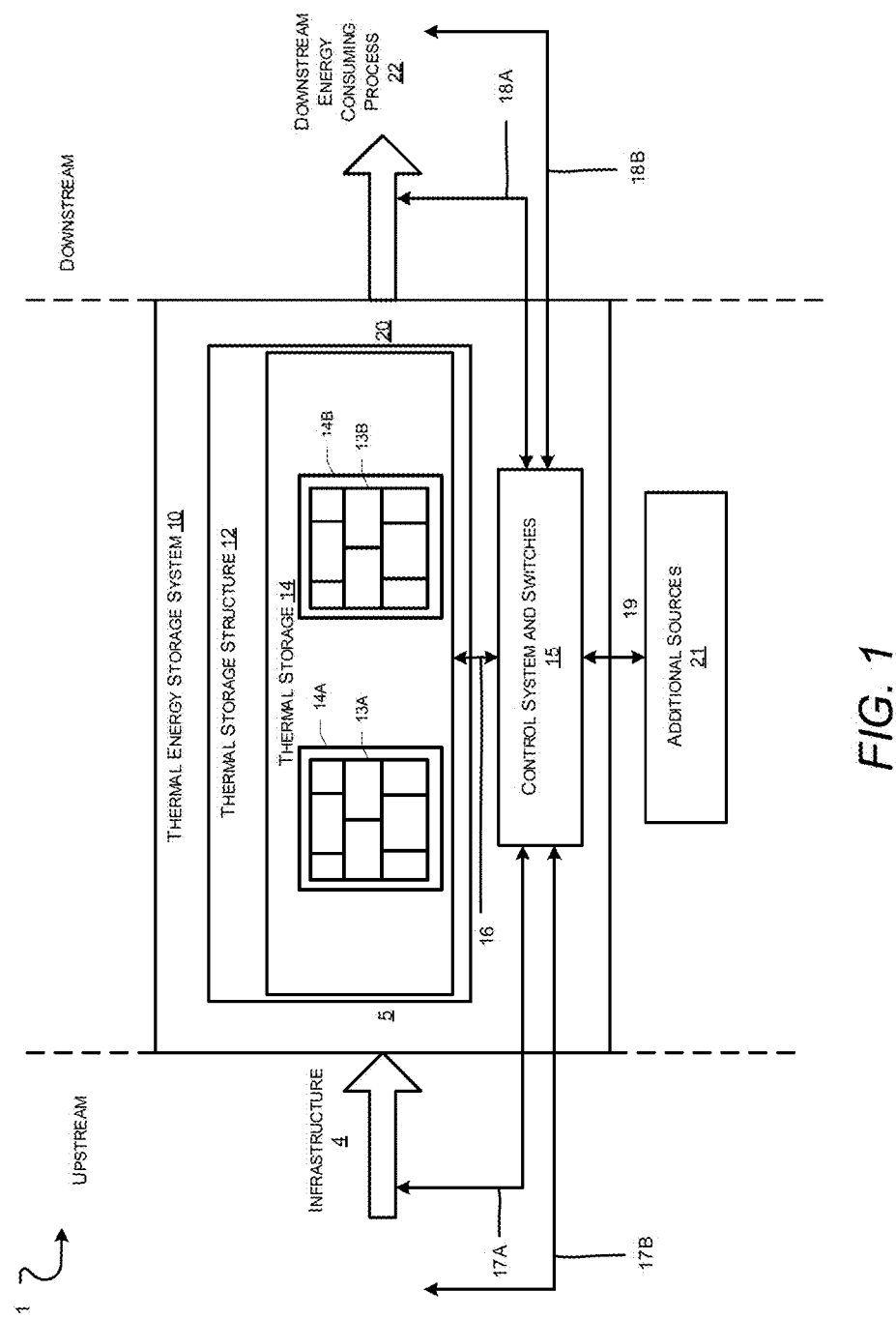
FIG. 1 illustrates a schematic diagram of the thermal energy storage system architecture according to the example implementations.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 7B, 13A) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2 and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
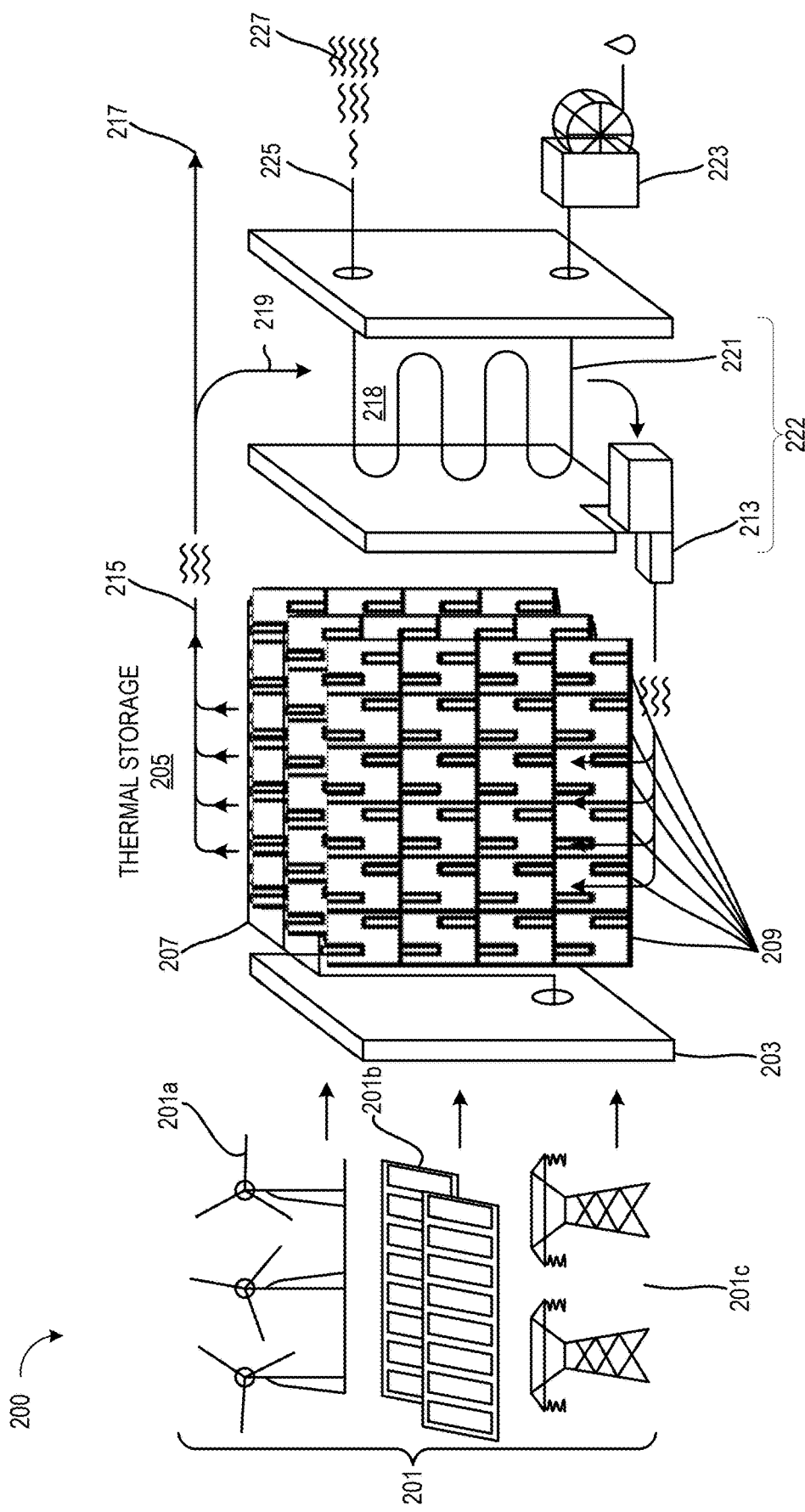
FIG. 2 illustrates a schematic diagram of a system according to the example implementations.

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201a, solar energy from photovoltaic cells 201b, or other energy sources may provide electricity that is variable in availability or price because the conditions for generating the electricity are varied. For example, in the case of wind turbine 201a, the strength, duration and variance of the wind, as well as other weather conditions causes the amount of energy that is produced to vary over time. Similarly, the amount of energy generated by photovoltaic cells 201b also varies over time, depending on factors such as time of day, length of day due to the time of year, level of cloud cover due to weather conditions, temperature, other ambient conditions, etc. Further, the input electricity may be received from the existing power grid 201c, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage media 209. Thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented-one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers. By the release of heat energy from the resistive heating elements 207, heat is radiatively transferred to arrays 209 of bricks during a charging mode. Relatively hotter brick surfaces reradiate absorbed energy (which may be referred to as a radiative "echo") and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
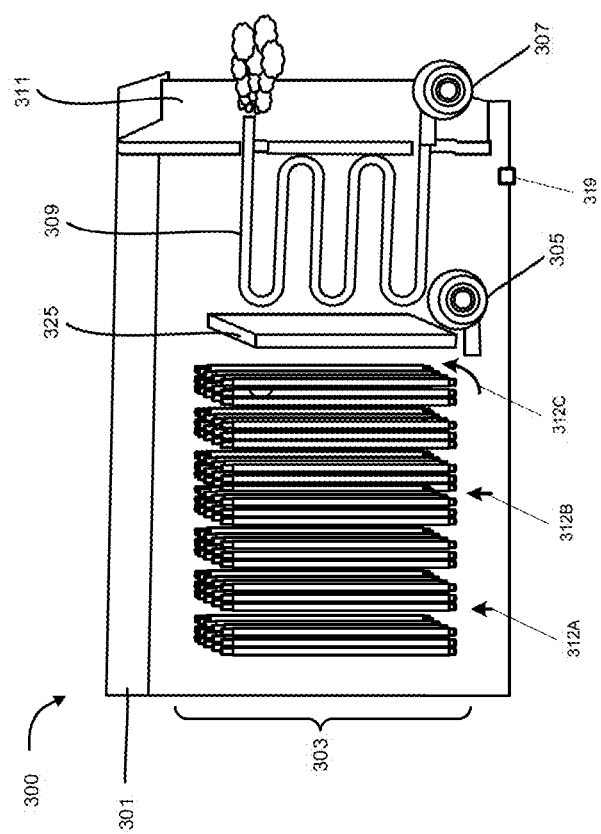
FIG. 3 illustrates a schematic diagram of a storage-fired once-through steam generator (OTSG) according to the example implementations.

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319 and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water, or another fluid pumped by the water pump 307. As the hot air heats up the water in the conduit, steam is generated at 311. The cooled air that has crossed the conduit (and transferred heat to the water flowing through it) is then fed back into the brick heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
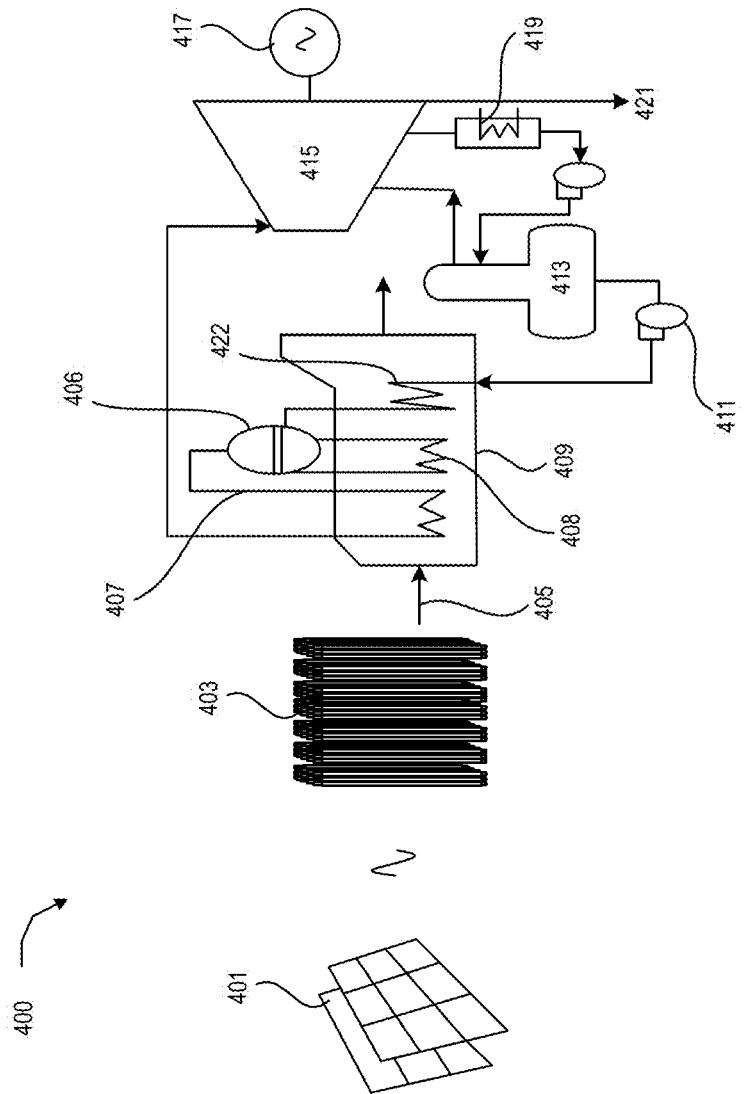
FIG. 4 illustrates an example view of a system being used as an integrated cogeneration system according to the example implementations.

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 4, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
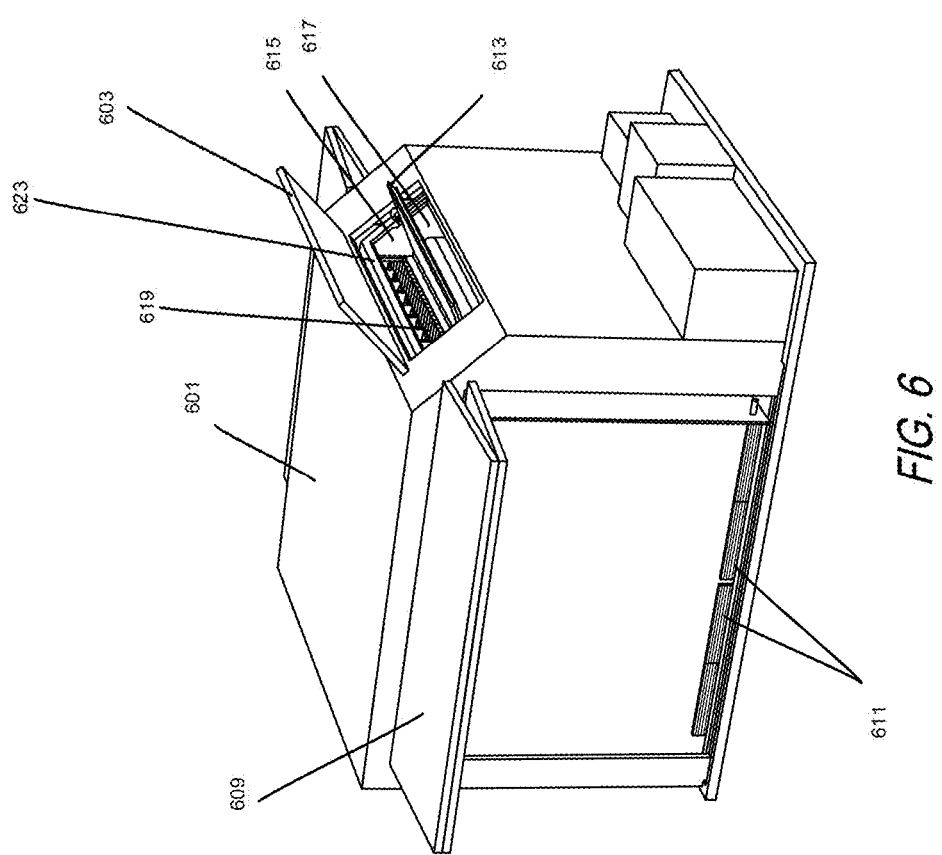
FIG. 6 provides an isometric view of the thermal storage unit with multiple vents closures open, according to some implementations.

In an OTSG implementation, a first end of the conduit can be fluidically coupled to a water source. The system may provide for inflow of the fluids from the water source into a first end of the conduit and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 5:
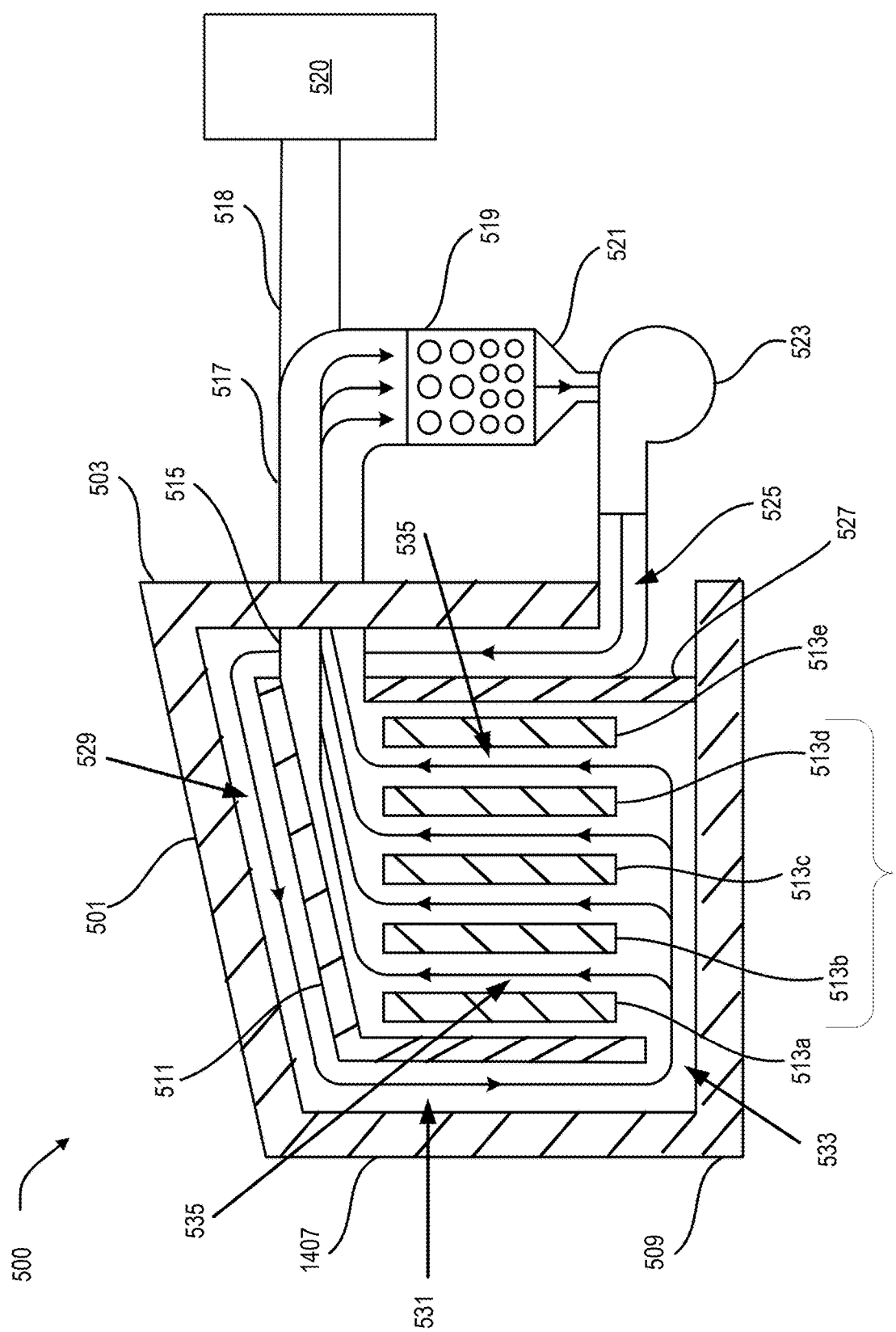
FIG. 5 illustrates dynamic insulation according to the example implementations.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of bricks in stack 513, the columns being represented as 513a, 513b, 513c, 513d and 513e. The heated fluid that is discharged from the upper portion of the columns of bricks 513a, 513b, 513c, 513d and 513e exits by way of an output 515, which is connected to a duct 517. Duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of bricks 513a, 513b, 513c, 513d and 513e and the air passages 535 are shown schematically in FIG. 5. The physical structure of the stacks and air flow passages therethrough in embodiments described herein is more complex, leading to advantages.

In some implementations, to reduce or minimize the total energy loss, the layer of insulation 511 is a high-temperature primary insulation that surrounds the columns 513a, 513b, 513c, 513d and 513e within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the bricks 513a, 513b, 513c, 513d and 513e within the housing so that the bricks 513a, 513b, 513c, 513d and 513e are not in contact with the outer surface 501, 503, 507 of the housing, and are thus thermally isolated from the housing by the primary insulation formed by the layer of cool fluid. The bricks 513a, 513b, 513c, 513d and 513e may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat desired to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Bricks and Heating Elements

A. Problems Solved by One or More Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of inner enclosure 623 and the inner surface of the outer enclosure define a fluid passageway through which fluid may be conducted actively for dynamic cooling or passively for failsafe operation.

Inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various embodiments releases low-pressure steam that is condensed to a liquid by a condenser 419, and then de-aerated using a deaerator 413, and again delivered to the HRSG 409.

III. Industrial Applications of Stored Thermal Energy

1. Background & Problems to be Solved

Direct-Reduced Iron (DRI), also known as sponge iron, is a key process step in one of two major process pathways to produce steel from iron oxide ore. DRI refers to a solid-state process which reduces iron oxides to metallic iron at temperatures below the melting point of iron. In the global effort to reduce greenhouse gas emissions, DRI is becoming the preferred pathway for producing steel due to the potential for emission reductions that are not matched by the blast furnace pathway. The two primary reactions for the reduction of iron ore involve carbon monoxide (CO) and hydrogen gas ($H_2$) as the main reducing gases and are the following:

$Fe_2O_3 + 3CO \rightarrow 2Fe + 3CO_2$ (exothermic)

$Fe_2O_3 + 3H_2 \rightarrow 2Fe + 3H_2O$ (endothermic)

Conventionally, natural gas ($CH_4$) is reformed at high temperatures to form syngas (CO and $H_2$) through the primary mechanism:

$CH_4 + CO_2 \rightarrow 2CO + 2H_2$ $CH_4 + H_2O \rightarrow CO + 3H_2$

After the feed natural gas is reformed, the high temperature product syngas and unreacted natural gas are introduced to the bottom of the reducing reactor. This reactor may be a series of fluidized beds or, more commonly, a shaft furnace. The reducing process gas is fed into the bottom of the reactor and flows up while iron ore (iron oxide) solid is fed down the reactor by gravity in a counterflow heat exchange. The hot process gases react with the chemically bound oxygen in the iron ore. Carbon monoxide generates heat when reacting with oxygen while hydrogen consumes heat. The chemical composition of $H_2$ and CO can be manipulated such that the reactor stays at the desired temperature of around 900° C.

At the bottom of the reactor, hot direct-reduced iron exits. At the top of the reactor, the process gas stream exits at a much lower temperature than they were introduced as the cold fed iron ore cools the process gases at the top of the reactor. These process gases are a mixture of unreacted reducing gases, reduction reaction byproducts, and particulates. The process gas stream is regenerated by quenching and scrubbing to remove particulates, $CO_2$, and humidity and adding makeup natural gas. A portion of the waste gas stream along with additional natural gas is used for fuel in reforming the natural gas in the upstream reformer. For the above prior art description, refer to FIG. 25.

The Direct-Reduced Iron (DRI) process in steel production is an energy intensive reduction process that could benefit from a cleaner energy source. To make the DRI process less carbon intensive, natural gas use as a feedstock for the reducing gas can be replaced (partially or fully) by hydrogen gas. This hydrogen gas can be produced using water and renewable electricity in an electrolyzer instead of being produced along with carbon monoxide in a natural gas reforming process. However, as the compositions of CO and $CH_4$ decrease, the reduction reaction in the reactor becomes increasingly endothermic, making temperature control and stabilization difficult. Some in the related art address this problem by adding natural gas or other hydrocarbons to the reactor for temperature and carbon control.

As more pure hydrogen is added to the reducing gas stream, there is a greater demand for external heat. Further, as the motivation for the hydrogen addition is reducing the carbon intensity of the steel making process, there is greater demand for heat with low or no carbon emissions. Replacing this heat demand with traditional carbon intensive heat sources would diminish the carbon reductions associated with the DRI steel or ironworking processes.

One of these external heat demands involves preheating the reducing gas stream before entry into the direct reduction reactor. In a conventional process, the natural gas reformer is heated by burning natural gas and recycled reduction exhaust gas. This burning of natural gas, unfortunately, releases more carbon emissions. The reforming process is carried out at high temperatures such that the produced reducing process gas stream is at or near the operating temperature of the direct reduction reactor/furnace. In addition, supplementary hydrogen, oxygen and/or natural gas can be added to the process gas stream in the direct reduction reactor to generate additional heat via combustion or partial combustion to maintain the reactor temperature.

In the effort to reduce the use of natural gas and hydrocarbons in the production of DRI, there is a desire for a clean heat source. Most electrolyzers produce hydrogen at significantly lower temperatures than reformers do with the majority of electrolyzers producing hydrogen at less than 100° C. A heating device is desired before the reducing hydrogen stream can be introduced to the reactor. The use of an electrically heated thermal storage system that charges electrically, converts the electricity to heat to store the energy at high temperatures, and discharges the stored energy as heat is an economical solution to the problem.

2. Thermal Energy Storage Solution

Using thermal energy storage has advantages over alternative approaches of electrifying DRI processes. One alternative technology is electric resistive heaters. Electric resistive heaters use electricity to directly heat the gas streams to operating temperature. However, DRI processes are often run continuously, and most renewable electricity is derived from intermittent sources, such as wind and solar. For an electric resistive heater to be operated continuously with clean electricity, energy storage is required. Battery storage is costly and can have issues scaling to storage capacity large enough to support the electrification of a large industrial DRI process. Another way to produce continuous, renewable heat is burning electrolytic hydrogen in the place of natural gas. Issues arise with this approach as electrolyzers are costly and not very efficient on a round trip energy efficiency basis. A plant would want to only install as much electrolyzer capacity as needed for the reducing gas, and an operator would want to run as continuously as possible to maximize utilization of the expensive electrolyzer capacity.

According to the present disclosure, an electrically heated thermal storage system enables intermittent electrical charging to be viable in an industrial application by being able to discharge energy such as high temperature heat in a continuous or pre-determined manner. At times when electricity is available (e.g., when solar PV is generating), electricity is converted to heat by raising the temperature of the solid thermal storage medium. When such electricity is not available, the heat in the thermal storage medium can release energy for one or more industrial application.

This can be a much more cost-effective approach compared to the electric resistive heaters paired with conventional electrical battery storage. There are several embodiments of the DRI process that incorporate thermal energy storage technology into the DRI process. The shared feature of the process integrations disclosed here includes using energy derived from electricity to heat up a process gas stream to a reactor temperature of approximately 900° C. or higher. There are several embodiments for doing this.

a. Using Thermal Energy Storage to Preheat Process Gas

In one embodiment, a thermal energy storage working fluid such as air is heated by the thermal energy storage medium to high temperatures. The working fluid can then exchange heat directly or indirectly with the reducing process gas stream or the DRI reaction such that the DRI process gas stream is brought to the desired reactor temperature so as to maintain a desired process condition in the reactor. There may be a controllable element used in moving fluid through the storage medium, such as a blower or other fluid moving device, a louver, or a valve. This controllable element may be used to adjust the output of the TES to maintain a desired condition in a material processing reactor. Depending on the desired implementation, the working fluid can be nitrogen, a noble gas, a carbon oxide, another gas as described herein, or any combination of the foregoing.

In another embodiment, the thermal storage system heats a working fluid such as steam or air to very high temperatures (e.g., greater than 900° C.). The high temperature thermal storage fluid may contact the reducing process fluid directly. Optionally, the high temperature thermal storage fluid may contact the reducing process fluid indirectly via a heat exchanger. In the indirect case, the thermal storage working fluid convectively heats a plate or tube wall of a heat exchanger that then heats up the process fluid. The heated process gas is directed to the reducing reactor and the cooled thermal storage working fluid may be recirculated back to the thermal storage system for reheating or used for a secondary, lower temperature heat use such as steam generation or ore preheating. The thermal storage working fluid may still be at a high enough temperature after exiting the process gas heat exchanger to supply heat to another thermal process such as steam generation for use in a power cycle.

Figure 7A:
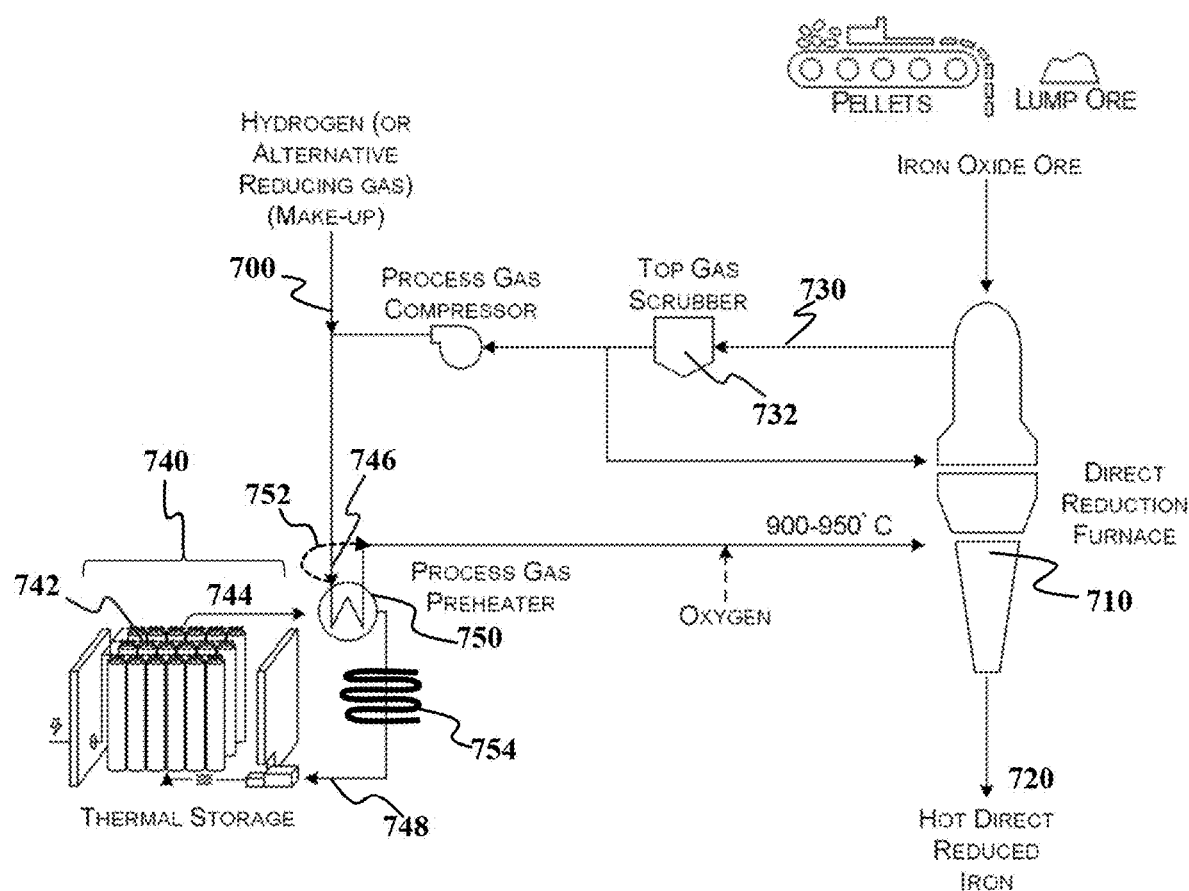
FIGS. 7A-7B show schematics of systems and methods associated with a DRI process receiving heat from the thermal energy storage system.

FIG. 7A depicts one example of a DRI system that includes a material processing reactor 710 such as DRI furnace and an electrically heated thermal storage system

740. An electric heater can be used to heat the thermal energy storage medium 742 to store energy therein, particular at times during day when electrical energy is low cost. A thermal storage working fluid such as air is heated by the thermal energy storage medium 742 to high temperatures. The working fluid as indicated by arrow 744 can then exchange heat directly or indirectly with the reducing process gas stream 746 of the DRI such that the DRI process gas stream is brought to the desired reactor temperature via process gas preheater 750. The process gas may be hydrogen, hydrocarbons, carbon oxides, natural gas, syngas, or combinations of those gases or other gases. The incoming process gas may be in the range of about 100° C. and the process gas exiting the preheater 750 may be in the range of about 900° C. or higher. Optionally, there may be one or more heat exchangers 754 after the preheater 750 to bring the return temperature of the TES working fluid to a temperature acceptable for reheating by the thermal energy storage unit. Heat exchanger 754 may contain water/steam for use in a power cycle and/or process or it may contain another fluid such as heating oil.

The high temperature thermal storage fluid contacts the reducing process gas indirectly via a preheater 750 such as but not limited to a heat exchanger. The preheater 750 may be a metal gas-to-gas heat exchanger, a ceramic gas-to-gas heat exchanger, or other suitable heat exchange device operable at temperature ranges desired for the process gas. The flow through the preheater 750 may optionally be a countercurrent flow as indicated by arrow 752, not necessarily a co-current flow. The thermal storage working fluid 744 convectively heats a plate or tube wall of a heat exchanger in preheater 750 that then heats up the process fluid. The heated process gas is directed to the reducing reactor 710 and the cooled thermal storage working fluid 748 may be recirculated back to the thermal storage system for reheating. Processed material such as hot direct-reduced iron exits the material processing reactor 710 indicated by arrow 720. At the top of the reactor 710, the exhaust process gases 730 exit at a much lower temperature than they were introduced as the cold fed iron ore cools the process gases at the top of the reactor. The exiting process gases are a mixture of unreacted reducing gases, reduction reaction byproducts, and particulates. The process gas stream 730 is regenerated by quenching and scrubbing at scrubber 732 to remove particulates, $CO_2$, and humidity. Additional process gas 700 is added before the stream is re-heated and circulated back to the material processing reactor 710.

In another embodiment, the process gas stream is a reducing gas stream directed through a conduit such as piping, vessel, or a heat exchanger to the thermal storage system exposing the pipe or tube walls containing the reducing process gas to the high temperature thermal storage medium. In this process, the high temperature solid storage material radiatively heats up the process gas tube at a much higher heat transfer rate than using the convective gas-to-gas heat exchanger mentioned earlier in another embodiment due to the change in heat transfer mode. The high temperature thermal storage medium radiates heat to the reducing process gas tube or pipe. In this embodiment, the thermal storage unit may still use a heat transfer fluid to transfer heat to a second use such as power generation.

Figure 7B:
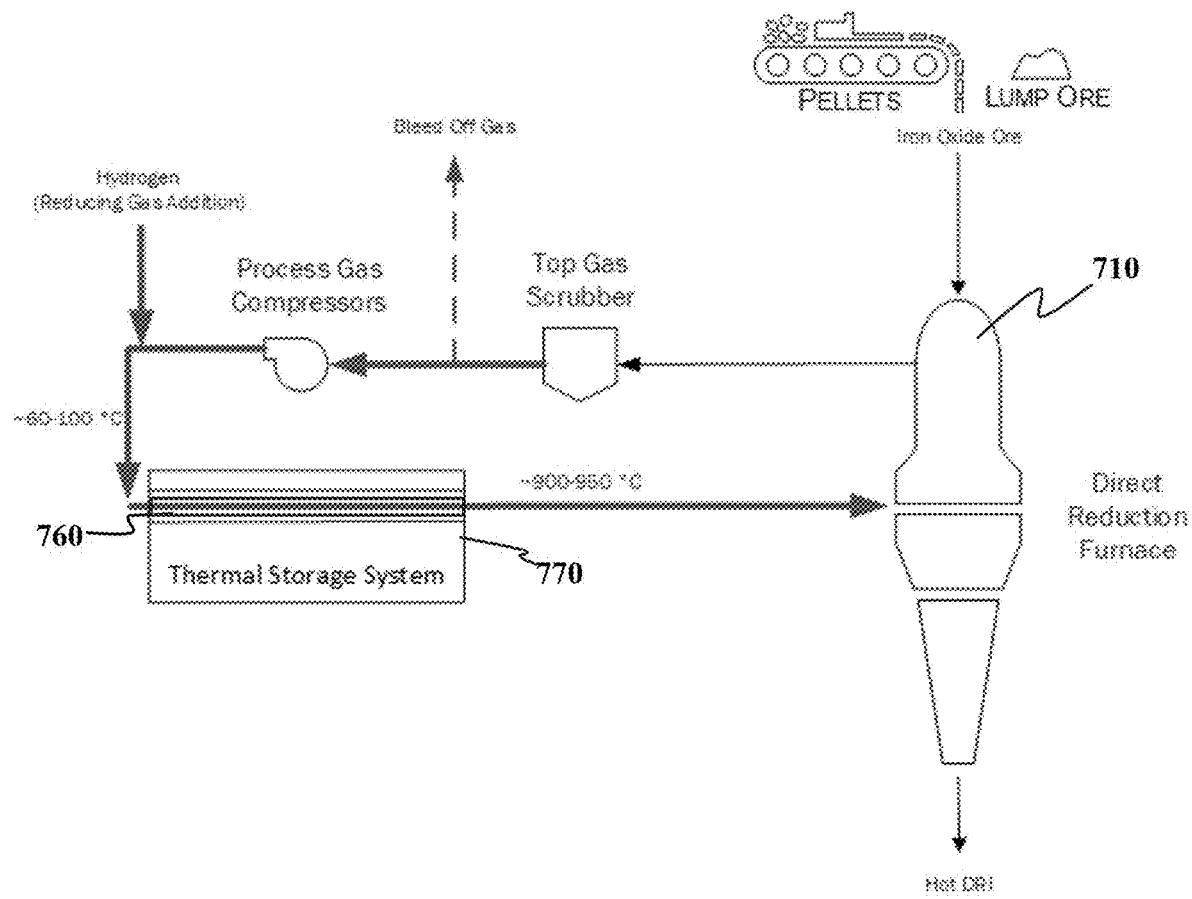

FIG. 7B shows a schematic of the thermal energy storage system as applied to process gas heating for DRI where the DRI reducing gas stream is heated indirectly via radiation from the TES storage medium 770. The solid material of the storage medium 770 at high temperatures radiates heat to its surroundings. The vessel 760 containing the fluid to be heated is configured such that it is exposed to high temperature radiation of the thermal energy storage medium 770. The vessel 760 may be tubing, piping, or other conduit for carrying the process gas. In FIG. 7B, the fluid to be heated is hydrogen gas, but may also be some other composition of reducing gas. The vessel/tube walls of vessel 760 may be designed to have increased emissivity to make the radiative heat transfer more effective. There may be thermal radiation shields used for more precise control over the heating. These radiation shields may be moveably positioned between the radiative surface of the storage medium 770 and the vessel 760. As the colder fluid is directed through the inside of the tube/vessel 760, it is heated by the walls of the vessel. The walls/surfaces of the tube/vessel 760 are resultingly cooled by the continuous flow of cooler fluid. As the TES storage medium 770 radiates heat to the walls of the tube, the radiating surface of the storage medium 770 gets cooler.

Preheating process gas or gases using thermal energy from a thermal energy storage unit may occur in a DRI process with a reformer or without a reformer. In a conventional process with a natural gas reformer, electrolytic hydrogen may be added to the reduced gas stream after the reformer to partially reduce the carbon intensity of the process. In this case, the thermal energy storage system may act as a hydrogen preheater to get the added hydrogen to the reactor temperature. In a DRI process without a reformer, the thermal energy storage unit may heat nearly the entire process stream before it enters the reducing reactor.

The above embodiments of a thermal energy storage system providing heat to a process gas stream also apply to process gas streams not associated with direct reduced ironmaking such as for the production of Sustainable Aviation Fuel (SAF) and other electrofuels. This also applies to adding heat to drive a reforming reaction such as steam methane reforming, dry reforming, and autothermal reforming.

b. Using Thermal Energy Storage to Drive Reforming Reaction

In another embodiment, instead of preheating a reducing process gas stream, the thermal energy storage system may provide the driving thermal energy for a reforming reaction. Here, the feedstocks to be reformed (e.g. methane and steam) are introduced to the thermal energy storage system. The thermal energy storage system provides high temperature heat to reactor tubes containing the reforming feedstock. The tubes may be lined or packed with a catalyst for the desired reforming reaction. The catalysts used for steam methane reforming are commonly nickel based but may also be platinum group metals. The reforming feedstock will get heated by the thermal energy storage system to temperatures in the range of approximately 700° C. to 1050° C. depending on the feedstock and desired composition of syngas for the direct reduction reaction. Similar to the process gas preheating, the reactor tubes may be indirectly heated radiatively by the thermal energy storage medium and/or convectively by a thermal storage working fluid. An example of this embodiment where the TES heats the reformer convectively in depicted in FIG. 24. The resulting reformed gas stream is some composition of carbon oxides, hydrogen, and unreacted hydrocarbons and are ready for injection into a conventional natural gas DRI process. Within the DRI reactor, the produced reducing gas reacts with iron oxide to produce iron. Depending on specific reactor conditions, oxygen or air may be added to the DRI reactor to react with reducing gas species (such as methane, carbon monoxide, or hydrogen) to generate additional heat for temperature management within the furnace. The composition of the exhaust gas exiting the DRI furnace varies depending on specific reactor conditions but is primarily composed of the major biproducts of the iron oxide direct reduction reactions, which are water vapor ($H_2O$) and carbon dioxide ($CO_2$). The exhaust gas will also contain unreacted reducing gas species such as methane, carbon monoxide, and hydrogen. If air is added for temperature management, the exhaust will also contain unreacted oxygen, nitrogen, and other minor components in air.

In one implementation, the thermal energy storage system partially or fully drives the reforming reaction by adding high temperature oxygen, air, or a gas composition including oxygen to reforming tubes. The high temperature gas from the thermal energy storage system may be combined with exhaust gas from the DRI reactor such that the high temperature oxygen from the thermal energy storage system reacts with leftover fuel species of the exhaust stream (previously referred to as unreacted reducing gas such as carbon monoxide, methane, and hydrogen), in a full or partial combustion reaction to generate additional heat for the reforming reaction. This process addresses two problems. The first is that it usefully uses any leftover fuel species in the exhaust gas. Many well-known chemical processes produce an exhaust stream that contains fuel. It is often required to break down these fuel species to carbon dioxide and water for environmental, safety, and economic purposes. Some processes achieve this by recirculating the exhaust stream back to the primary reaction for additional conversion, combust the exhaust stream with oxygen or air to produce useful heat in another process, or flare it to the environment (combust the fuel-containing species and vent to the environment. The second problem in this process is the heat and heat rate required to drive reforming reactions. Conventionally, reformers are driven by a series of fossil-fuel fired burners that are exposed to the reforming tubes, as the reforming reactions may require precise control of heating rates in order to arrive at the desired composition of reducing gas. The same heat rate may be difficult to replicate when replacing radiant, fuel fired burners with hot gas from a thermal storage system. The current implementation combusts the left-over exhaust gas to combust with high temperature gas from the thermal storage system to produce additional heat to drive the reforming reaction. The combustion may be flameless. The exhaust gas may be directed to a burner where it reacts with the hot gas from the TES to produce a flame such that it radiates heat to the reforming tubes to achieve a higher heat transfer rate.

Figure 27:
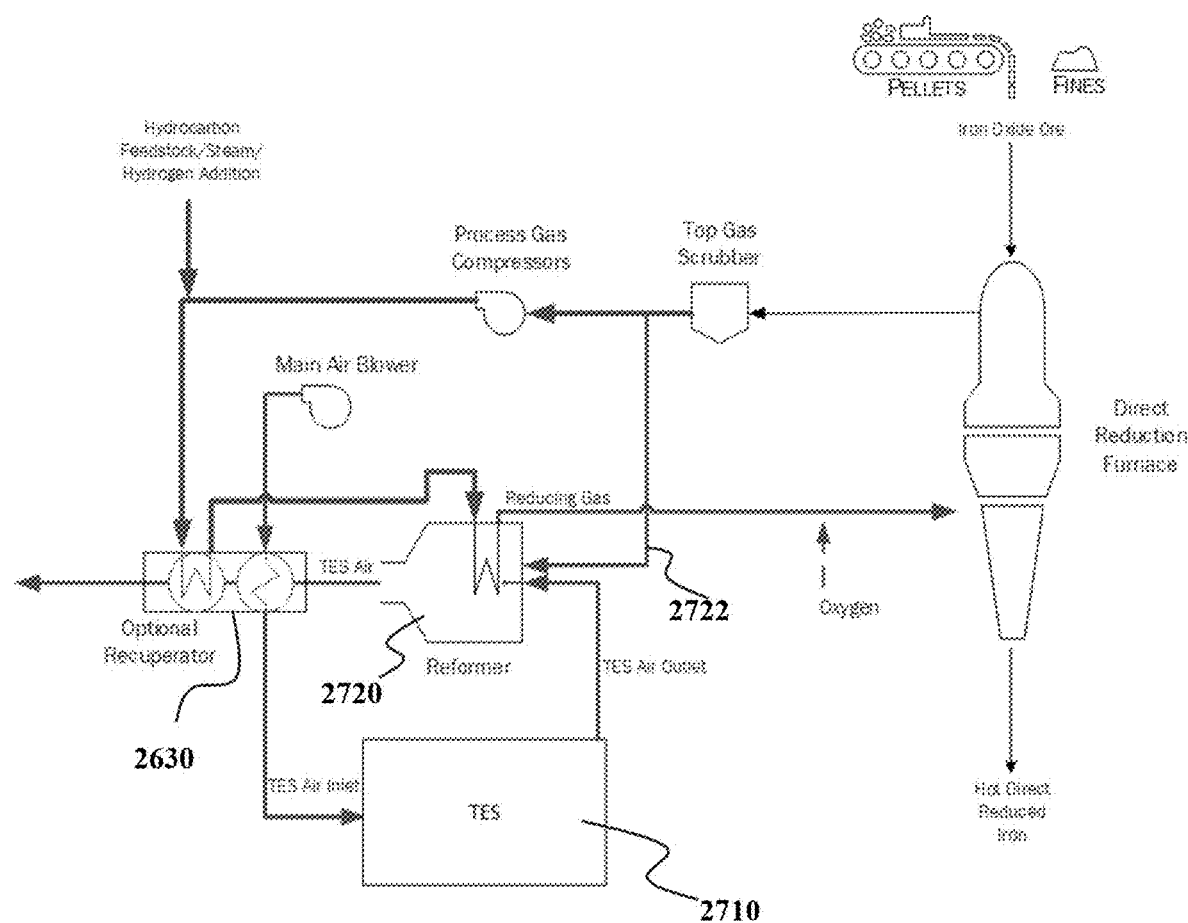
Figure 28:
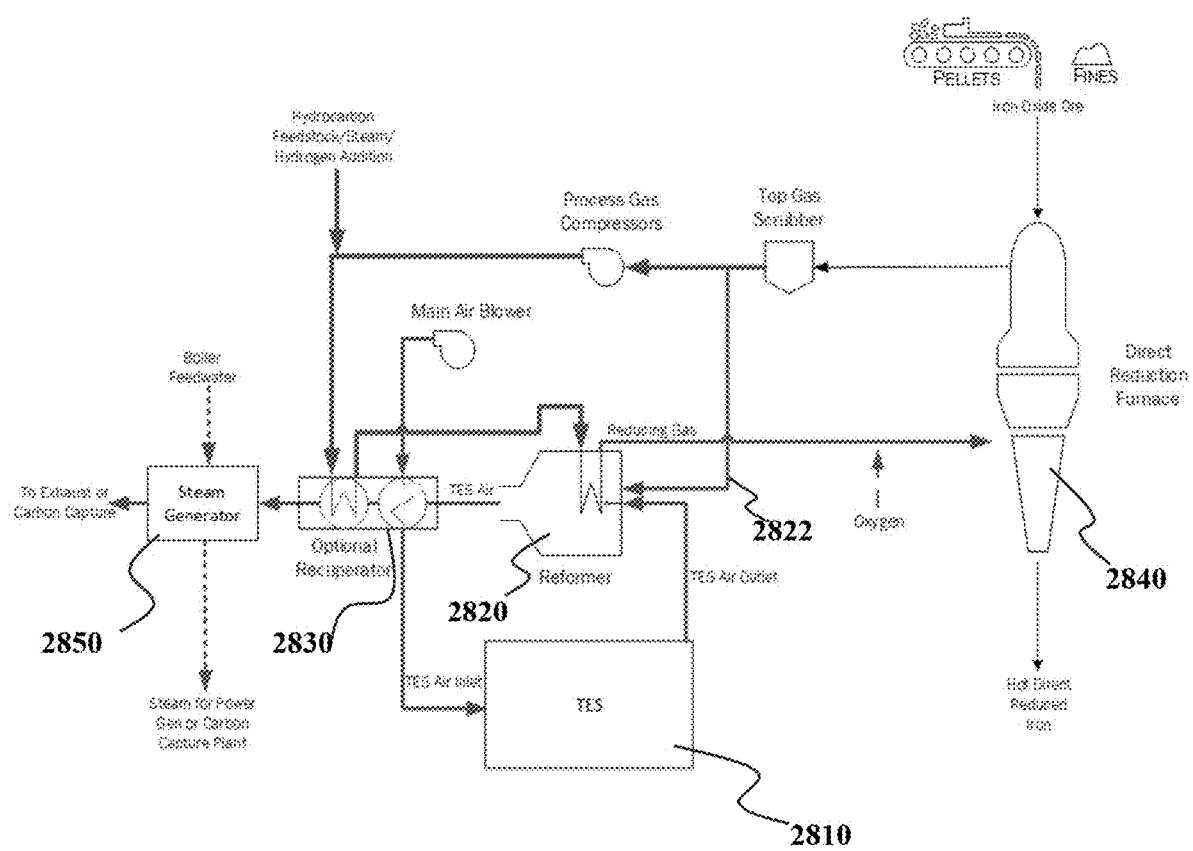
Figure 29:
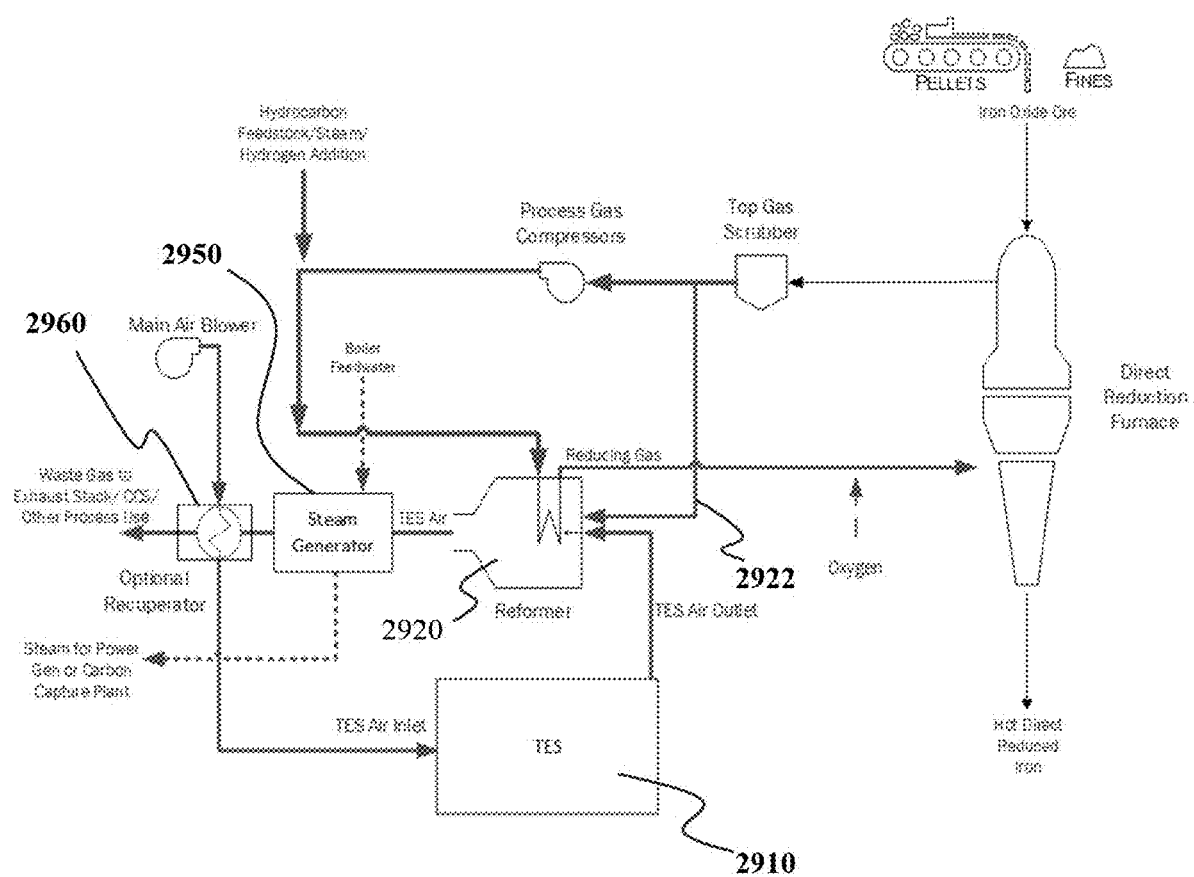

As seen in FIGS. 27-29, the resulting exhaust gas from the reformer combustion exits the reformer as a high temperature as a reformer exhaust gas. As mentioned previously, a second use is possible with this high temperature exhaust. The combined reformer exhaust stream may interact with a series of heat exchangers to recover heat for processes. The heat exchangers may be configured such as to minimize the temperature difference between the reformer exhaust gas and the stream to be heated. For example, the highest temperature reforming exhaust gas may exit the reforming reactor at a temperature of 1000° C. It may first convectively preheat electrolytic hydrogen in an indirect heat exchanger to a temperature of 900° C. After exiting the hydrogen preheater, the reforming exhaust gas may heat steam such that it exchanges heat with the superheater, evaporator, and economizer in that order. The generated steam may be used in a steam turbine to generate electricity and/or used in a process that requires steam such as a sorption carbon capture process (like the art example in FIG. 21). After heat exchange, the reformer exhaust gas is cooled sufficiently to be released to be released to the environment or, in the case of green steel production, directed to a carbon capture process.

One embodiment in FIG. 28 depicts a TES system 2810, a reformer 2820, a DRI reactor 2840, and post combustion carbon capture plant. Here the TES may provide heat to a first heat use of driving the reforming reaction where a hydrocarbon such as methane is converted into hydrogen and carbon oxides to serve as the reducing gas in the DRI furnace. The hot reducing gas is introduced to the DRI reactor as seen in conventional, art approaches to DRI. The direct gases react with the iron oxide and the gases exit the reactor. Often, the off gases contain some unconverted carbon oxides, hydrocarbon, and/or hydrogen that can be combusted with oxygen to generate heat such that the resulting stream is primarily carbon dioxide and water vapor. Alternatively, the unconverted off gases may be re-introduced to the DRI reactor to provide additional reducing capability or heat. The off gases often exit the reactor at an elevated temperature. The gas may be directed to preheat ore before it enters the DRI furnace. After heat recovery and utilizing unconverted fuels in the off gas, the stream is scrubbed of any particulate matter and cooled for water vapor knockout, it is directed to a carbon capture system where a sorption process is used to separate carbon dioxide from the exhaust gas stream. The sorption capture process is regenerated with low pressure steam. This low-pressure steam is the second heat load of the TES system. The TES system first heats reducing gas or drives the reforming reaction convectively and/or radiatively. The thermal storage working fluid may still be at high temperature after the first heat load. The working fluid is directed to a steam generator/heat exchanger that produces the steam required for the carbon capture process. If the steam is generated at high pressure, a steam turbine can be used to generate electricity along with the low-pressure steam required by the carbon capture process. This process is an alternative method to produce DRI steel with low carbon intensity.

c. Using Thermal Energy for a Second Heat Use

As mentioned above, a thermal energy storage working fluid may still be at an elevated temperature after exchanging heat with the process gas stream. Some thermal energy storage technologies rely on storing heat sensibly; the storage capacity is defined by the material's heat capacity and the temperature difference of hot and cold states. In order to maximize the amount of useful thermal energy storage capacity that a given mass of storage media provides, there may be a motivation to further cool the working fluid before being reintroduced to the thermal storage medium. Another motivation for cooling the recirculated working fluid may be to simplify the fluid movement system. The working fluid may require a compression device such as a pump, fan, compressor, or blower to move the working fluid through heat exchangers and storage system. Another potential motivation is if the fluid is unable to be recirculated. Perhaps the fluid picks up particulate matter or changes composition via chemical reaction or gas addition in the process. Like waste heat recovery for combustion flue gases, heat should be recovered before it is lost to the environment. It is much more effective to compress a fluid at a lower temperature than at high temperatures, as compression devices become more compact, efficient, and have less stringent material constraints. These factors may result in reduced capital and operating costs for the fluid movement system. The working fluid may be recirculated to the thermal energy storage system for reheating, or it may be directed to a secondary, lower temperature heat load to be cooled before recirculation. Example secondary heat loads may be ore preheating, steam generation or a power cycle.

A thermal power cycle may be beneficial because there are significant continuous electric loads at steel plants. For example, after heating up the reducing process gas stream the thermal storage working fluid can transfer heat to high pressure water or steam. That steam can be expanded across a steam turbine to generate continuous power.

Figure 8:
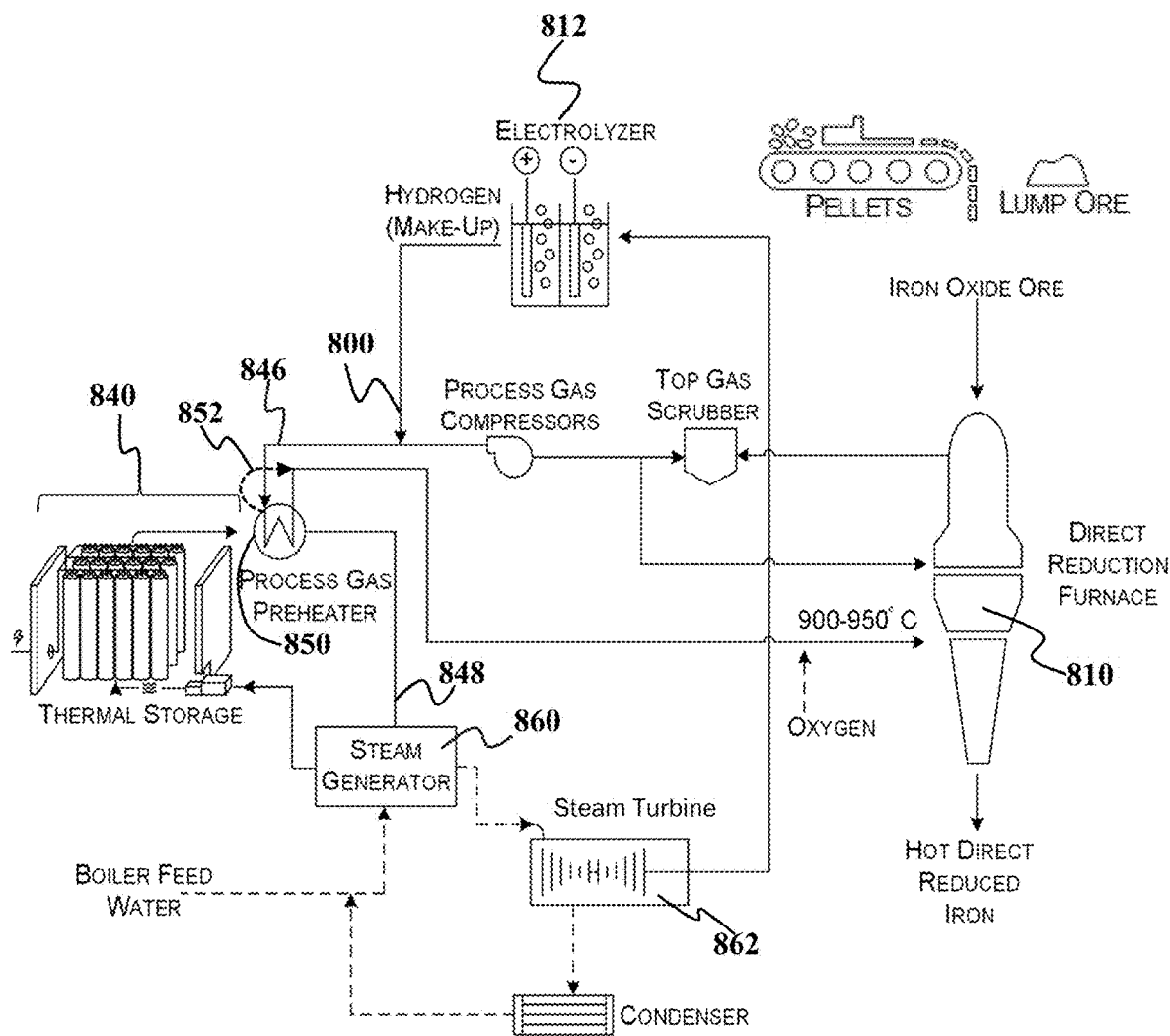
FIG. 8 shows a schematic of a system and method associated with DRI process receiving heat from the thermal energy storage system, including a steam generator, steam turbine, and compressor.

FIG. 8 depicts such a system that uses the cooled thermal storage working fluid 848 for a second use. The flow through the preheater 850 could be a countercurrent flow as indicated by arrow 852, not a co-current flow. After heating the process gas stream 846 at preheater 850, the cooled working fluid 848 may still be at a high enough temperature to supply heat to another thermal process such as steam generation for use in a power cycle. For example, after heating up the reducing process gas stream 820, the thermal storage working fluid 848 can transfer heat to high pressure water or steam by way of one or more heat exchangers in steam generator 860. That steam can be expanded across a steam turbine 862 to generate continuous power.

If the thermal storage system 840 is charged using renewable electricity, the ultimate product is continuous renewable heat and renewable electricity. In a steel or DRI plant, the clean electricity from turbine 862 may be used to power a continuous electric demand such as electrolyzer 812 for hydrogen production or an Electric Arc Furnace (EAF) (not pictured) that receives produced DRI from the DRI reactor/furnace for the subsequent stage in the steelmaking process.

In another embodiment, the thermal energy storage system first indirectly provides heat to tubes (via radiation and/or convection) containing either a reducing gas stream or reforming feedstock such that a high temperature reducing gas stream is produced ready for injection to the direct reduction reactor. After the first heat use, high temperature thermal storage working fluid is directed to come into direct contact with the solid iron oxide ore prior to being introduced to the direct reduction furnace. The second heat use is then preheating the ore to minimize the energy consumption within the direct reduction reactor. The direct heat exchange for this second ore preheating step may be performed in several way depending on the specific process and physical form of the ore. Iron oxide ore can be introduced to a DRI furnace as pellets or as fines with fines being much smaller than pellets. The shape and size of the ore is important at this stage as it impacts the effectiveness of convective heat transfer. Fines can be directed through an updraft heater with the hot working fluid gas from the TES system enters from below. Good mixing can be achieved in a gas suspension or fluidized bed heater configuration to allow for fast and uniform heat transfer. The increased size of pellets may require a different heating apparatus. For example, the hot gas from the TES system may be introduced to the ore in a preheating grate or conveyor system for longer exposure. The ore may be further preheated by combusting off gas exiting the direct reducing furnace. After providing heat to the ore, the gas may be recirculated to the TES system for reheating or treated and exhausted to the environment.

Figure 13A:
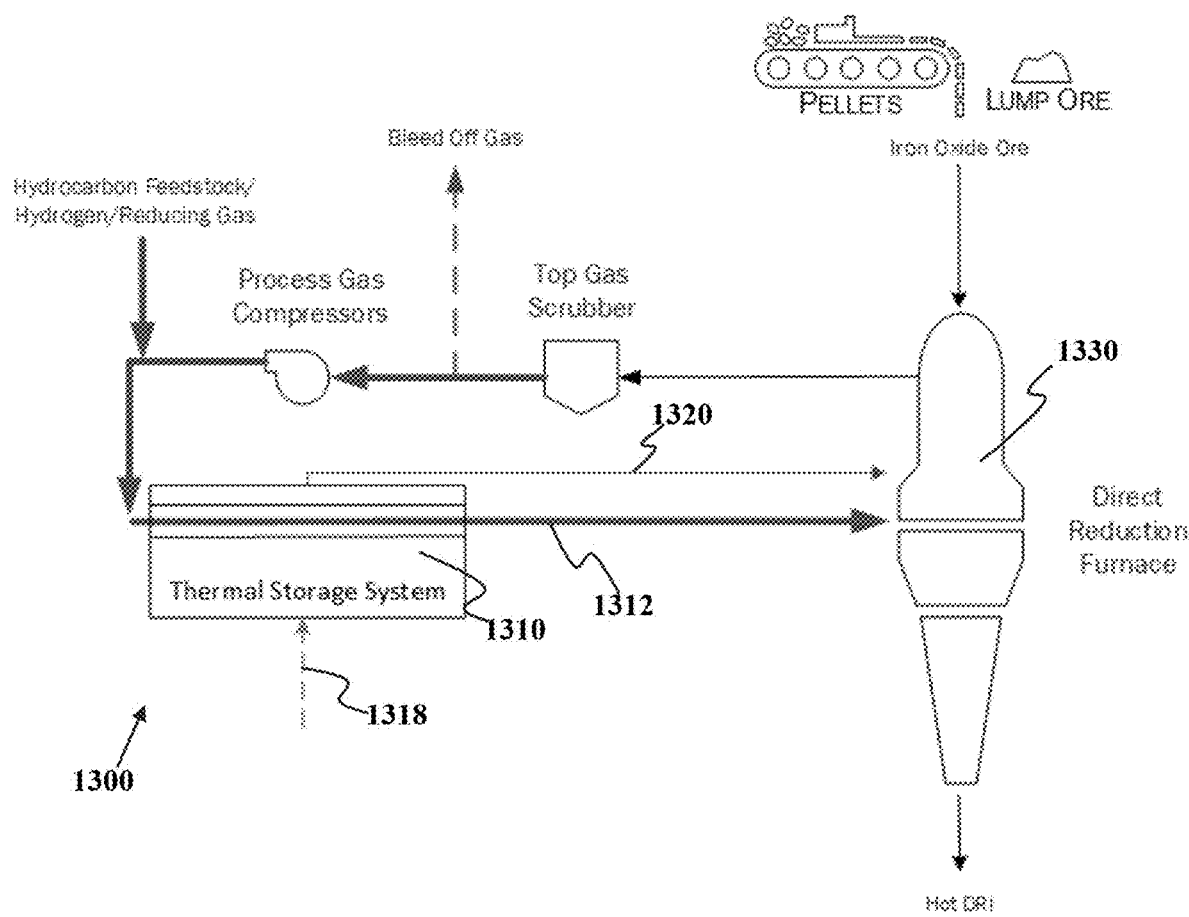

FIG. 13A shows a schematic of a system 1300 associated with a DRI process receiving high temperature hydrocarbon feedstock such as syngas or hydrogen reducing gas produced from a reforming process that is driven by heat from the thermal energy storage system via radiation from the thermal energy storage 1310. In addition to radiating thermal energy to the process gas stream 1312, a convective working fluid discharge stream 1320 is also considered. In this schematic, the working fluid discharge stream 1320 is directed to the DRI reactor 1330 to provide additional heat and temperature management. The working fluid discharge stream 1320 enters as a lower temperature stream 1318 that is heated by the thermal energy storage unit 1310 before being directed to the reactor 1330. The working fluid discharge stream 1320 may contain at least some oxygen gas that may participate in combustion within the material processing reactor 1330.

Figure 13B:
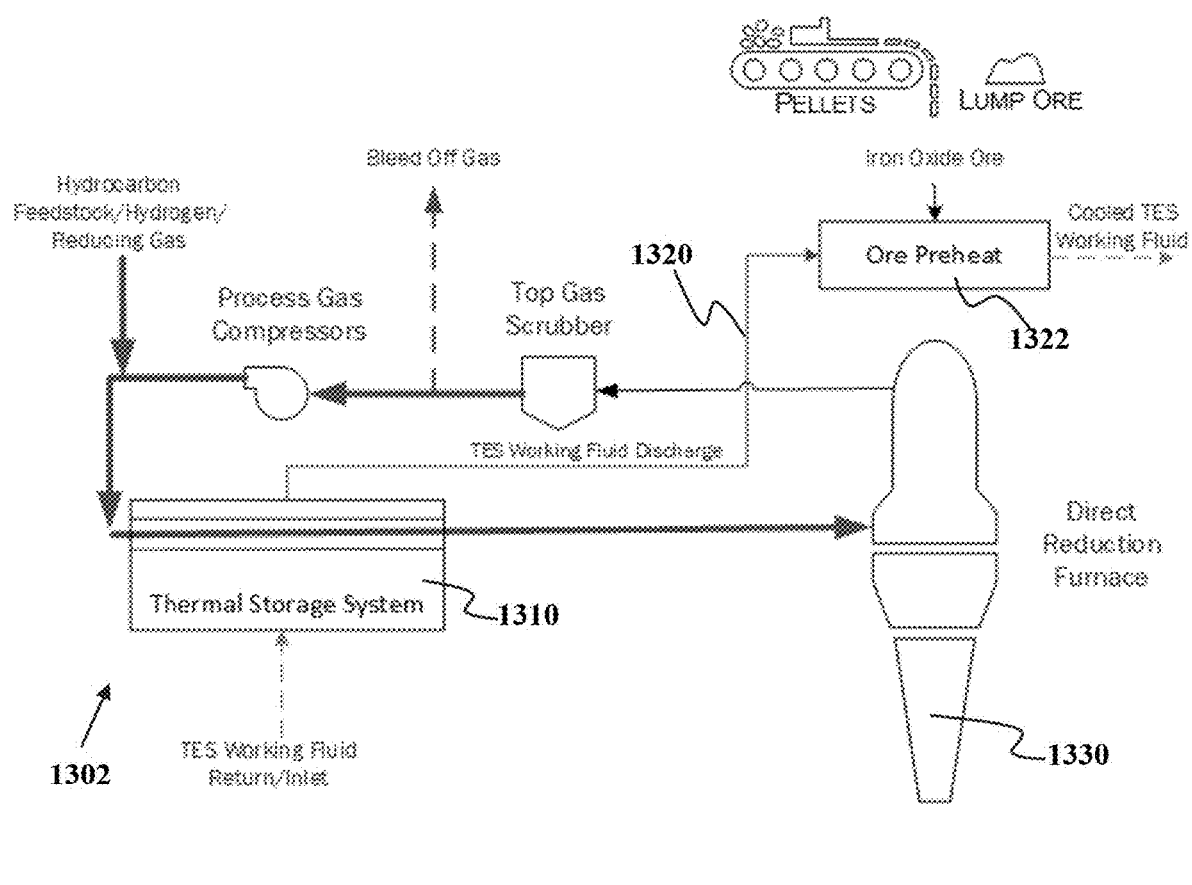

FIG. 13B shows a schematic of a system associated with DRI process similar to that shown in FIG. 13A. In addition to radiating thermal energy to the reforming feedstock or process gas, a convective working fluid discharge from the TES 1302 with storage medium 1310 is also considered. In this schematic, the working fluid stream 1320 is directed to preheat iron ore at heater 1322 prior to entering the DRI reactor 1330 to provide additional heat and minimize heat demand within the DRI reactor.

Heating the solid iron oxide ore material at heater 1322 to approach the operating temperature of the direct reduction reaction in the direct reduction reactor/furnace minimizes the impact of the increasing endothermicity of the reaction that results from increasing the hydrogen gas makeup of the reducing process gas, relative to the carbon oxide makeup. If green steel is desired and hydrogen is the sole reducing component in the DRI process, the reaction is entirely endothermic, and temperature management within the reactor is a critical consideration.

d. TES Heat Transfer via Convection and/or Radiation

Throughout the above process descriptions for integrating thermal energy storage, the method of transferring the stored heat from the thermal energy storage system to a reducing gas or a reforming reaction is broadly specified to be indirect and convective and/or radiative. While that level of specificity is considered adequate when considering the full process integration and method of producing DRI steel, there are innovative concepts around how the indirect heating of process gas by a thermal energy storage system is carried out. While the following concepts can be applied to application in the steel industry and DRI production more specifically, they also apply to a much broader range of applications that require process gas preheating.

Broadly, the following refers to a thermal energy storage system that includes a thermal energy storage medium and a thermal energy storage working fluid that heats a fluid to high temperatures. The thermal energy storage working fluid may be liquid (e.g., water, heating oil, molten metal, molten salt, or some other heat transfer liquid) or gas (e.g., air, nitrogen, noble gas, $CO_2$, or some other combination of gaseous species). The thermal energy storage medium may be a solid (e.g. refractory brick, graphite, concrete, rocks, metal, or ceramic) or be a multiphase medium (e.g. two or more dissimilar materials such that one material melts to a liquid when heated and the other(s) remain as solid) or be a liquid (such as molten metal or molten salt). In this case, thermal energy may be stored and used as both sensible and latent heat. In some cases, the thermal energy storage medium and the thermal energy storage working fluid may be the same (in the case of both being liquid). The thermal energy storage medium may be composed of chemically reactive components such that a reversible reduction-oxidation reaction can be used to store and release heat sensibly and chemically. The working fluid may be directed back to the thermal energy storage system in a closed loop at temperatures higher than ambient after transferring heat to the process fluid.

Figure 9:
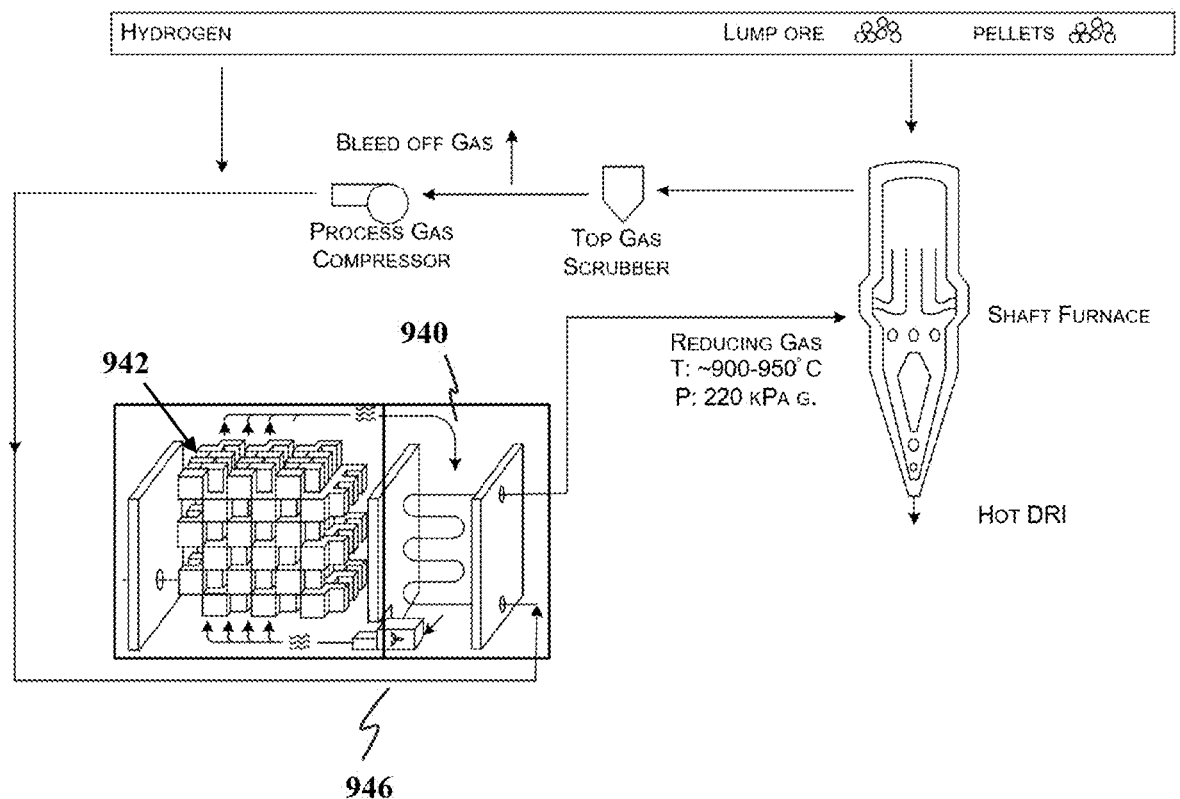
FIG. 9 shows a schematic of a material processing reactor where the process gas indirectly interacts with a thermal energy storage system.

In one embodiment as seen in FIG. 9, the thermal energy storage system uses a working fluid to convectively and indirectly heat a gas that is composed partially or entirely of hydrogen. In other embodiments, a hydrogen containing process gas is indirectly heated via radiation from the TES storage medium where the storage medium is in a gaseous environment. The hydrogen-containing gas 946 is directed to the thermal energy storage system in a sealed vessel (pipe, tubes) that prevents the gas from leaking into the environment or thermal energy storage system. Hydrogen gas does not typically exist freely in nature as it is extremely reactive with oxygen (the most abundant element on Earth) as well as every other element in the periodic table except for the noble gases. In processes that handle hydrogen, extreme precaution may be taken to prevent hydrogen leaks to avoid catastrophic events (such as explosions and flameless fires). However, hydrogen is very prone to leaks as it is the smallest atom, and its molecular form ($H_2$) is the smallest molecule. The hydrogen containing vessel entering the thermal energy storage system may also be at pressure. For example, hydrogen for use in a DRI process may be at pressures between 2 and 4 bar(a). This makes the management of leaks more difficult, as fluids tend to flow from higher pressure to lower pressure. Further, the vessel containing the hydrogen gas throughout the thermal energy storage system may be designed for the heating of hydrogen to high temperatures (greater than 900° C.). This makes leak prevention even more difficult, as the seals and vessel material may also be heated to high temperatures which may open pathways for hydrogen to escape as the molecules making up the seals and vessel get spaced apart further. For this reason, special considerations may be taken to avoid catastrophe. The thermal energy storage working fluid or gaseous environment is heated by the thermal energy storage medium 942 and is directed to come into direct contact with the exterior of the vessel 940 containing the hydrogen gas so as to, at least partially, indirectly heat the hydrogen gas. The TES working fluid or environment may be composed of inert elements such as a noble gas or be composed of chemicals that provide a protective environment (e.g. nitrogen) such that in the event of a leak, hydrogen does not interact with oxygen and combust. Further, the TES working fluid or environment may be maintained at a pressure greater than that of the hydrogen-containing gas in the vessel. This way, in the event of a leak, the TES working fluid or gaseous environment would leak into the hydrogen-containing vessel rather than having the hydrogen leaking into the TES or the environment.

If the working fluid is made to create a protective/inert atmosphere and be maintained at a pressure higher than the hydrogen containing gas stream, it may mean the thermal energy storage system should be contained in a vessel that prevents ambient air from mixing with the thermal energy storage system. The vessel may be designed for more effective heat transfer by increasing heat exchange surface area with a series of smaller vessels that contained the hydrogen gas. The heat exchange apparatus may be composed of a bundle of tubes/vessels containing the hydrogen gas and may use fins to further promote effective convective heat exchange. After exchanging heat with the hydrogen containing gas stream, the cooled TES working fluid may be used to convectively provide heat to another process before being circulated back to the thermal energy storage medium to be reheated.

Figure 10:
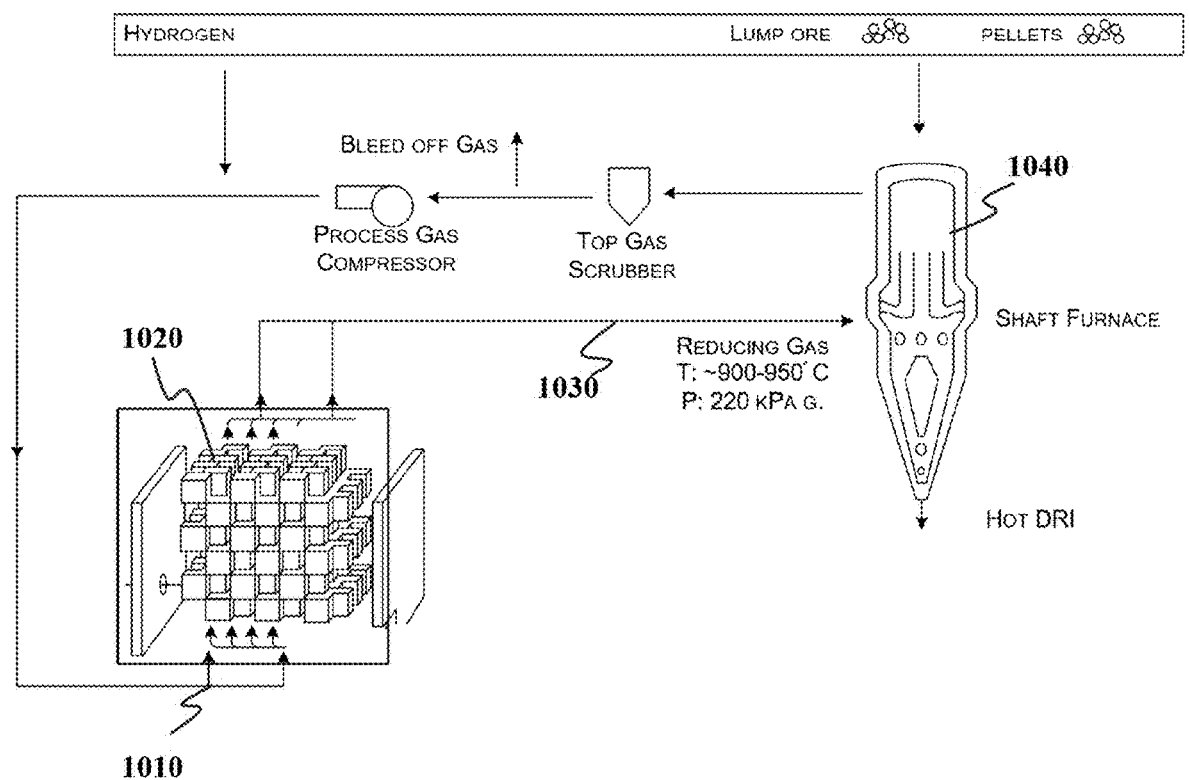
FIG. 10 shows a schematic of a material processing reactor where the process gas directly interacts with a thermal energy storage system.

In one embodiment as depicted in FIG. 10, the process gas 1010 such as a reducing gas is circulated directly through the thermal storage medium 1020. Reducing process gas (e.g. hydrogen produced by electrolyzers) directly contacts the thermal storage medium 1020 and is heated convectively. The reducing process gas is discharged from the thermal energy storage system as indicated by arrow 1030 and is directed to a DRI reactor 1040 which may be a shaft furnace where process gas reduces the iron ore.

Figure 11:
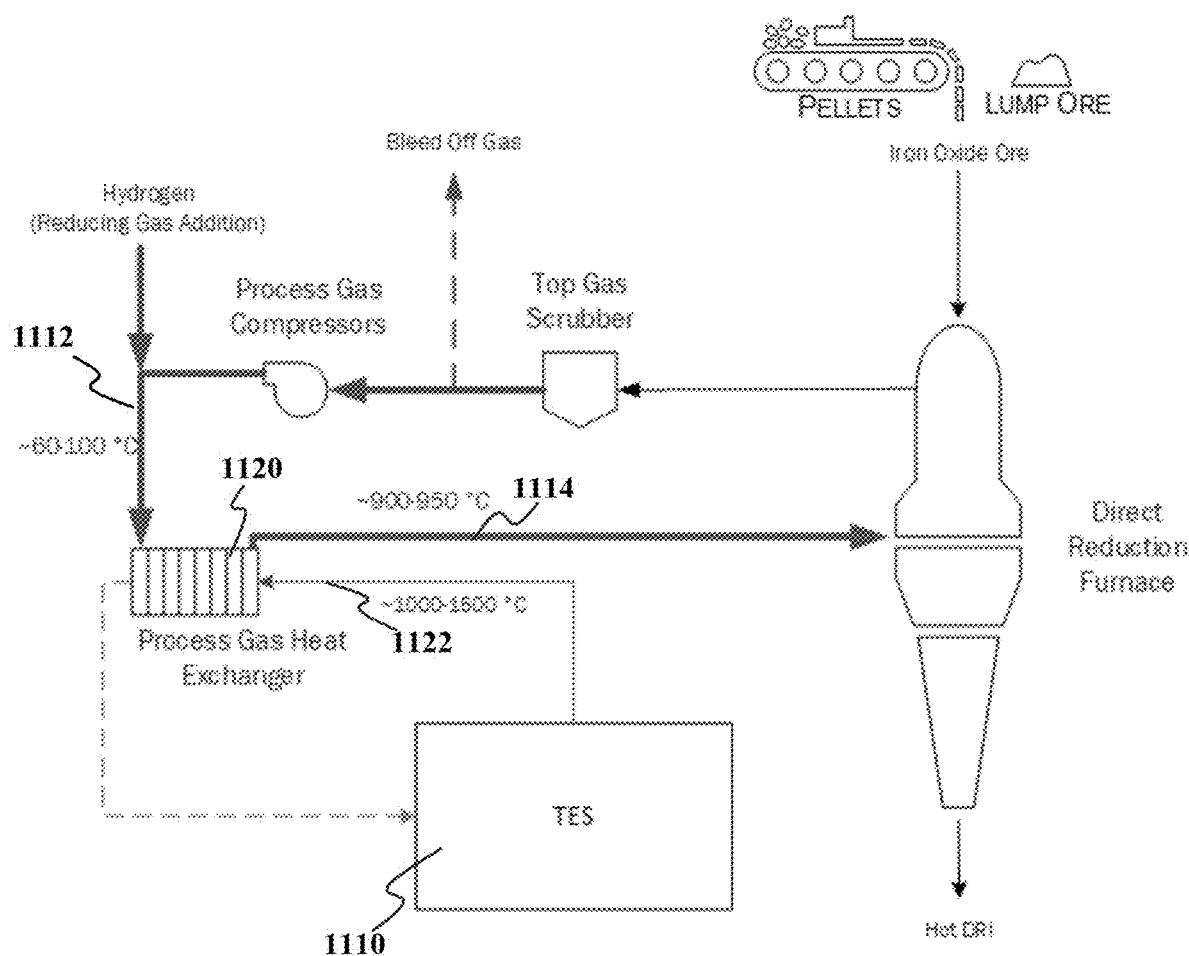
FIG. 11 shows a schematic of material processing system using one implementation of a heat transfer technique from the TES unit.

FIG. 11 depicts a material processing system 1100 for processing a material using heat from a thermal energy storage unit 1110 and a process gas stream 1112. The TES unit 1110 interacts with a countercurrent heat exchanger 1120 to provide heat transfer efficiency between a working fluid of the TES unit 1110 and the process gas stream 1112. As seen in FIG. 11, the process gas stream 1112 enter from one end of the countercurrent heat exchanger 1120 that this opposite the end that the working fluid 1122 enters. The fluid or gas streams flow in opposing manners through the heat exchanger 1120. FIG. 11 also shows that in this example, the working fluid 1122 can have temperature in the range of about 1100° C. to 1500° C. when entering heat exchanger 1120 and the process gas stream 1114 exits the heat exchanger 1120 with a temperature in the range of about 900° C. to 950° C.

Figure 12:
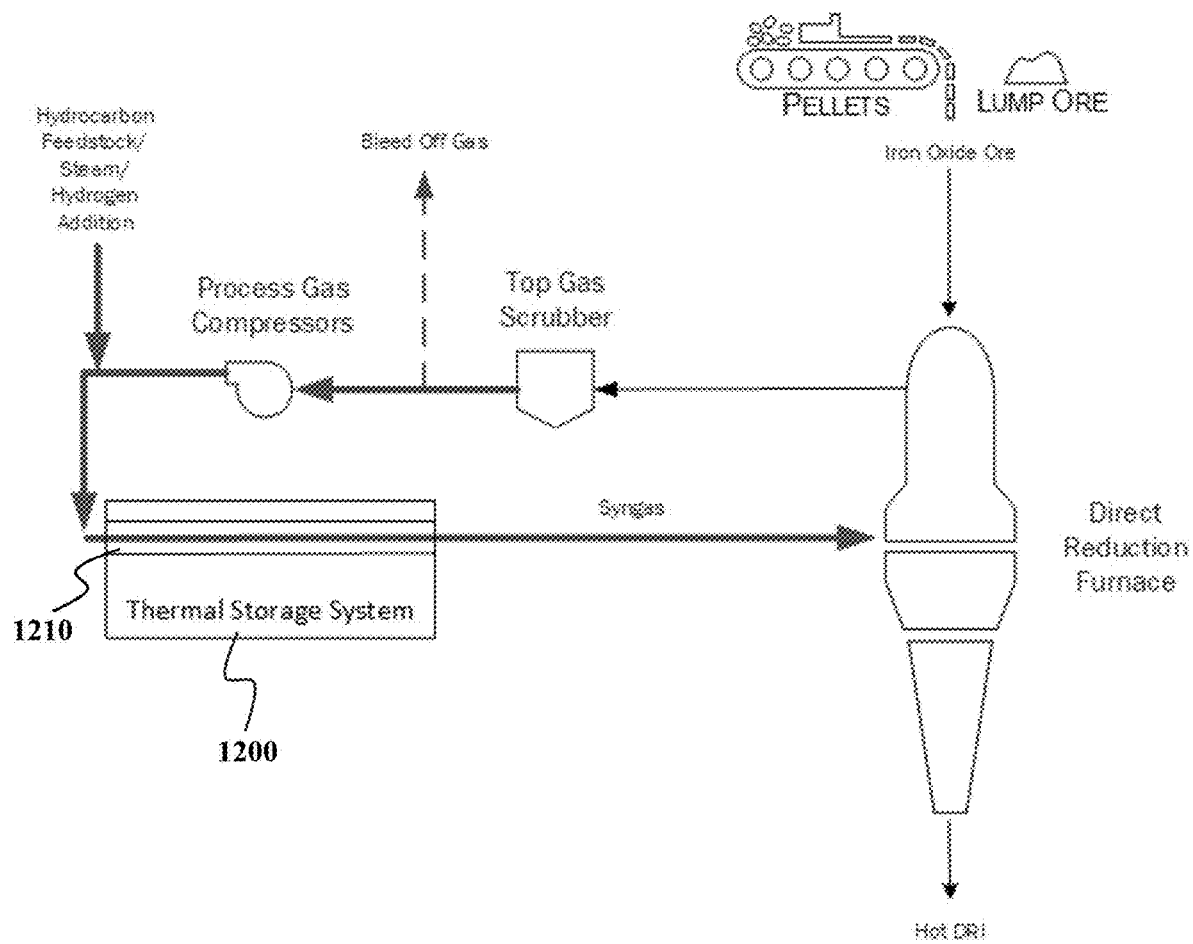
FIGS. 12-13B show schematics of systems receiving heat from the thermal energy storage system via radiation.

In another embodiment as seen in FIG. 12, the thermal energy storage medium in the TES unit 1200 is heated electrically to very high temperatures. The fluid to be heated is introduced to the TES storage medium in a sealed vessel 1210 that absorbs thermal radiation from the hot thermal storage medium. FIG. 12 shows a schematic of the thermal energy storage system as applied to heating and/or reforming for DRI. where the DRI reducing gas stream (e.g. hydrocarbon feedstock, steam and methane, CO2 and methane, some combination, or other gases) is heated indirectly via radiation with a TES storage medium. FIG. 12 shows a schematic of a system and method associated with DRI process receiving high temperature syngas produced from a reforming process that is driven by heat from the thermal energy storage system via radiation from the thermal energy storage media to tubes containing the reforming feedstock.

In this embodiment, the thermal energy storage medium at high temperatures radiates heat to its surroundings. The vessel containing the fluid to be heated (e.g. hydrogen gas, steam and methane, $CO_2$ and methane, naphtha, ethane) is configured such that it is exposed to high temperature radiation of the thermal energy storage medium. The vessel/tube walls may be designed to have increased emissivity to make the radiative heat transfer more effective. There may be thermal radiation shields used for more precise control over the heating. As the colder fluid is directed through the inside of the tube/vessel, it is heated by the walls of the vessel. The walls/surfaces of the tube/vessel are resultingly cooled by the continuous flow of cooler fluid. As the TES storage medium radiates heat to the walls of the tube, the storage medium gets cooler.

Many industrial processes that this application relates to desire continuous operation under constant process conditions. If the thermal energy storage medium is charged/heated intermittently, an important consideration is maintaining the radiative facing temperature of the TES surface interacting with the fluid-containing vessels between charging/heating periods. One way to achieve this is to rely on conduction to maintain temperature of the radiative surface interacting with the vessels to be heated. In this example, the storage medium material may be of high enough thermal conductivity such that sections of the storage medium that are charged to temperatures greater than the design radiative facing temperature of the surface participating in radiative heat transfer with the fluid containing vessels can conductively heat and maintain the surface of the storage medium that is participating in radiation such that a constant temperature radiates to the vessel. Thermal radiation shields may be used to control the rate of heat transfer for flexible operation.

Figure 14:
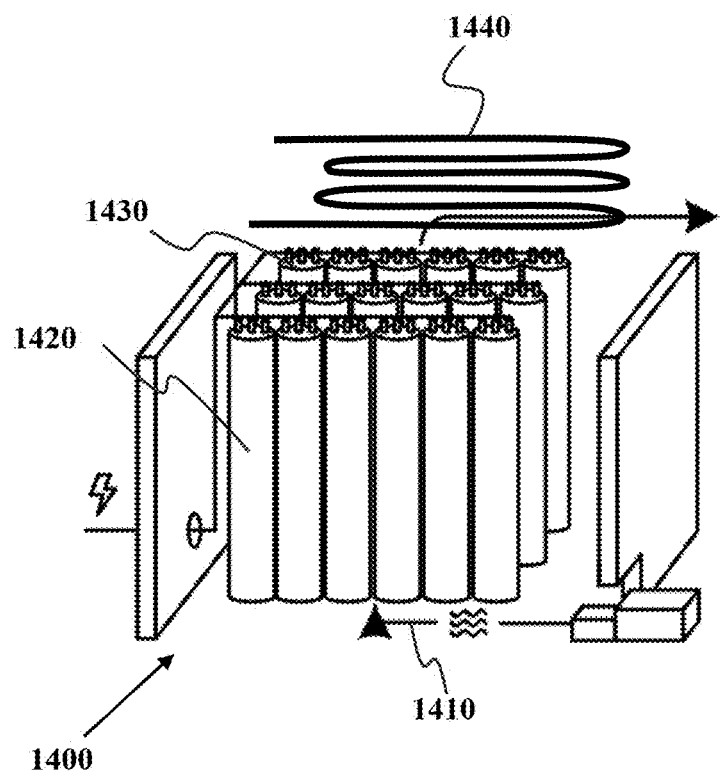
FIG. 14 shows a schematic of one portion of a material processing system associated with receiving heat from the thermal energy storage system via radiation.

Alternatively, or in addition to maintaining temperature via conduction, convection can be used to maintain radiative surface temperature in a TES system 1400. FIG. 14 shows a thermal storage working fluid 1410 that drawn through channels of the thermal storage medium 1420 to be heated. The thermal storage working fluid 1410 enters the storage medium 1420 at its coolest temperature and is heated as it travels through the medium 1420. The TES system 1400 may be configured such that the last section of the thermal energy storage medium that is interacts with is the radiative surface 1430. The storage medium 1420 is heated/charged to a temperature greater than the radiative surface temperature such that the working fluid 1410 can be heated by the other sections of the thermal energy storage media and heat the radiative surface 1430 to maintain temperature. Pipes, vessels, or other conduits 1440 carries a process fluid or gas that is heated by radiation from the radiative surface 1430. Both convection and conduction heat transfer can be used to maintain radiation temperature of the radiative surface 1430. One advantage of including the convective working fluid is that it offers an additional degree of control and flexibility. The working fluid 1410 can be pumped at different flow rates and mechanically directed to different zones for more precise temperature management. Additionally, after serving the first duty of maintaining the radiative surface temperature, the working fluid 1410 can also convectively heat the vessel 1440 containing the process fluid to be heated. This may enable more uniform heating of the vessel walls which is an important consideration for some processes such as reforming or cracking. After heating the surface and/or the vessel/tubes, the working fluid 1410 may still be at high enough temperatures to address other, lower temperature demands. The working fluid 1410 may be directed out of the TES system to fill other heating modes. In other sections of the current application, examples were shared that included preheating iron ore entering a DRI furnace or steam generation.

3. High Pressure Systems

There are many scenarios where an industrial process or power plant desires high temperature heat at a pressure greater than ambient pressure. The following implementations of thermal energy storage systems are related to providing high temperature, positive pressure heat where the thermal energy storage system comprises a solid thermal energy storage medium and a thermal energy storage working fluid.

Figure 15:
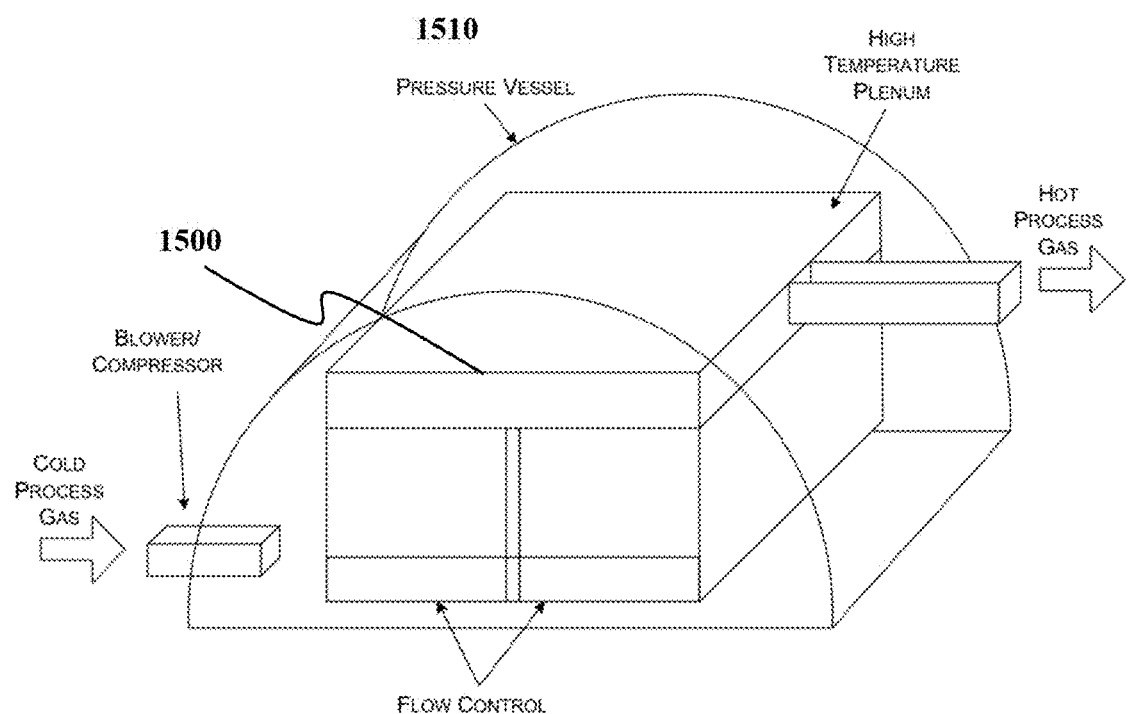
FIG. 15 shows a schematic of the thermal energy storage system as applied to high-pressure applications.

FIG. 15 depicts an implementation where the TES system 1500 and all associated components are contained in a pressure vessel 1510 to allow for a pressurized environment or sealed environment therein. The broad process description is as follows. The TES working fluid is pressurized by a pump, blower, fan, or compressor at the inlet of the TES system when the TES working fluid is at its lowest temperature. The pressurized working fluid is pushed through the TES storage media picking up heat as the fluid is exposed to the storage material. When the fluid has reached the desired temperature, it is directed to the process that desires high temperature/pressure fluid. In some implementations, the working fluid is air and the process receiving the hot pressurized air is a blast stove used in the steel industry. In another implementation, the process receiving hot pressurized gas is a gas turbine or gas turbine combined cycle for power generation. The working fluid may be fully or partially recirculated to the TES system for reheating after it has been cooled. Alternatively, the working fluid may be the process gas such that the TES circulates and produces a process gas at high temperatures and elevated pressures. In another embodiment, the fluid flowing through the TES may be composed, at least in part, of oxygen. Fuel (such as a hydrocarbon, a carbon oxide, or hydrogen) may be introduced to the fluid within the TES such that combustion occurs. This will have the effect of increasing the temperature of the mixture exiting the system and changing the chemical composition of the mixture to contain products of the combustion as well as unreacted reactants. This embodiment can be applied to a variety of processes such as, but not limited to, a blast stove, steam cracker, and gas turbine.

Figure 16:
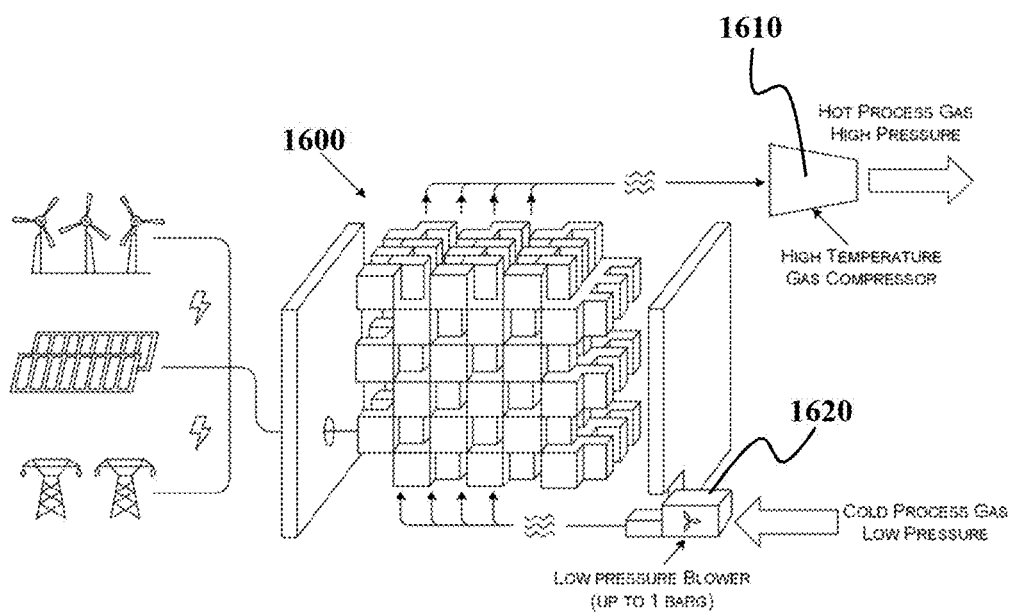
FIG. 16 shows a schematic of the thermal energy storage system configured for a high-pressure application that includes a high temperature gas compressor.

FIG. 16 shows a schematic of the thermal energy storage (TES) system configurations as applied to a high-pressure application that includes a high temperature induced draft gas compressor 1610 and/or a lower temperature, forced draft blower 1620. In one implementation, the TES system is maintained at a pressure less than the required process pressure. The cool inlet working fluid is pulled through the TES system, physically interacting with the TES storage media 1600 and getting heated via this interaction. At the outlet of the TES system, the hot, low pressure fluid stream is pulled to an induced draft compression device 1610 (fan, compressor, or blower) such that the outlet of the compression device is at a static pressure greater than that of the inlet to the compression device. The TES system does not necessarily have to be contained in a pressure vessel for the implementation where blower 1620 is not present. Optionally, some implementations may opt to use a lower temperature, forced draft blower 1620 instead of high temperature induced draft gas compressor 1610. This implementation may require the TES system to be contained in a pressure vessel.

The two broad implementations can be categorized as having forced draft or induced draft through the TES system though it is also possible to have a combination of both. Both come with their respective advantages and disadvantages. The forced draft approach has an advantage in that it allows for the compression device to compress a fluid at a lower temperature. This means that less expensive metallurgy can be used, leading to cheaper capital cost of the system. Additionally, the compression device operates more efficiently at lower temperatures, as the specific volume of the fluid decreases with temperature meaning there would be operating energy savings for the compression equipment's balance of plant. Despite this, a disadvantage is the requirement for maintaining the TES system as a pressurized vessel. At high storage temperatures, the metallurgy and material requirements can be quite costly. There are also a number of safety considerations that arise in the presence of a pressure vessel. The risk of explosion and ambient air leakage are to be addressed and mitigated. The induced draft compression device has the opposite set of problems. Despite it not necessarily requiring the TES to be maintained in a pressure vessel, the high temperature fluid is more difficult to compress than at lower temperatures. In some cases, material properties of the high temperature gas compressor may limit the temperatures and/or pressures that can be achieved.

Figure 17A:
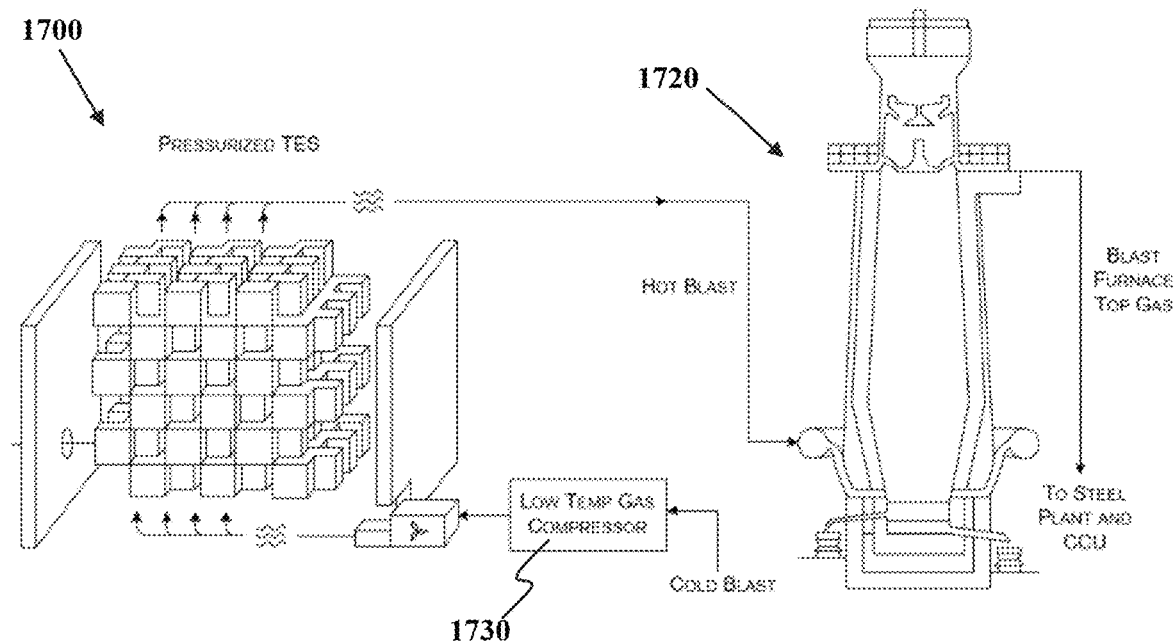
FIGS. 17A-17B show schematics of thermal energy storage systems configured for a high-pressure application that includes either an inlet or outlet gas compressor.
Figure 17B:
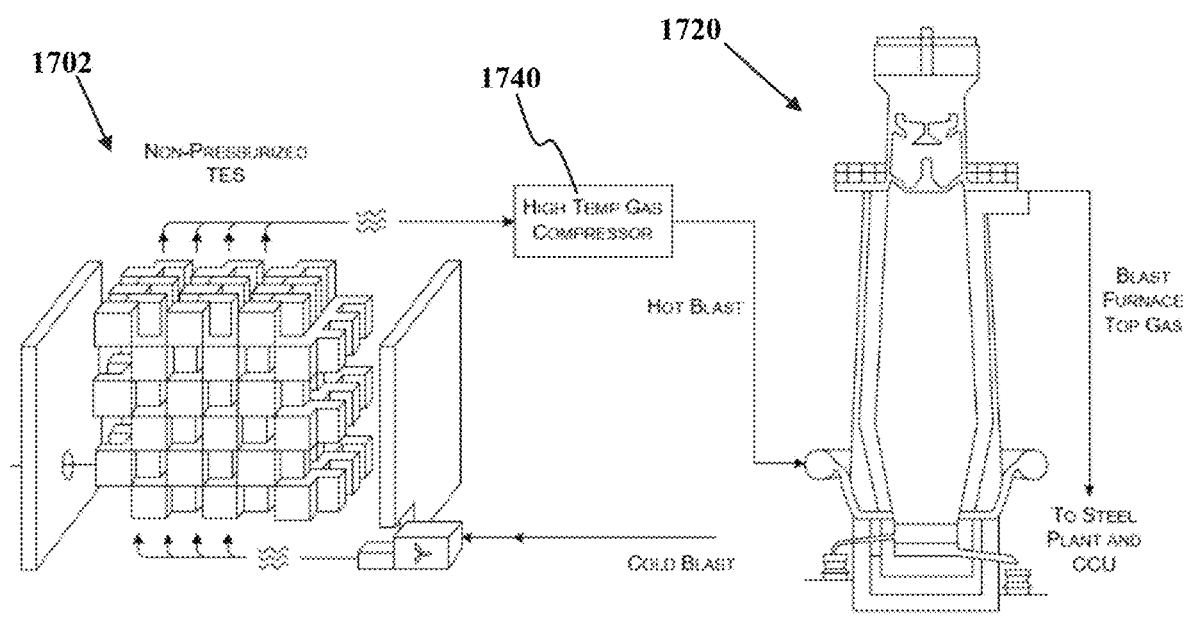

FIGS. 17A through 17B show applications associated with the present implementations, including for the production of iron and/or steel. FIG. 17A shows a schematic of the thermal energy storage system as applied to a blast furnace stove 1720 where the high temperature gas is provided by pressurizing gas at low temperatures and circulating through a pressurized TES unit 1700 for heating. FIG. 17A shows a low temperature gas compressor 1730 that is on the input side of the TES unit 1700. The TES unit 1700 may be heated by an electric heater in the storage medium of the TES unit 1700. In one example, the process gas or fuel being directed into the inlet of blast furnace stove 1720 is at a temperature between about 900° C. to 1400° C. The TES unit 1700 is configured to adjust its thermal energy output via flow rate or other control to keep the process gas or fuel inlet temperature in a desired range.

FIG. 17B shows a schematic of the thermal energy storage system as applied to a blast furnace stove 1720 where the high temperature gas is provided by pressurizing gas at high temperatures after being heated at a lower pressure in a non-pressurized TES 1702. The compression device is induced draft and pulls fluid through the TES at negative pressure. A high temperature gas compressor 1740 is located on an output side of the TES unit 1702 to create an induced draft through the TES unit.

This direct heating with the pressurized TES storage media may be provided for DRI, as well as other processes that desire gas heating such as Sustainable Aviation Fuel (SAF). A depiction of this concept with DRI is shown in FIG. 10.

Figure 18A:
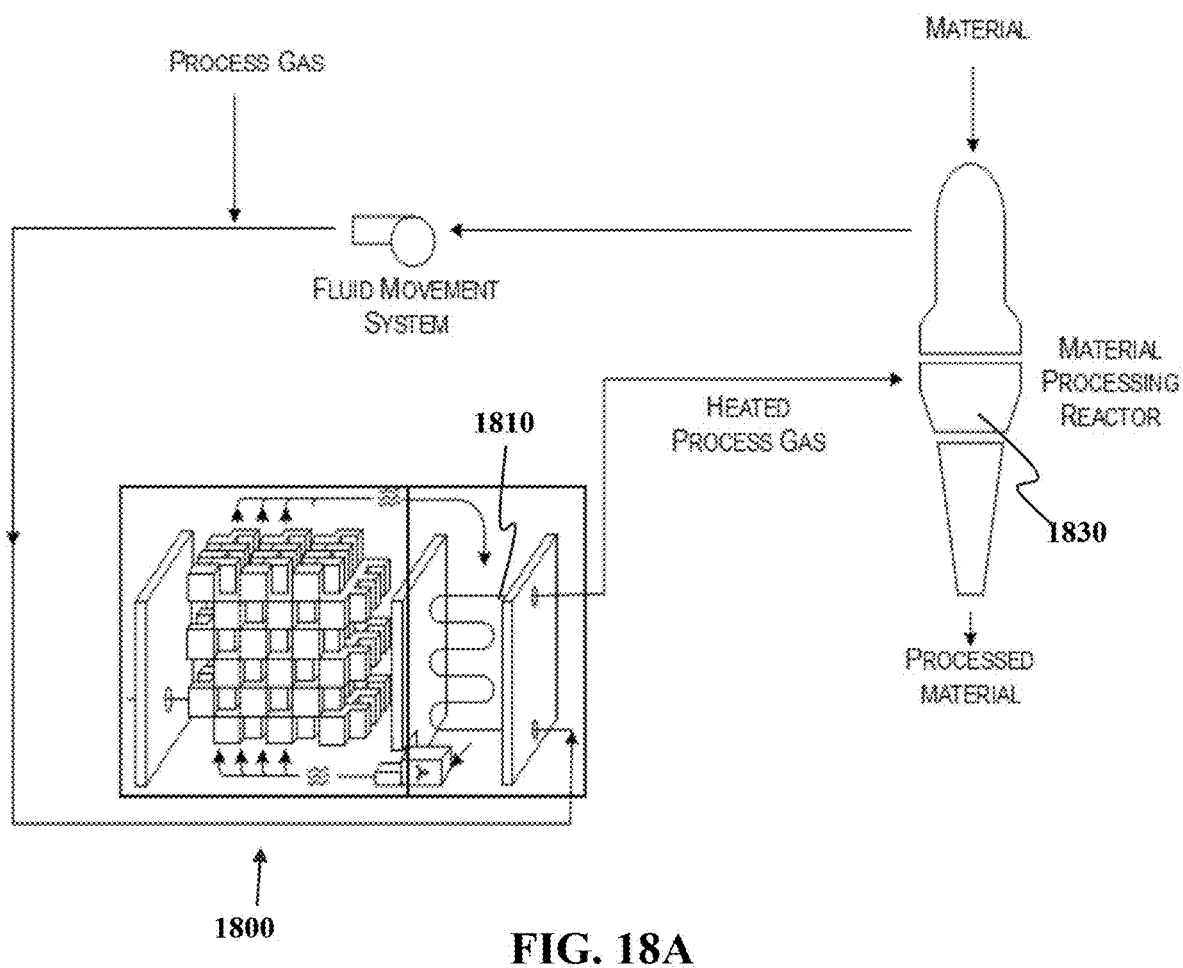
FIGS. 18A-18C show schematics of material processing systems according to embodiments described herein.
Figure 18B:
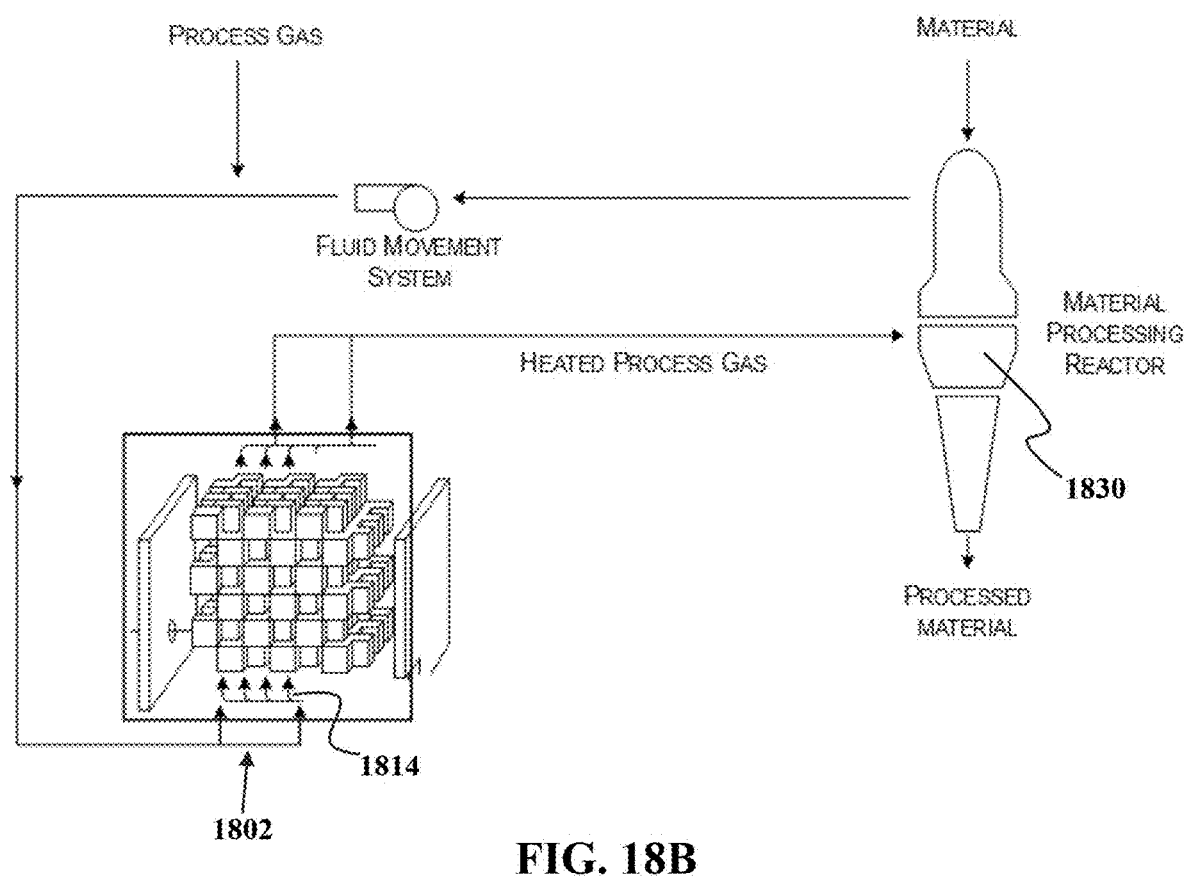
Figure 18C:
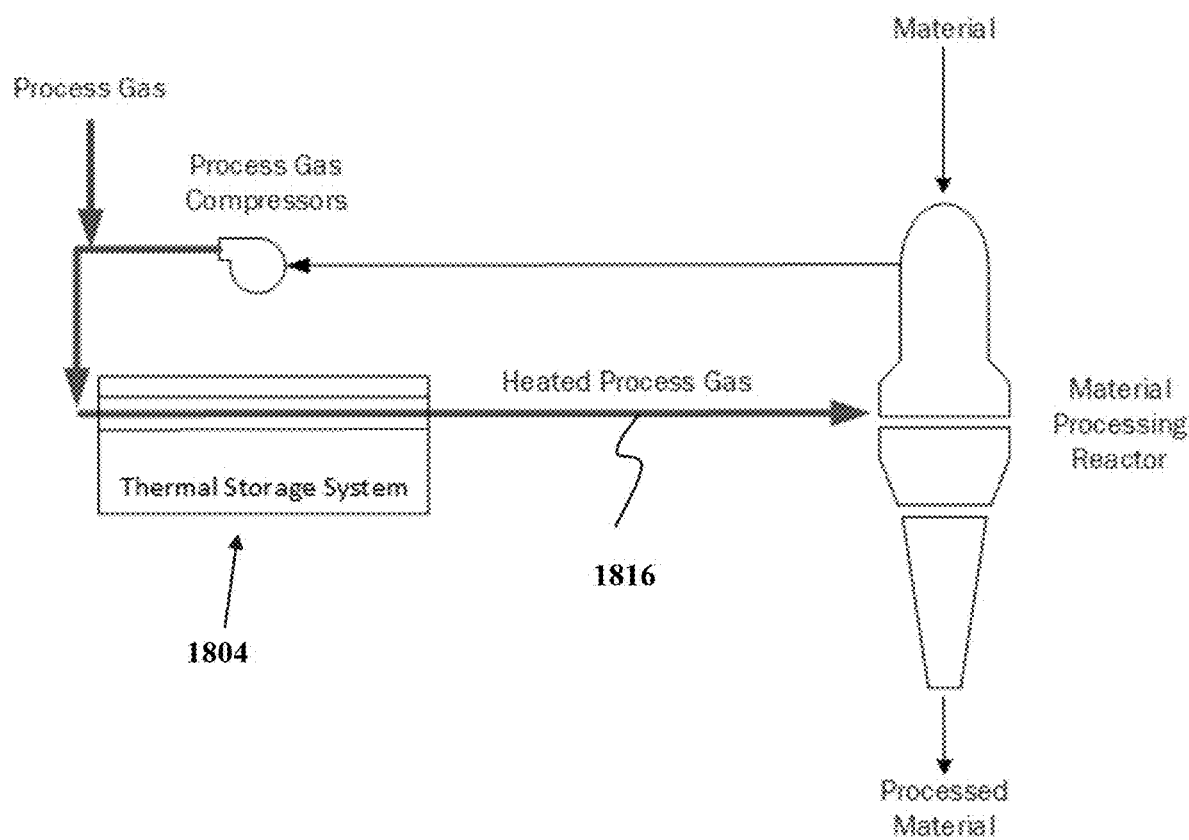

FIGS. 18A-18C show additional implementations for use with other types of material processing such as but not limited to SAF or other materials. FIG. 18A is similar to FIG. 9. FIG. 18B is similar to FIG. 10. FIG. 18C is similar to FIG. 12. Specifically, FIG. 18A shows a thermal energy storage unit 1800 where the process gas does not come into direct contact with the storage medium of the TES unit 1800. FIG. 18A shows that there is piping 1810 that receives thermal energy from the TES unit 1800, but not direct contact between the process gas and the storage medium or working fluid of the TES unit 1800. The thermally heated process gas will then be directed to a material processing reactor 1830. The process gas that has passed though the reactor 1830 can be exhausted to the ambient environment or it may be redirected back into the system for further processing.

FIG. 18B depicts a thermal energy storage unit 1802 where the process gas comes into direct contact with the storage medium of the TES unit 1802. FIG. 18A shows that the process gas 1814 exposed directly to the storage medium to receive thermal energy from the TES unit 1802. The thermally heated process gas will then be directed to a material processing reactor 1830. The heat transfer herein between the TES unit 1802 and the process gas can be via convection and/or radiation.

FIG. 18C depicts a still further implementation where the thermal energy storage unit 1804 is configured to convey thermal energy to the process gas via radiation. The radiative heat transfer between a storage medium of the TES unit 1804 and the process gas 1808 occurs via radiation, which is more efficient than merely convective thermal transfer.

Figure 19:
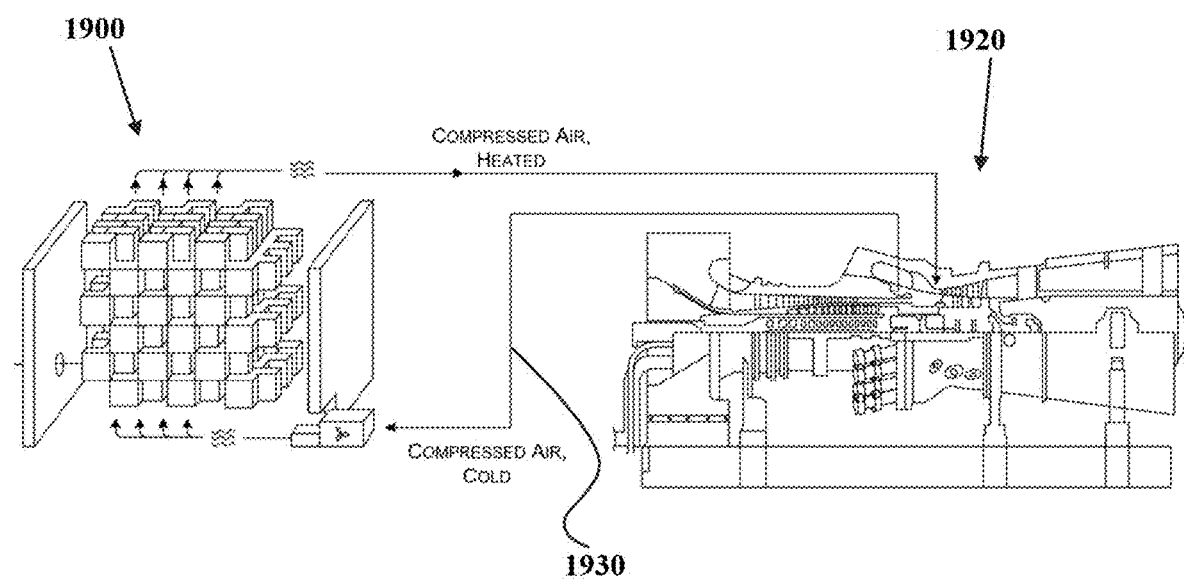
FIG. 19 shows a schematic of the thermal energy storage system as applied to gas turbine power generation.

FIG. 19 shows the use of compressed, heated air from the thermal energy storage system 1900 being used with a gas turbine 1920 for power generation. Here high temperature and pressure gas would be introduced to a gas turbine. The inlet temperature of a compressed gas into the gas turbine may have a temperature in the range of about 700° C. to 1400° C. The pressured heated gas may have at least one oxidizer and/or fuel. The oxidizer may be air or oxygen. The fuel may be natural gas, hydrogen, carbon dioxide, and/or any mixture thereof. Compressed gas exiting the turbine can be returned by conduit 1930 to the TES system 1900 for reheating and use again in the gas turbine 1920.

Figure 20:
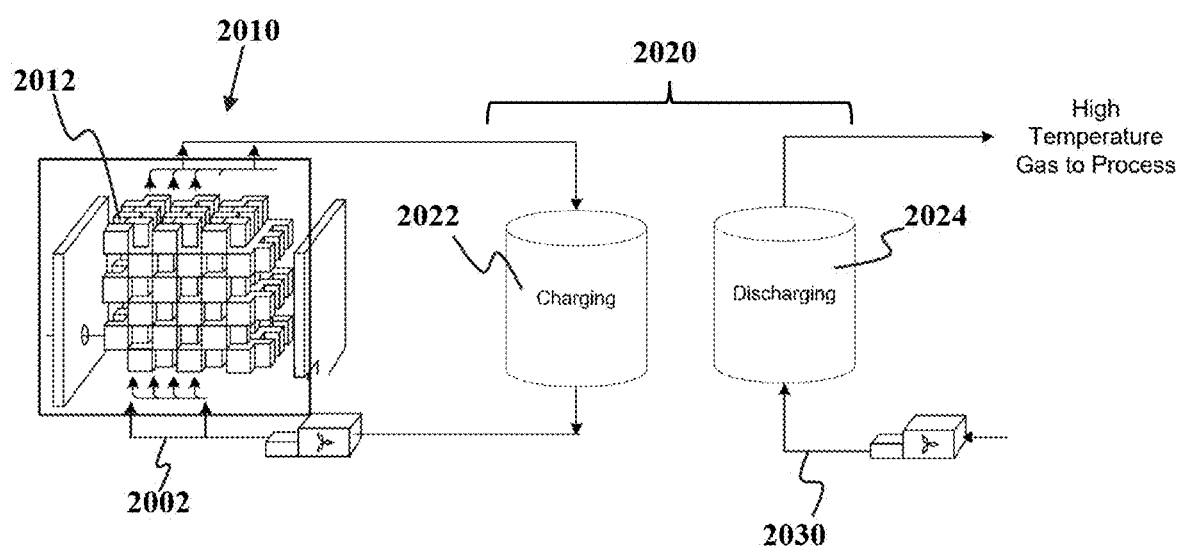
FIG. 20 shows a schematic of a multi-vessel energy storage system according to embodiments described herein.

FIG. 20 depicts an embodiment of a TES system that is not maintained in a TES vessel. The TES working fluid 2002 is drawn across the TES 2010 where it directly interacts with the TES storage media material 2012. The high temperature working fluid exits the TES and is directed to a secondary thermal storage medium 2020. The secondary thermal storage medium behaves like recuperators or regenerators that are commonly used in the steel and glass industry for heat recovery. The hot TES working fluid 2002 is drawn across the secondary storage material 2020, convectively heating the storage material. The secondary storage medium 2020 is charged by the working fluid. When the working fluid 2002 is cooled by exchanging heat with the secondary storage medium, it is directed back to an induced draft compression device in a closed or semi-closed cycle where it re-enters the primary TES system 2010 that is charged/heated electrically. The secondary storage medium 2020 may be arranged in a series of two or more separate pressure vessels 2022 and 2024. At any one time when the system is discharging, one or more of the secondary storage medium pressure vessels 2024 will be discharging with a forced draft blower that produces high temperature, high pressure fluid for the process. The pressure vessels 2022 that are not discharging can be charged by drawing low pressure, high temperature fluid from the primary TES system through the secondary storage medium at negative pressures via the induced draft compression device through the primary TES system. The series of pressure vessels would be connected and separated by a series of flow control valves that would enable this cyclic pressurization to be controlled per each vessel. This concept is depicted in FIG. 20.

In FIG. 20, there are two secondary storage medium vessels 2022 and 2024 shown as a reference. There may be more than two. In this simplified schematic, one secondary storage vessel 2022 is charging by having hot gas from the primary TES unit 2010 drawn across the storage media at low pressures via induced draft blower before being recirculated to the TES. Simultaneously, the other secondary vessel 2024 is discharging. Here colder fluid 2030 is pressurized at a lower temperature and forced through the hot secondary storage vessel 2024 such that high temperature and pressure is produced and directed to a process. In simplified example operation, when the discharging secondary storage vessel 2024 is cooled to the cold fluid temperature and/or the entirety of charging secondary storage vessel 2022 is at the highest temperature, the vessels 2022 and 2024 switch functionally such that the charging vessel begins discharging and vice-versa. In practice, there may be a plurality of storage vessels similar to 2022 and 2024 that do not operate in strict binary operation. For example, as the produced gas temperature of a discharging vessel begins to lower during discharge, flow rate may decrease, and another discharging vessel may experience an increase in flow rate to make up such that the process receives a constant temperature and flow rate of hot, pressurized fluid.

3. Carbon Capture

Figure 21:
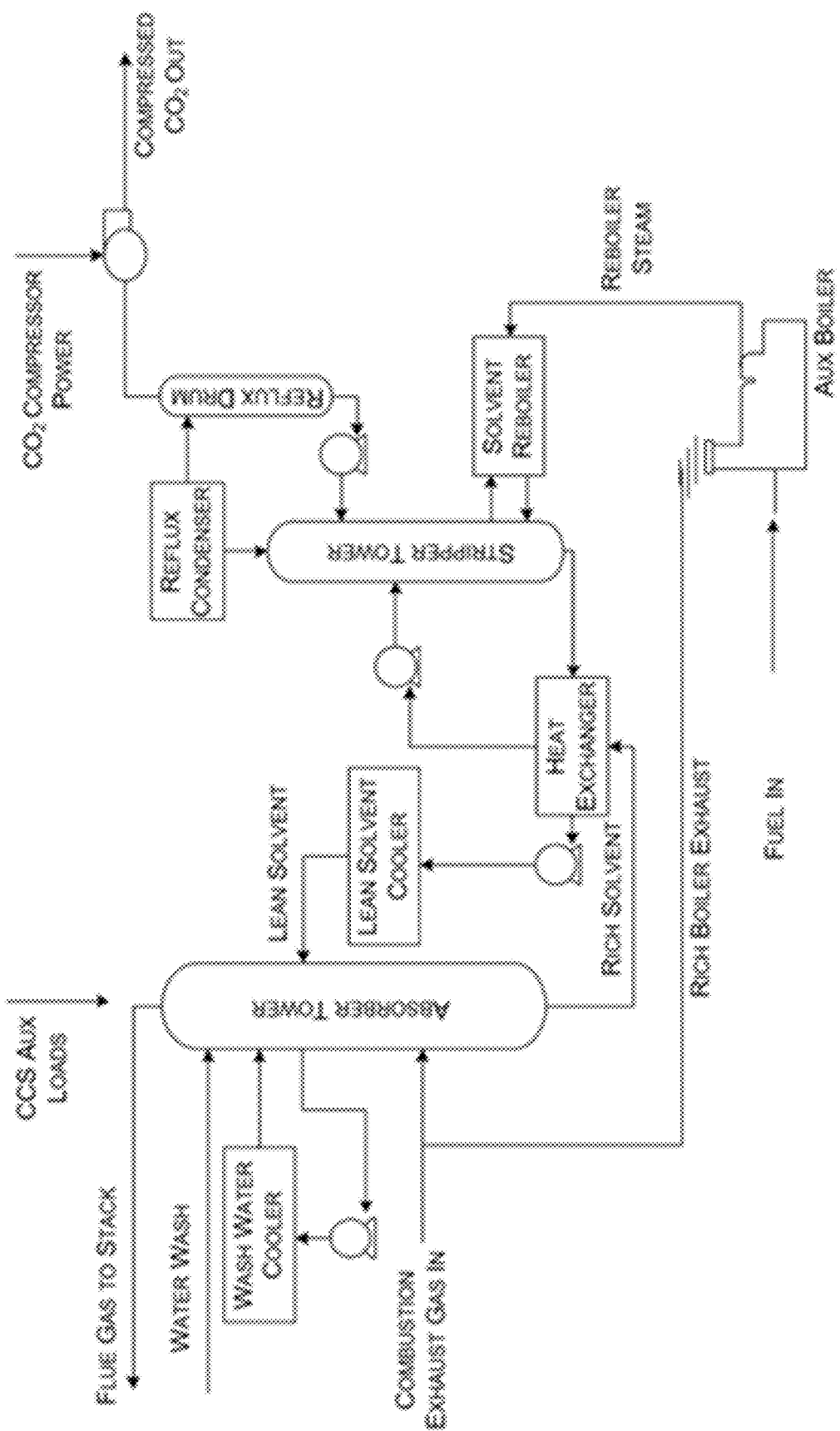
FIG. 21 describes integration of the thermal energy storage system with carbon capture and sequestration (CCS).
Figure 22:
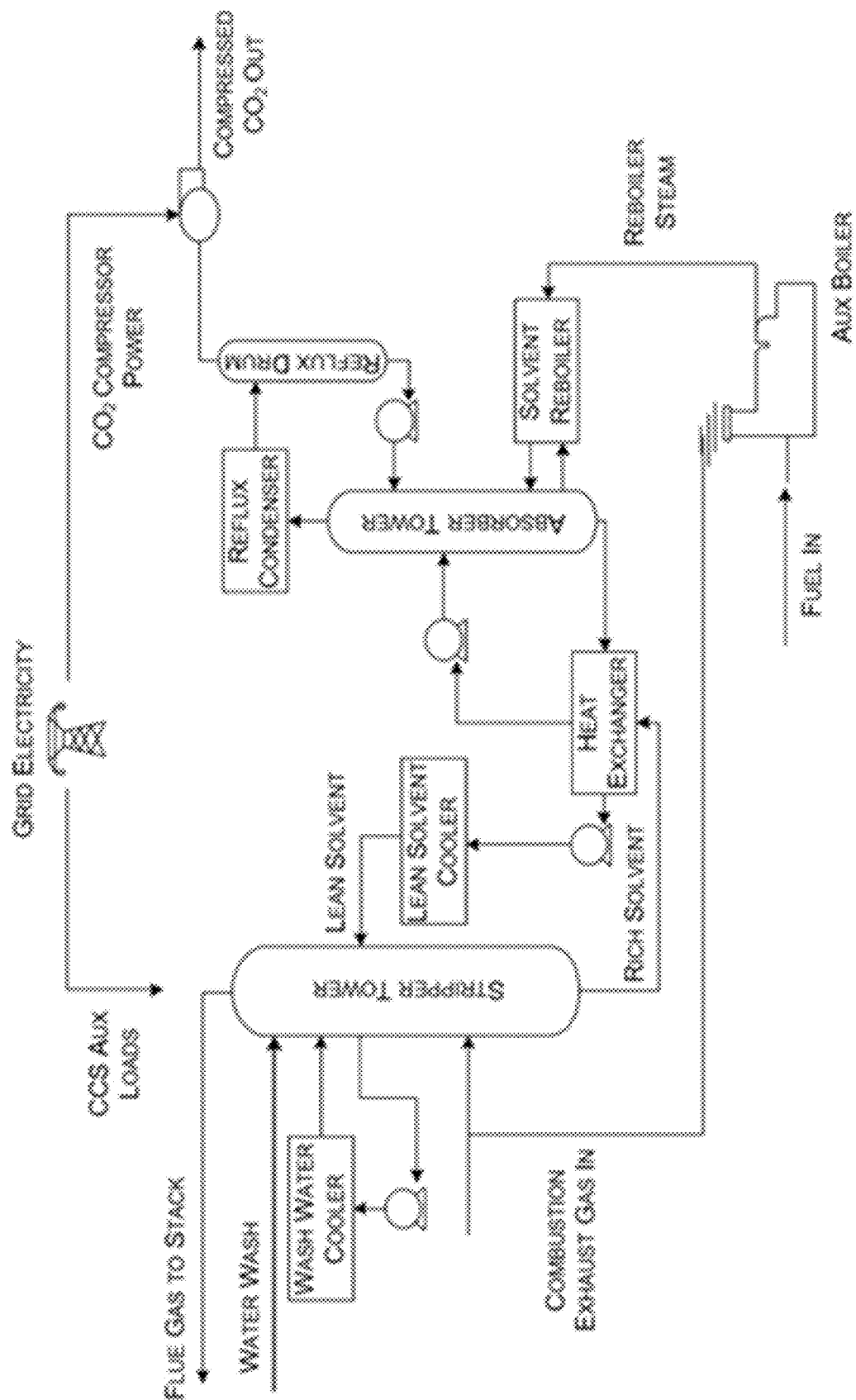
FIG. 22 shows carbon capture and sequestration, powered by a gas-fired boiler and the power grid.
Figure 23:
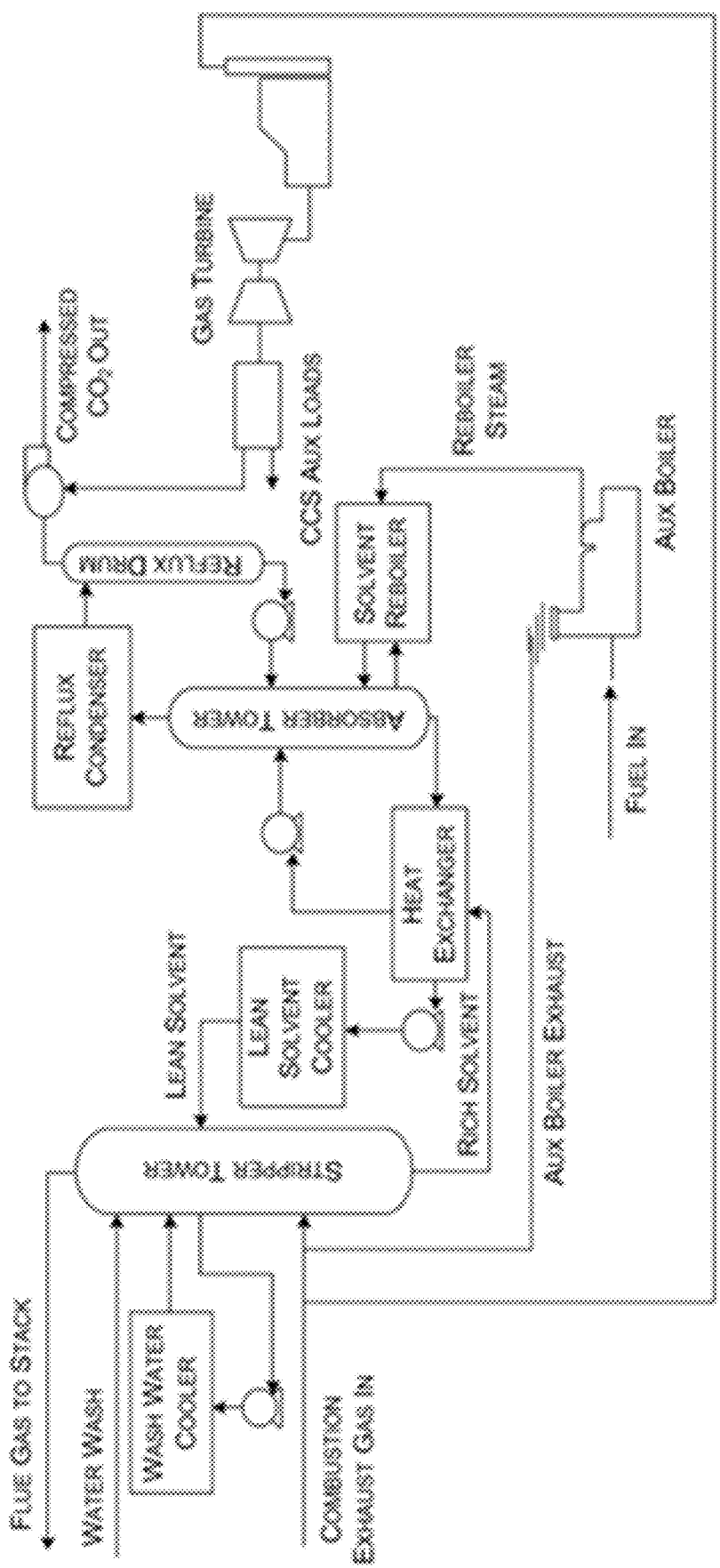
FIG. 23 shows carbon capture and sequestration, powered by a gas-fired cogeneration.

FIGS. 21 through 23 are directed to carbon capture integrations. FIG. 21 depicts a typical absorption carbon capture process as referred to in the present implementations. FIGS. 22 and 23 show the related art use of gas-fired boiler and grid, and gas-fired cogeneration, respectively, to provide the driving energy for the carbon capture process. More specifically, FIG. 21 is an example prior art configuration of a sorption carbon capture plant. FIG. 22 shows an example prior art carbon capture plant, powered by a gas-fired boiler and the power grid. FIG. 23 shows an example prior art carbon capture plant, powered by a gas-fired cogeneration.

Figure 24:
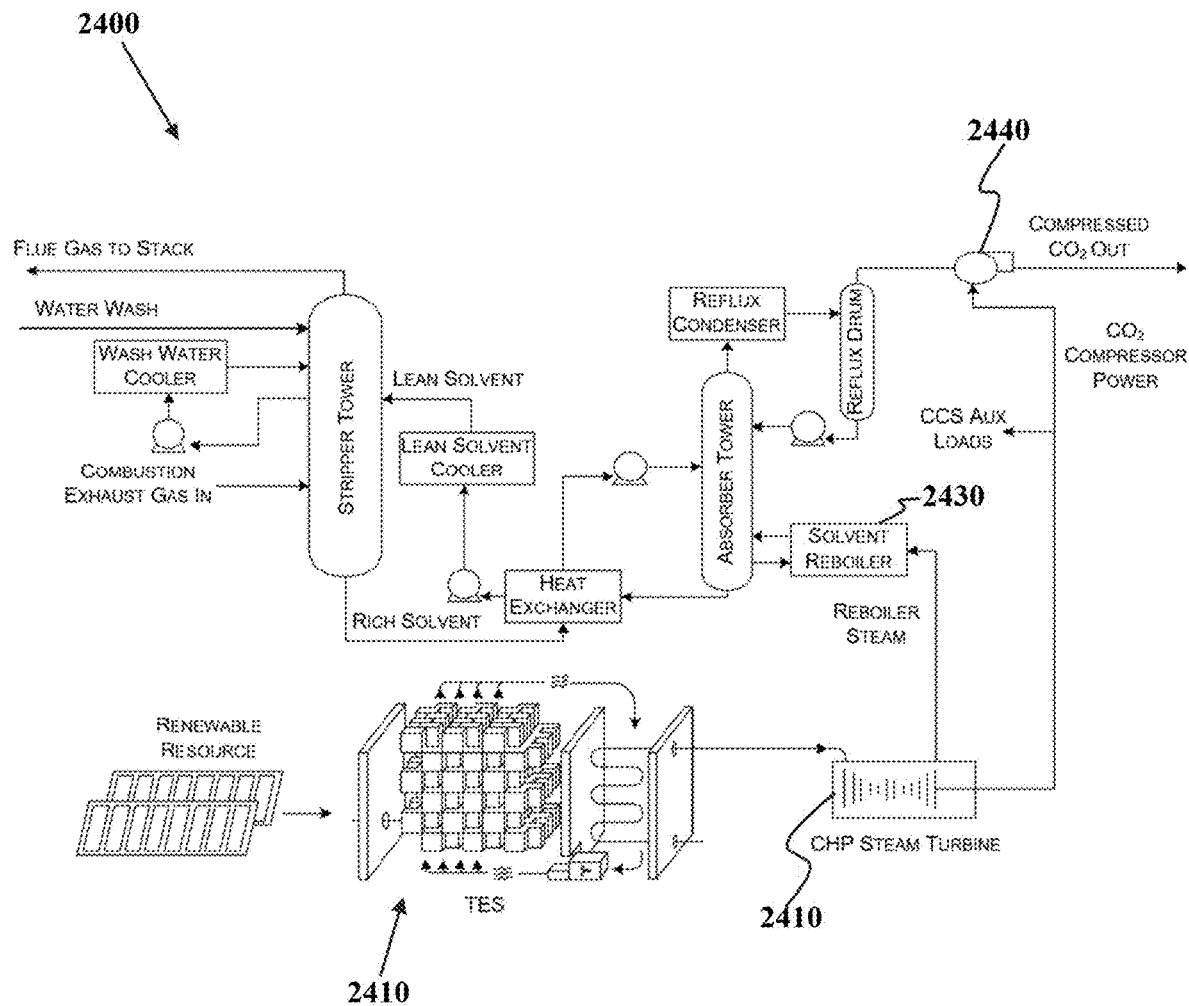
FIG. 24 shows carbon capture and sequestration, powered by cogeneration from the thermal energy storage system.

FIG. 24 depicts a carbon capture and sequestration system 2400, powered by cogeneration from the thermal energy storage (TES) system 2410. In this implementation, FIG. 24 shows the TES system 2410 generating steam for use in a letdown steam turbine 2420 to provide the heat and power required by the carbon capture process. The TES system 2410 is receiving electricity on an intermittent basis such as from a solar farm or such source which may provide electricity in a cyclical or non-continuous manner. The turbine 2420 can provide steam to a solvent boiler 2430 to power that boiler. The turbine 2420 being powered by the TES system 2410 can also provide either electricity and/or steam power to a fluid movement system such as a compressor that exhausts carbon dioxide or other waste material from the carbon capture system.

Other implementations described previously are not explicitly shown here include capturing the exhaust gas from a reforming process. The carbon capture concepts described here are not limited to the absorption carbon capture process as shown below.

4. Variations of Integrations with DRI

Figure 25:
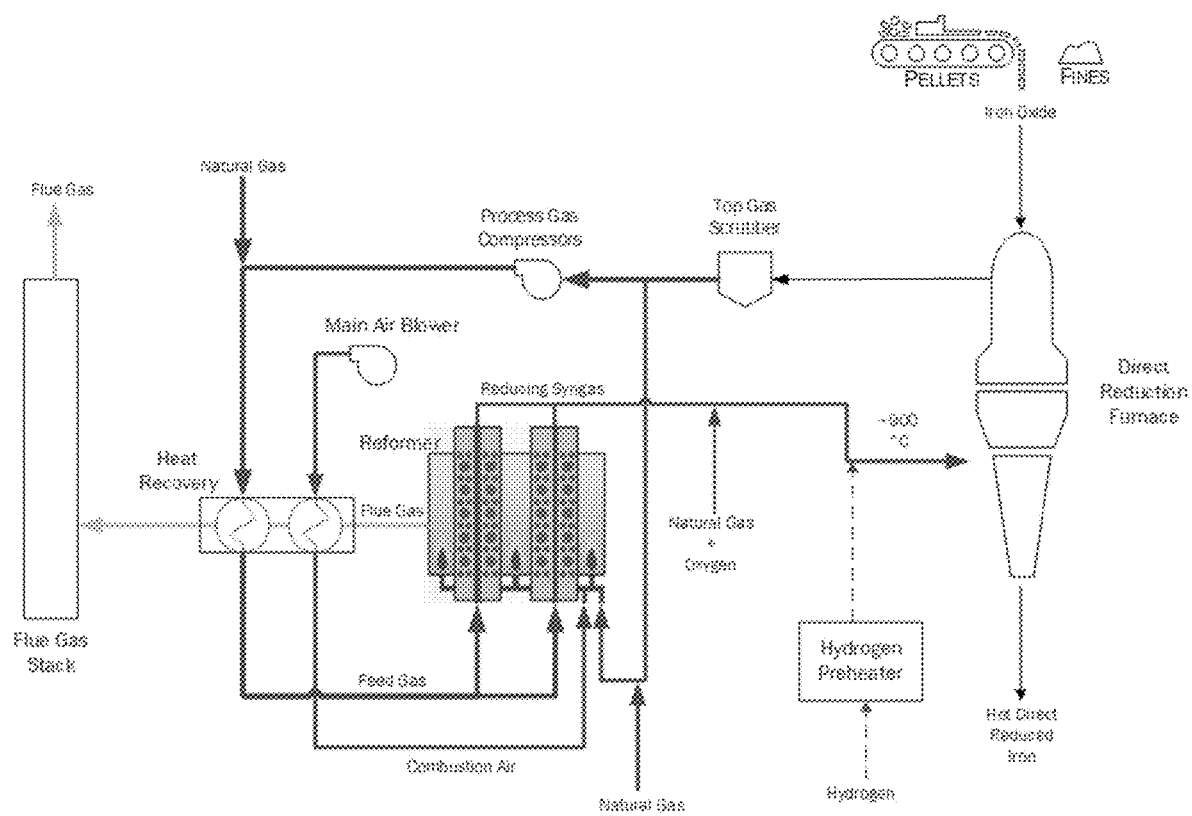
FIG. 25 provides an example schematic of a typical DRI process.

FIG. 25 shows a schematic of a conventional DRI process that includes an integrated reformer that turns hydrocarbons into syngas which is injected, along with optional supplementary natural gas, oxygen, and/or hydrogen, into the direct reduction furnace. The exhaust gas exiting the DRI furnace is scrubbed before being directed back to the reformer, either or both as feedstock and as a driving fuel source. Heat recovery from the combustion products within the reformer are shown as a combustion air and reformer feedstock preheater.

Figure 26:
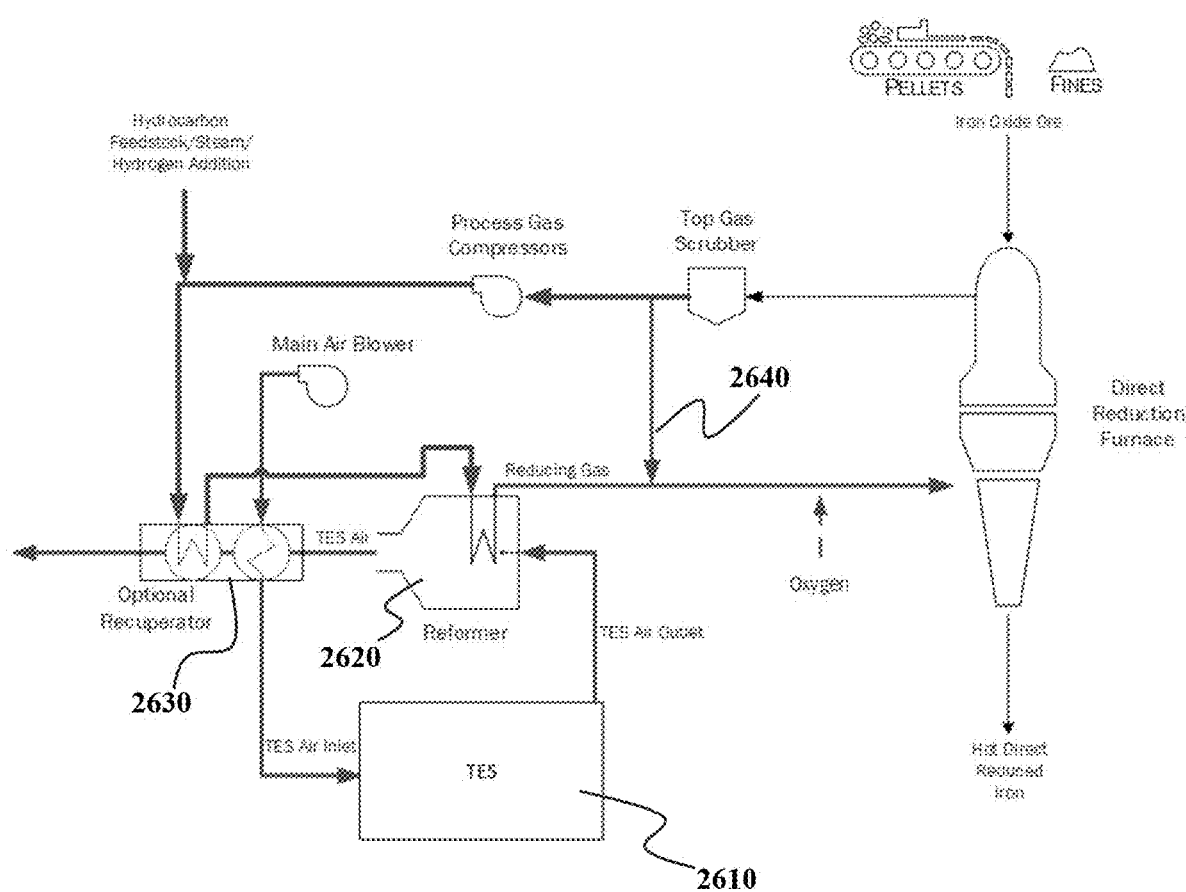
FIGS. 26 through 30 depict process various configurations of an integrated TES and DRI reactor, where the mode of heat transfer from the TES, heat recovery equipment and configuration, and type of DRI process is varied across the figures.

FIG. 26 shows a schematic of a system and method associated with the DRI process receiving high temperature syngas produced from a reforming process that is driven by heat from the thermal energy storage system 2610 via convection from the thermal energy storage working fluid to tubes/heat exchangers containing the reforming feedstock. The schematic depicts an open fluid flow through the TES unit 2610. The working fluid flow through the TES unit 2610 may be directly in contact with the thermal storage medium therein, or optionally, may be indirectly heated through a vessel, piping, or other containment that prevents direct contact of the working fluid and the storage medium of the TES unit 2610. After exchanging heat with the reformer 2620, the TES working fluid can be used at heat exchanger 2630 to preheat inlet TES working fluid and/or preheat the reformer feedstock. A portion 2640 of the DRI exhaust gas may be directed to the hot syngas stream.

FIG. 27 shows a schematic of a system and method associated with DRI process receiving high temperature syngas produced from a reforming process that is driven by heat from the thermal energy storage system 2710 via convection from the thermal energy storage working fluid to tubes/heat exchanger containing the reforming feedstock. Unconverted fuel in the DRI exhaust gas 2722 is directed back to the reformer 2720 and combusted with the TES working fluid to provide additional radiative/convective heat to drive the reforming reaction. After exchanging heat with the reformer 2720, the TES working fluid can be used at heat exchanger 2730 to preheat inlet TES working fluid and/or preheat the reformer feedstock. In this case, the TES working fluid may contain some amount of oxygen that can combust with the exhaust fuel at high temperatures.

FIG. 28 shows a schematic of the system depicted in FIG. 27 with the addition of a steam generator 2850 recovering waste heat from exhaust gas produced by combustion in the reformer. The exhaust gas may be directed to a carbon capture process or exhausted to the environment. The system is powered by a thermal energy storage unit 2810 with unconverted fuel in the DRI exhaust gas 2822 directed back to the reformer 2820 and combusted with the TES working fluid to provide additional radiative/convective heat to drive the reforming reaction.

FIG. 29 shows a schematic of the system depicted in FIG. 28 with a different orientation of heat recovery heat exchangers including steam generator 2950 recovering waste heat from exhaust gas produced by the reforming reaction in reformer 2920 and inlet air preheating. The steam generator 2950 receives higher temperature exhaust heat in this case as it is upstream from the recuperator 2960. This enables the production of high pressure superheated steam which can be used in a combined heat and power application with a steam turbine. One possible use of the low pressure steam and electricity produced is to power a sorption carbon capture process that treats and captures the DRI process emissions. The system is also powered by a thermal energy storage unit 2910 with unconverted fuel in the DRI exhaust gas 2922 directed back to the reformer 2920 and combusted with the TES working fluid to provide additional radiative/convective heat to drive the reforming reaction.

Figure 30:
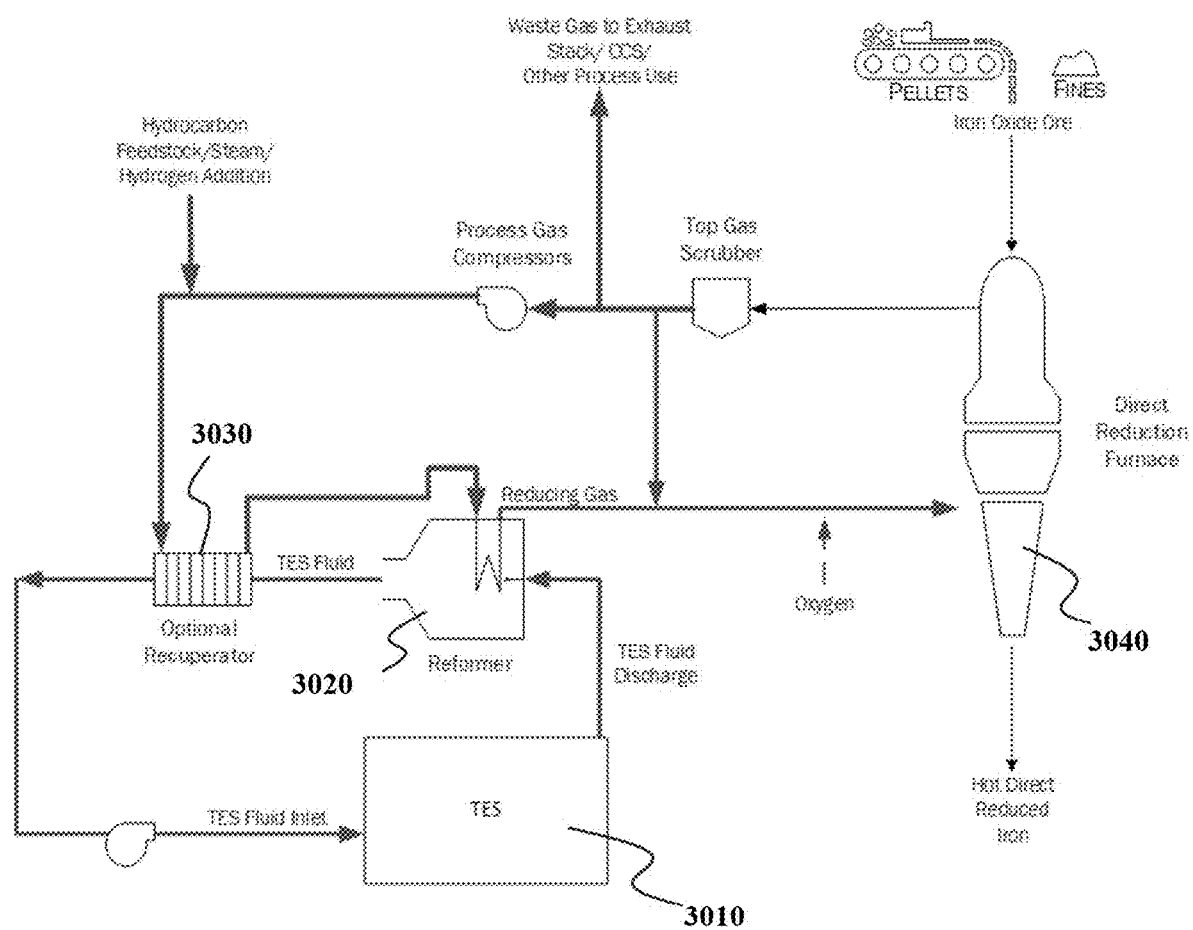

FIG. 30 shows a schematic of a system and method associated with DRI process receiving high temperature syngas produced from a reforming process that is driven by heat from the thermal energy storage system 3010 via convection from the thermal energy storage working fluid to tubes/heat exchanger 3030 containing the reforming feedstock. The heat exchanger 3030 can be a countercurrent heat exchanger wherein two flow streams are flowing in opposite directions to each other. The flow steams can be liquids, gases, or even solid powders, or any combination of those. The schematic depicts a closed fluid flow through the TES unit 3010 to the reformer 3020 and then through a flowpath that leads back to the TES unit 3010 for reheating of the working fluid.

SUMMARY OF EXEMPLARY EMBODIMENTS

A system and method for TES material processing includes one or more of the following:

Example 1. A material processing system, including:
- a thermal energy storage (TES) unit configured to store thermal energy generated from an electric heater, wherein the TES unit is configured to heat a process gas using stored thermal energy; and
- a material processing reactor configured to receive the heated process gas and perform a process on the material in the reactor;
- wherein the TES unit is configured to output stored thermal energy at a rate that maintains a desired process condition in the reactor.

Example 2. The system of example 1, wherein the process gas includes any mixture of hydrogen, hydrocarbons, and/or carbon oxides.

Example 3. The system of example 2, wherein the TES unit further includes a fluid movement system configured to direct a working fluid to a heat exchanger configured to heat the process gas.

Example 4. The system of example 3, wherein the TES unit is configured to heat the working fluid via convection and/or radiation.

Example 5. The system of example 2, wherein the TES unit is configured to heat the process gas via convection and/or radiation.

Example 6. The system of example 2, wherein the TES unit includes a thermal storage medium and a fluid movement system to direct the process gas through the thermal storage medium to heat the process gas.

Example 7. The system of example 5, wherein the TES unit includes a thermal storage medium and a fluid movement system, wherein the fluid movement system includes tubes that convey the process gas through a zone wherein the tubes are heated substantially by radiation from the thermal storage medium to heat the process gas.

Example 8. The system of example 3 wherein the working fluid includes air, carbon dioxide, nitrogen, a noble gas, steam, or a combination thereof.

Example 9. The system of example 5, wherein the process gas includes any mixture of hydrogen, hydrocarbons, and/or carbon oxides.

Example 10. The system of example 3, wherein the working fluid is at a temperature of about 900° C. or higher.

Example 11. The system of example 3, further including a fluid movement system and one or more conduits for returning the working fluid back to the TES unit for reheating.

Example 12. The system of example 1, further including a high-pressure vessel configured to enclose the TES unit and provide a sealed environment therein.

Example 13. The system of example 1, further including a carbon capture and sequestration (CCS) system including a compressor and a reboiler configured to receive exhaust gas from the reactor and powered at least in part from stored energy from the TES.

Example 14. The system of example 1, wherein the reactor is configured to perform an endothermic reaction.

Example 15. The system of example 1, wherein the reactor is configured to perform a direct reduction process on the material.

Example 16. The system of example 1, wherein the reactor is configured to perform a direct reduced iron reaction.

Example 17. The system of example 1, wherein the reactor is configured to perform a hydrogenation process.

Blast Furnace Examples

Example 18. A material processing system, including:
a thermal energy storage (TES) unit configured to store thermal energy generated from an electric heater, wherein the TES unit is configured to use the stored thermal energy to heat at least one combustion reactant that includes an oxidizer and/or a fuel; and
a material processing reactor configured to combust the heated reactant in the presence of material in the reactor;
wherein the TES unit is configured to output stored thermal energy at a rate that maintains a predetermined process condition in the reactor.

Example 19. The system of example 18, wherein the predetermined process condition includes a fuel inlet temperature.

Example 20. The system of example 18, wherein at least a portion of the at least one combustion reactant is directed through the TES unit to provide heating.

Example 21. The system of example 18, wherein at least a portion of the at least one combustion reactant is indirectly heated by the TES unit.

Example 22. The system of example 19, wherein at least a portion of the at least one combustion reactant entering the TES unit is at a pressure above 1 bar.

Example 23. The system of example 18, wherein the reactor is configured as a blast furnace.

Example 24. The system of example 18, wherein the at least one combustion reactant includes any mixture of hydrogen, hydrocarbons, and/or carbon oxides.

Example 25. The system of example 18, wherein the oxidizer includes any mixture of air and/or oxygen.

Example 26. The system of example 19, further including a fluid movement system configured to direct a working fluid to a heat exchanger configured to heat the at least one combustion reactant.

Example 27. The system of example 19, wherein the TES unit is configured to heat the at least one combustion reactant via convection and/or radiation.

Example 28. The system of example 18, further including a fluid movement system configured to direct the at least one combustion reactant through at least a portion of the TES unit.

Example 29. The system of example 18, further including a high pressure vessel configured to enclose the TES unit.

Example 30. The system of example 23, wherein TES unit is configured to receive inlet gas at a pressure above ambient pressure.

Example 31. The system of example 18, further including a carbon capture and sequestration (CCS) system including a compressor and a reboiler configured to receive exhaust gas from the material processing system and powered at least in part from stored energy from the TES.

Example 32. The system of example 18, wherein the reactor is configured to perform an endothermic reaction.

Example 33. The system of example 18, wherein the reactor is configured to perform a direct reduction process on the material.

Example 34. The system of example 18, wherein the reactor is configured to perform a direct reduced iron reaction.

Other Blast Furnace Examples

Example 35. A material processing system, including
a thermal energy storage (TES) unit configured to store thermal energy generated from an electric heater, wherein the TES unit is configured to use the stored thermal energy to heat at least one combustion reactant that includes an oxidizer and/or a fuel; and
a material processing reactor configured to combust the heated reactant in the presence of material in the reactor;
wherein the TES unit is configured to output stored thermal energy at a rate that maintains a predetermined process condition in the reactor,
wherein the fuel and/or oxidizer interact in an exothermic process in the TES before being provided to the material processing reactor.

36. A power generation system, including:
a thermal energy storage (TES) unit configured to store thermal energy generated from an electric heater, wherein the TES unit is configured to use the stored thermal energy to produce a pressurized heated gas including at least one combustion reactant that includes an oxidizer and/or a fuel; and a gas turbine generator configured to use the heated gas to generate electricity;

wherein the TES unit is configured to output stored thermal energy at a rate that maintains a predetermined inlet condition of the gas turbine generator.

Example 37. The system of example 36 wherein a portion of the heat used to heat the gas is provided from an exothermic reaction of the combustion reactant.

Example 38. The system of example 36 further including conduits for directing process gas exiting the gas turbine back to the TES unit for reheating.

Example 39. The system of example 36, wherein the oxidizer includes air, oxygen, or any mixture thereof.

Example 40. The system of example 36, wherein the fuel includes natural gas, hydrogen, carbon dioxide, and/or any mixture thereof.

Example 41. The system of example 36, wherein the predetermined inlet condition includes a fuel inlet temperature.

Example 42. The system of example 36, wherein at least a portion of the gas is directed through the TES unit to provide heating.

Example 43. The system of example 36, wherein at least a portion of the gas is indirectly heated by the TES unit.

Example 44. The system of example 36, wherein at least a portion of the gas entering the TES unit is at a pressure above 1 bar.

Example 45. The system of example 19, wherein the TES unit is configured to heat the gas via convection and/or radiation.

Example 46. The system of example 18, further including a fluid movement system configured to direct the gas through at least a portion of the TES unit.

Example 47. The system of example 23, wherein TES unit is configured to deliver outlet gas at a pressure above ambient pressure.

Example 48. The system of example wherein the gas supplied to the gas turbine generator has a temperature between about 700° C. to 1700° C.

TES with a Second Heat Use Examples

Example 49. A material processing system for use with a process gas including:
a thermal energy storage (TES) unit configured to store thermal energy generated from an electric heater, wherein the TES unit is configured to heat a process gas to a first temperature using stored thermal energy;
a fluid movement system configured to direct a working fluid from the TES unit at the first temperature to a second heat load at a second temperature;
a material processing reactor configured to receive the heated process gas and perform a process on the material in the reactor;
wherein the TES unit is configured to output stored thermal energy at a rate that maintains a desired process condition in the reactor.

Example 50. The system of example 49, wherein the second temperature is lower than the first temperature.

Example 51. The system of example 49, wherein the fluid movement system is configured to recirculate the working fluid back to the TES unit for reheating.

Example 52. The system of example 49, wherein the second heat load includes a material preheater configured to heat the material prior to introduction to the process gas in the reactor.

Example 53. The system of example 49, wherein the fluid movement system is directed to a heat exchanger that heats pressurized water or steam to generate steam.

Example 54. The system of example 53, wherein the steam generated in the heat exchanger is directed to a steam turbine to generate electricity or mechanical work.

Example 55. The system of example 54, wherein the electricity generated by the steam turbine is used in one or more of the following: electrolyzer, electric arc furnace, compressor, or other electric load interacting with the material processing system.

Example 56. The system of example 53, wherein the steam includes process steam.

Example 57. The system of example 53, wherein the fluid movement system directs a working fluid to the material processing reactor to provide supplemental heat.

Example 58. The system of example 53, wherein the fluid movement system directs a working fluid containing oxygen to a fuel combustion process.

Example 59. The system of example 58, wherein the fuel combustion process includes combusting at least a portion of waste gas exiting the material processing reactor.

Example 60. The system of example 49, further including a high pressure vessel configured to enclose the TES unit.

Example 61. The system of example 49, further including a carbon capture and sequestration (CCS) system including a compressor and a reboiler configured to receive exhaust gas from the material processing system and powered at least in part from stored energy from the TES.

Example 62. The system of example 49, wherein the reactor is configured to perform an endothermic reaction.

Example 63. The system of example 49, wherein the reactor is configured to perform a direct reduction process on the material.

Example 64. The system of example 49, wherein the reactor is configured to perform a direct reduced iron process.

TES with a Second Heat Use (Electrolyzer) Examples

Example 65. A material processing system for use with a process gas including:
a thermal energy storage (TES) unit configured to store thermal energy generated from a heater powered by an energy source having intermittent availability, wherein the TES unit is configured to output the stored thermal energy;
a first heat exchanger configured to receive the stored thermal energy from the TES unit to heat a process gas;
a second heat exchanger configured to receive stored thermal energy from the TES unit for powering a steam turbine electric generator;
an electrolyzer powered by electricity from the generator and configured to provide one portion of the process gas; and
a material processing reactor coupled to the first heat exchanger to receive the process gas and configured to use the process gas to perform a chemical process on the material in the reactor;
wherein the TES unit is configured to output stored thermal energy to the first heat exchanger in a manner that maintains temperature in the reactor at or above a working temperature.

Example 66. The system of example 65, further including a high-pressure vessel configured to enclose the TES unit.

Example 67. The system of example 65, wherein the reactor is configured to perform an endothermic reaction.

Example 68. The system of example 65, wherein the reactor is configured to perform a hydrogenation process.

Example 69. The system of example 65, wherein the reactor is configured to perform a direct reduction process on the material.

Example 70. The system of example 65, wherein the reactor is configured to perform a direct reduced iron reaction.

Reformer Examples

Example 71. A material processing system for use with a process gas including:
- a reformer configured to receive heat and a feedstock to produce the process gas;
- a thermal energy storage (TES) unit configured to store thermal energy generated from an electric heater, wherein the TES unit is configured to provide heat to the reformer using stored thermal energy; and
- a material processing reactor configured to receive the process gas and perform a process on the material in the reactor;
- wherein the TES unit is configured to output stored thermal energy at a rate that maintains a desired process condition in the reactor.

Example 72. The system of example 71, wherein the reformer includes one or more reactor tubes.

Example 73. The system of example 72, wherein the TES unit further includes a fluid movement system configured to direct a working fluid to convectively heat the reactor tubes in order to drive at least a portion of a reaction in the reformer.

Example 74. The system of example 72, wherein the reformer tubes are configured to be exposed to radiant heat transfer from the TES unit in order to drive at least a portion of the reaction in the reformer and a fluid movement system configured to direct a reformer feedstock through the reactor tubes.

Example 75. The system of example 74, wherein the reformer feedstock includes one or more of the following: steam, a hydrocarbon, a carbon oxide, or any combination thereof.

Example 76. The system of example 71, wherein the process gas includes one or more of the following: hydrogen, carbon monoxide, or any combination thereof.

Example 77. The system of example 71, wherein the reformer is also configured to receive heat from a combustion process.

Example 78. The system of example 77, wherein the combustion process uses waste gas from the material processing reactor as at least a portion of fuel input.

Example 79. The system of example 78, further including a post carbon capture combustion plant configured such that a product of combustion in the reformer is directed to at least one heat exchanger that generates steam and at least a portion of the cooled products of combustion are directed to a sorption carbon capture process, wherein the steam generated is used at least in part to power the carbon capture process.

Example 80. The system of example 79, where the steam passes through a non-condensing turbine to produce steam and electricity to drive the carbon capture process.

Example 81. The system of example 71, further including a high pressure vessel configured to enclose the TES unit.

Example 82. The system of example 71, wherein the reactor is configured to perform an endothermic reaction.

Example 83. The system of example 71, wherein the reactor is configured to perform a direct reduction process on the material.

Example 84. The system of example 71, wherein the reactor is configured to perform a direct reduced iron reaction.

MiniStove Examples

Example 85. A material processing system for use with a process gas including:
- a first thermal energy storage (TES) unit configured to store thermal energy generated from an electric heater, wherein the TES unit is configured to heat working fluid using stored thermal energy;
- at least one secondary TES unit configured to be heated by the working fluid from the first TES unit in a first charging mode of operation and to heat a process gas in a second, distinct discharging mode of operation; and a material processing reactor configured to receive the heated process gas and perform a process on the material in the reactor;
- wherein at least one secondary TES unit is configured to output stored thermal energy at a rate that maintains a predetermined process condition in the reactor.

Example 86. The system of example 85, wherein the process gas is at a pressure greater than a working fluid pressure.

Example 87. The system of example 85, wherein the at least one secondary TES unit has a first operating condition at a first gas temperature and pressure, and a second operating condition at a second gas temperature and pressure.

Example 88. The system of example 85, wherein the process gas includes any mixture of hydrogen, hydrocarbons, and/or carbon oxides.

Example 89. The system of example 85, further including a fluid movement system configured to direct a working fluid to a heat exchanger configured to heat the process gas.

Example 90. The system of example 85, wherein the TES unit is configured to heat the process gas via convection and/or radiation.

Example 91. The system of example 85, further including a fluid movement system configured to direct the process gas through at least a portion of the TES unit.

Example 92. The system of example 89 wherein the working fluid is air, carbon dioxide, nitrogen, or a combination thereof.

Example 93. The system of example 85, wherein the process gas includes any mixture of hydrogen, hydrocarbons, and/or carbon oxides.

Example 94. The system of example 89 wherein the working fluid is at a temperature of about 900° C. or higher.

Example 95. The system of example 89 further including one or more conduits for returning the working fluid back to the TES for reheating.

Secondary TES Ministove Examples

Example 96. An electric thermal energy storage system which delivers a process gas including:
- a first thermal energy storage (TES) unit configured to store thermal energy generated from an electric heater, wherein the TES unit is configured to heat working fluid using stored thermal energy;

at least one secondary TES unit configured to be heated by the working fluid from the first TES unit in a first charging mode of operation and to heat a process gas in a second, distinct discharging mode of operation.

Example 97. The system of example 96, in which the secondary TES unit(s) in the second discharging mode of operation includes an inlet process gas at a pressure greater than the pressure of the inlet working fluid during the first charging mode of operation.

Example 98. The system of example 96, in which the secondary TES unit(s) in the second discharging mode of operation is configured to receive a process gas of different composition than the composition of the working fluid during the first charging mode of operation.

Example 99. The system of example 96, in which a plurality of secondary TES units is configured to deliver the outlet process gas at constant temperatures and flow rates.

Example 100. The system of example 97, further including a high-pressure vessel configured to enclose the secondary TES units.

Example 101. The system of example 96, in which the secondary TES units include a solid thermal storage medium.

Example 102. The system of example 101, in which the secondary TES units are heated and cooled convectively by fluid movement through the solid thermal storage medium.

Example 103. The system of example 96, in which the direction of fluid movement across a secondary TES unit changes when a secondary TES unit changes charging/discharging mode of operation.

Example 104. A material processing method, including:
storing thermal energy in a thermal energy storage (TES) unit;
heating a process gas using the stored thermal energy; and
directing the heated process gas to a material processing reactor;
performing a process on the material in the reactor;
adjusting thermal energy output at a rate that maintains a desired process condition in the reactor.

Example 105. A material processing method, including:
storing thermal energy in a thermal energy storage (TES) unit;
using the stored thermal energy to heat at least one combustion reactant that includes an oxidizer and/or a fuel;
combusting the heated reactant in a material processing reactor in the presence of material in the reactor; and
outputting stored thermal energy at a rate that maintains a predetermined process condition in the reactor.

Example 106. A material processing method, including
storing thermal energy in a thermal energy storage (TES) unit;
using the stored thermal energy to heat at least one combustion reactant that includes an oxidizer and/or a fuel;
combusting the heated reactant in a material processing reactor in the presence of material in the reactor; and
outputting stored thermal energy at a rate that maintains a predetermined process condition in the reactor.
wherein the fuel and/or oxidizer interact in an exothermic process in the TES before being provided to the material processing reactor.

Example 107. A power generation method, including:
storing thermal energy in a thermal energy storage (TES) unit;
using the stored thermal energy to produce a pressurized heated gas including at least one combustion reactant that includes an oxidizer and/or a fuel; and
a gas turbine generator configured to use the heated gas to
using heated gas on to a gas turbine generator to generate electricity; and
outputting stored thermal energy at a rate that maintains a predetermined inlet condition of the gas turbine generator.

Example 108. A material processing method including:
storing thermal energy in a thermal energy storage (TES) unit;
using stored thermal energy to heat a process gas to a first temperature;
directing a working fluid from the TES unit at the first temperature to a second heat load at a second temperature;
directing a heated process gas to a material processing reactor;
performing a process on the material in the reactor; and
outputting stored thermal energy at a rate that maintains a desired process condition in the reactor.

Example 109. A material processing method including:
storing thermal energy in a thermal energy storage (TES) unit;
outputting the stored thermal energy to a first heat exchanger to heat a process gas;
outputting the stored thermal energy to a second heat exchanger for powering a steam turbine electric generator;
powering an electrolyzer with electricity from the generator to provide one portion of the process gas;
directing process gas to a material processing reactor coupled to the first heat exchanger to using the process gas to perform a chemical process on the material in the reactor; and
outputting stored thermal energy to the first heat exchanger in a manner that maintains temperature in the reactor at or above a working temperature.

Example 110. A material processing method including:
storing thermal energy in a thermal energy storage (TES) unit;
directing feedstock to a reformer and heating the feedstock to produce process gas;
heating the reformer using stored thermal energy;
directing the process gas to a material processing reactor;
performing a process on the material in the reactor; and
outputting stored thermal energy at a rate that maintains a desired process condition in the reactor.

Example 111. A material processing method including:
storing thermal energy in a first thermal energy storage (TES) unit;
heating working fluid using stored thermal energy;
heating at least one secondary TES unit by the working fluid from the first TES unit in a first charging mode of operation;
heating a process gas in a second, distinct discharging mode of operation; and
heating process gas in a material processing reactor;
performing a process on the material in the reactor; and
outputting stored thermal energy from at least one secondary TES unit at a rate that maintains a predetermined process condition in the reactor.

Example 112. An electric thermal energy storage method including:

storing thermal energy in a first thermal energy storage (TES) unit configured to store thermal energy generated from an electric heater;

heating working fluid using stored thermal energy; and heating working fluid with at least one secondary TES unit in a first charging mode of operation and to heat a process gas in a second, distinct discharging mode of operation.

A list of further subject matter includes: a material processing system; a method for processing a material; a power generation system; a method of power generation; and a thermal energy storage system with a thermal radiation surface heated by convective flow.

The subject matter includes any of the systems or methods in examples 1 through 112 above, wherein a process gas includes any mixture of hydrogen, hydrocarbons, and/or carbon oxides.

The subject matter includes any of the systems or methods in examples 1 through 112 above, further including a fluid movement system configured to direct a working fluid to a heat exchanger configured to heat the process gas.

The subject matter includes any of the systems or methods in examples 1 through 112 above, wherein the TES unit is configured to heat the working fluid via convection and/or radiation.

The subject matter includes any of the systems or methods in examples 1 through 112 above, wherein the TES unit is configured to heat the process gas via convection and/or radiation.

The subject matter includes any of the systems or methods in examples 1 through 112 above, wherein the TES unit includes a thermal storage medium and a fluid movement system to direct the process gas through the thermal storage medium to heat the process gas.

The subject matter includes any of the systems or methods in examples 1 through 112 above, wherein the TES unit includes a thermal storage medium and a fluid movement system, wherein the fluid movement system includes tubes that convey the process gas through a zone wherein the tubes are heated substantially by radiation from the thermal storage medium to heat the process gas.

The subject matter includes any of the systems or methods in examples 1 through 112 above, wherein the working fluid includes air, carbon dioxide, nitrogen, a noble gas, steam, or a combination thereof.

The subject matter includes any of the systems or methods in examples 1 through 112 above, wherein the process gas includes any mixture of hydrogen, hydrocarbons, and/or carbon oxides.

The subject matter includes any of the systems or methods in examples 1 through 112 above, wherein the working fluid is at a temperature of about 900° C. or higher.

The subject matter includes any of the systems or methods in examples 1 through 112 above, further including a fluid movement system and one or more conduits for returning the working fluid back to the TES unit for reheating.

The subject matter includes any of the systems or methods in examples 1 through 112 above, further including a high-pressure vessel configured to enclose the TES unit and provide a sealed environment therein.

The subject matter includes any of the systems or methods in examples 1 through 112 above, further including a carbon capture and sequestration (CCS) system including a compressor and a reboiler configured to receive exhaust gas from the reactor and powered at least in part from stored energy from the TES.

The subject matter includes any of the systems or methods in examples 1 through 112 above, wherein the reactor is configured to perform an endothermic reaction.

The subject matter includes any of the systems or methods in examples 1 through 112 above, wherein the reactor is configured to perform a direct reduction process on the material.

The subject matter includes any of the systems or methods in examples 1 through 112 above, wherein the reactor is configured to perform a direct reduced iron reaction.

The subject matter includes any of the systems or methods in examples 1 through 112 above, wherein the reactor is configured to perform a hydrogenation process.

The subject matter includes any of the systems or methods in examples 1 through 112 above comprising at least one technical feature from any of the prior features. The subject matter includes any of the systems or methods in examples 1 through 112 above comprising at least two technical features from any of the prior features. Optionally, a method is provided comprising at least one technical feature from any of the prior features. Optionally, the method comprises at least any two technical features from any of the prior features. Optionally, a device is provided comprising at least one technical feature from any of the prior features. Optionally, the device comprises at least any two technical features from any of the prior features. Optionally, the system is provided comprising at least one technical feature from any of the prior features. Optionally, the system comprises at least any two technical features from any of the prior features.

Terminology

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

Further, the term furnace and reactor can be used interchangeably in the above work meant to signify the reactor of a material processing system which, for example in the case of DRI production, may be referred to as a furnace from art approaches.

Similarly, the terms describing fluid compressions devices (such as, but not limited to, blowers, compressors, fans and pumps) can be used interchangeably.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

While foregoing example implementations may refer to "air", the inventive concept is not limited to this composition, and other fluid streams may be substituted therefor for additional industrial applications, such as but not limited to, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the desired properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A material processing system, including:
   a thermal energy storage (TES) unit configured to store thermal energy generated from an electric heater, wherein the TES unit is configured to use the stored thermal energy to indirectly heat via radiation from the TES unit, at least one combustion reactant that includes a fuel; and
   a material processing reactor configured to combust the heated by the TES unit reactant in the presence of material in the material processing reactor;
   wherein the TES unit is configured to output stored thermal energy at a rate that maintains a predetermined process condition in the material processing reactor.

2. The system of claim 1, wherein the predetermined process condition includes a fuel inlet temperature.

3. The system of claim 1, wherein at least a portion of the at least one combustion reactant is directed through the TES unit to provide heating.

4. The system of claim 1, wherein at least a portion of the at least one combustion reactant is indirectly heated by the TES unit.

5. The system of claim 2, wherein at least a portion of the at least one combustion reactant entering the TES unit is at a pressure above 1 bar.

6. The system of claim 1, wherein the material processing reactor is configured as a blast furnace.

7. The system of claim 1, wherein the at least one combustion reactant includes one or more of hydrogen, hydrocarbons, and carbon oxides.

8. The system of claim 2, further including a fluid movement system configured to direct a working fluid to a heat exchanger configured to heat the at least one combustion reactant.

9. The system of claim 2, wherein the TES unit is configured to heat the at least one combustion reactant via convection or radiation.

10. The system of claim 1, further including a fluid movement system configured to direct the at least one combustion reactant through at least a portion of the TES unit.

11. The system of claim 1, further including a high-pressure vessel configured to enclose the TES unit.

12. The system of claim 1, wherein TES unit is configured to receive inlet gas at a pressure above ambient pressure.

13. The system of claim 1, further including a carbon capture and sequestration (CCS) system including a compressor and a reboiler configured to receive exhaust gas from the material processing system and powered at least in part from stored energy from the TES.

14. The system of claim 1, wherein the material processing reactor is configured to perform an endothermic reaction.

15. The system of claim 1, wherein the material processing reactor is configured to perform a direct reduction process on the material.

16. The system of claim 1, wherein the material processing reactor is configured to perform a direct reduced iron reaction.

17. A material processing system, including
a thermal energy storage (TES) unit configured to store thermal energy generated from an electric heater, wherein the TES unit is configured to use the stored thermal energy to indirectly heat via radiation from the TES unit, at least one combustion reactant that includes a fuel; and
a material processing reactor configured to combust the heated by the TES unit reactant in the presence of material in the material processing reactor;
wherein the TES unit is further configured to:
output stored thermal energy at a rate that maintains a predetermined process condition in the material processing reactor, and
contain the fuel in an exothermic combustion process.

18. A material processing system, including:
a thermal energy storage (TES) unit configured to store thermal energy generated from an electric heater, wherein the TES unit is configured to use the stored thermal energy to indirectly heat via radiation from the TES unit, at least one combustion reactant that includes an oxidizer and a fuel; and
a material processing reactor configured to combust the heated by the TES unit reactant in the presence of material in the material processing reactor;
wherein the TES unit is configured to output stored thermal energy at a rate that maintains a predetermined process condition in the material processing reactor.

19. The system of claim 18, wherein the oxidizer includes one or more of air and/or oxygen.

* * * * *